US010103784B2

(12) United States Patent
Leica et al.

(10) Patent No.: US 10,103,784 B2
(45) Date of Patent: Oct. 16, 2018

(54) CREATION AND MANAGEMENT OF NEAR FIELD COMMUNICATIONS TAGS

(71) Applicant: BLACKBERRY LIMITED, Waterloo (CA)

(72) Inventors: Marcel Florin Leica, Toronto (CA); Michael William Brown, Mississauga (CA)

(73) Assignee: BlackBerry Limited, Waterloo (CA)

( * ) Notice: Subject to any disclaimer, the term of this patent is extended or adjusted under 35 U.S.C. 154(b) by 627 days.

(21) Appl. No.: 13/834,573

(22) Filed: Mar. 15, 2013

(65) Prior Publication Data

US 2013/0314214 A1 Nov. 28, 2013

Related U.S. Application Data

(60) Provisional application No. 61/651,412, filed on May 24, 2012.

(51) Int. Cl.
*G06F 17/00* (2006.01)
*H04B 5/00* (2006.01)
*H04W 4/80* (2018.01)

(52) U.S. Cl.
CPC ............ *H04B 5/0056* (2013.01); *H04W 4/80* (2018.02)

(58) Field of Classification Search
CPC ...... H04B 5/0056; H04B 5/00; G06K 7/0008; G06K 19/0723; G06Q 30/02
USPC ..... 340/10.1, 10.51; 455/41.1; 705/16, 26.1; 235/375
See application file for complete search history.

(56) References Cited

U.S. PATENT DOCUMENTS 8,239,276 B2 8/2012 Lin et al.
9,200,469 B1 * 12/2015 Mindrum ............ G06F 17/3087
2002/0000468 A1 * 1/2002 Bansal ............. G06F 17/30879 235/462.15
2006/0094411 A1 * 5/2006 Dupont ............ H04L 29/06027 455/417
2007/0188331 A1 * 8/2007 Kumagai ............... G07G 1/009 340/572.8
2007/0265033 A1 * 11/2007 Brostrom ........ H04M 1/274516 455/557
2009/0058647 A1 3/2009 Dennard et al.
(Continued)

FOREIGN PATENT DOCUMENTS

EP 2442600 A1 4/2012
WO 2005081088 A1 9/2005

OTHER PUBLICATIONS

United States Patent and Trademark Office, Notice of Allowance dated Dec. 10, 2013, issued in U.S. Appl. No. 13/784,157.
(Continued)

*Primary Examiner* — Firmin Backer
*Assistant Examiner* — Munear Akki
(74) *Attorney, Agent, or Firm* — Ridout and Maybee LLP

(57) ABSTRACT

Apparatus 810, 850, 912, 914, 1306, and methods and systems for creating, modifying, categorizing, parsing, grouping and displaying data suits suitable for use with Near Field Communication (NFC) tags, including storing in a computer readable medium of a log tag data sets read by or written by the user device, assessing at least one category for each of the logged tags, and displaying, in conjunction with at least one indicator indicative of the respective at least one category, of each of the logged tags on the user device.

13 Claims, 32 Drawing Sheets

1 1 0 1 0 0 0

0 1 1 0

(56) References Cited

U.S. PATENT DOCUMENTS

| | | | | |
|---|---|---|---|---|
| 2009/0075592 | A1 | 3/2009 | Nystrom et al. | |
| 2010/0078475 | A1* | 4/2010 | Lin | B64F 1/366 235/380 |
| 2010/0082447 | A1* | 4/2010 | Lin | G06Q 30/0601 705/26.1 |
| 2012/0094598 | A1* | 4/2012 | Tysowski | H04W 4/001 455/41.1 |
| 2012/0122397 | A1 | 5/2012 | Brown et al. | |
| 2012/0209686 | A1* | 8/2012 | Horowitz | H04L 67/02 705/14.26 |
| 2012/0246581 | A1* | 9/2012 | Engestrom | G06Q 50/01 715/753 |
| 2013/0009774 | A1* | 1/2013 | Sabeta | G06Q 30/016 340/540 |
| 2013/0059534 | A1* | 3/2013 | Sobalvarro | G06Q 30/02 455/41.1 |

OTHER PUBLICATIONS

NXP, NXP Launches its First Data Sharing App for Android, Mar. 24, 2011 http://www.nxp.com/news/press-releases/2011/03/nxp-launches-its-first-data-sharing-app, Last accessed Feb. 13, 2013.

European Patent Office, Extended European Search Report dated Apr. 5, 2013, issued in European Patent Application No. 12186365.8-1858.

NFC Forum, "NFC Data Exchange Format (NDEF)—NDEF 1.0", Internet Citation Jul. 24, 2006, URL: http://www.nfc-forum.org/specs/spec_license/download_spec/0f5678cll4d295e2da0d902f4e7839846281fc44/NFCForum-TS-NDEF_1.0.pdf; Jan. 10, 2007.

United States Patent and Trademark Office, Office Action dated Jul. 10, 2013, issued in U.S. Appl. No. 13/784,157.

Andrea Martinez: "Near Field Communication Application Provisioning Framework", Sep. 1, 2009, pp. 1-67, XP055079508, Retrieved from the Internet: URL: http://epubl.ltu.se/1402-1781/2010/003/LTU-CDUPP-10003-SE.pdf (retrieved on Sep. 17, 2013).

European Patent Office, Extended European Search Report dated Sep. 27, 2013, issued in European Patent Application No. 13159414.5.

European Patent Office, Extended European Search Report dated Sep. 16, 2013, issued in European Patent Application No. 13159504.3.

Norton Rose Fulbright, Response dated Oct. 10, 2013, filed in U.S. Appl. No. 13/784,157.

Communication Pursuant to Article 94(3); EP 13159414.5; dated Feb. 15, 2018.

Office Action; CA application No. 2810223; dated Oct. 5, 2017.

* cited by examiner

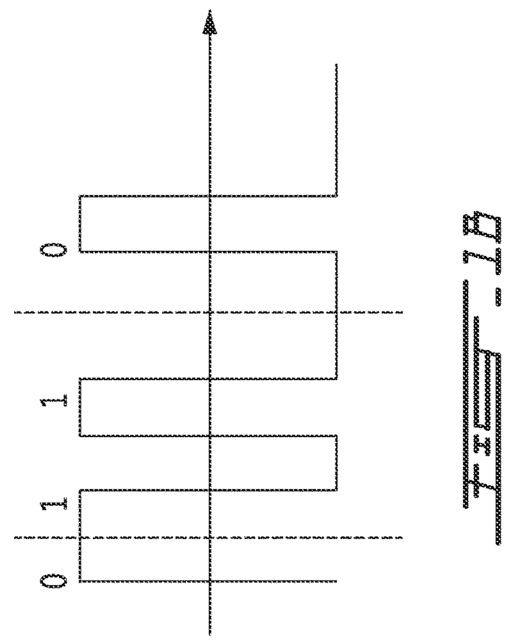
FIG. 1B
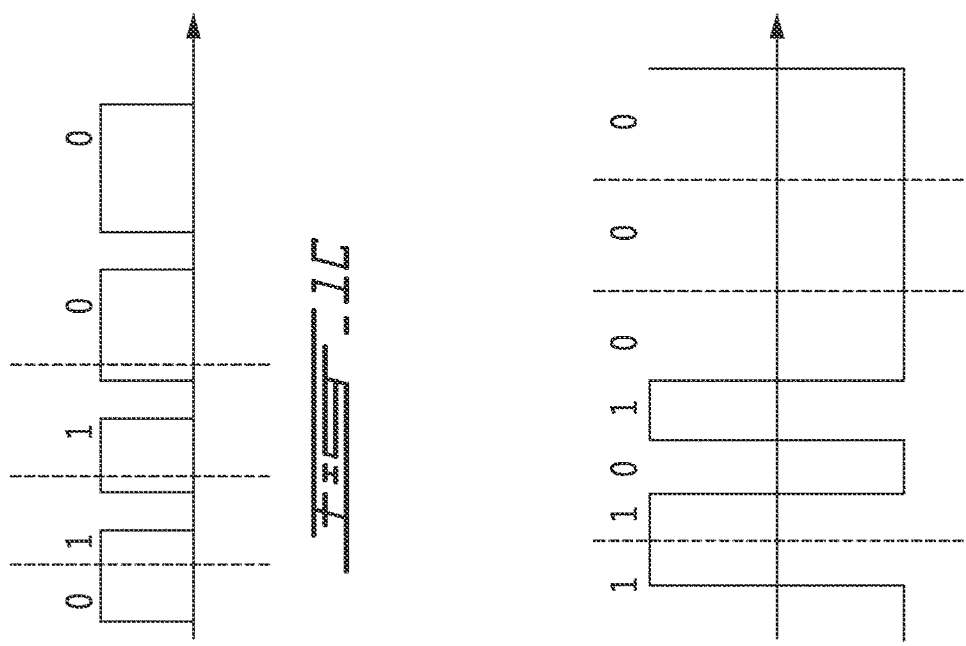
FIG. 1C
FIG. 1A 200
230
Applications
Define Record Formats For Applications
Tag Operations
Digital Protocol
Analog Protocol
210
220
240
250

500,600
Card Application
Digital Protocol
Analog Protocol
610
240
250

810b
1000
724,8135
8134,726
726,8134
8135,724
400
810a 914
912
900
914
912,918
Applications
Platform
Infrastructure
850
810,120
810,120
400
120,810
120,810,1010

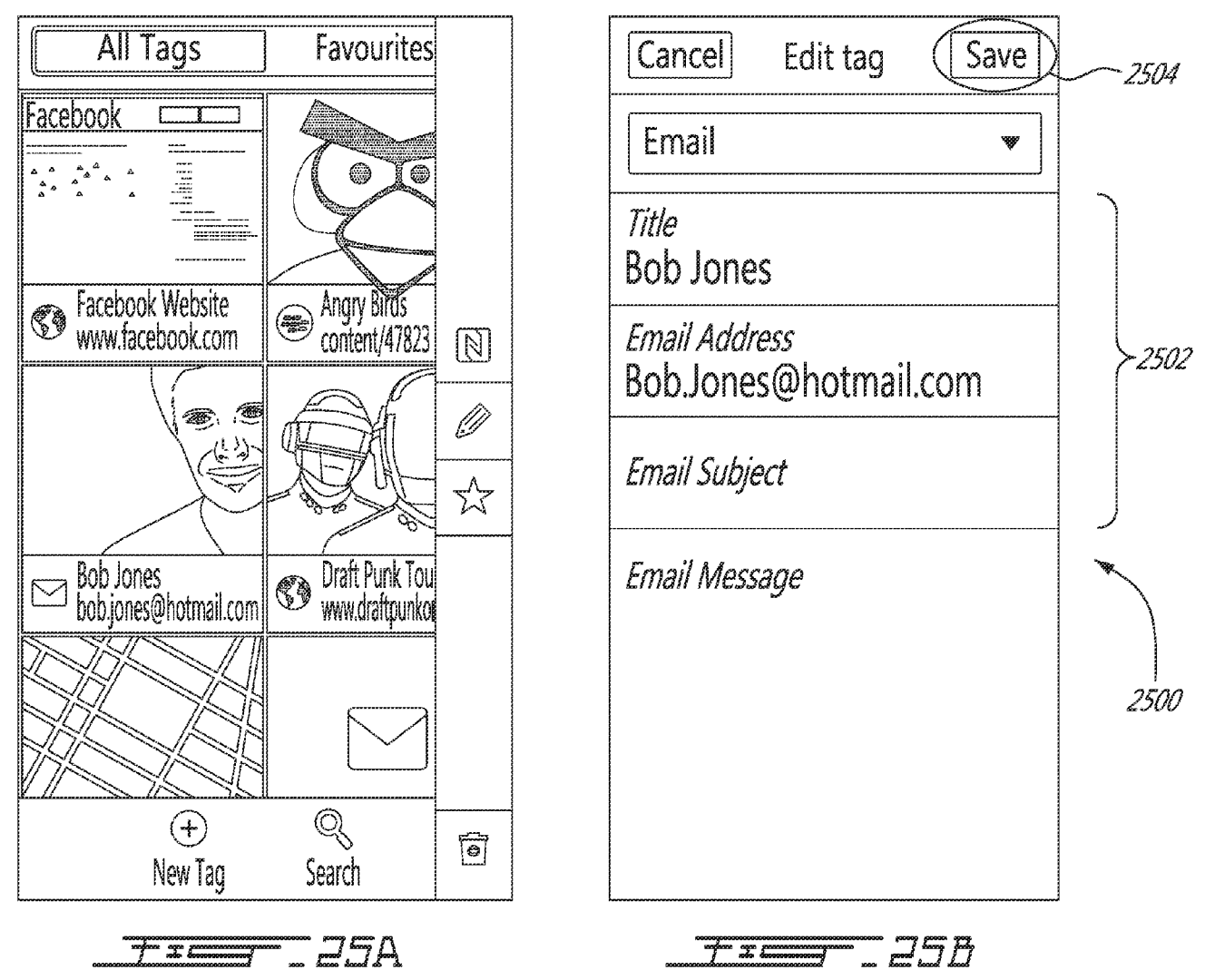

2504

2502

2500

Cancel Edit tag Save

Email

Title
Bob Jones

Email Address
Bob.Jones@hotmail.com

Email Subject

Email Message

FIG. 25B

All Tags Favourites

Facebook

Facebook Website
www.facebook.com

Angry Birds
content/47823

Bob Jones
bob.jones@hotmail.com

Draft Punk Tou
www.draftpunkto

New Tag

Search

FIG. 25A

CREATION AND MANAGEMENT OF NEAR FIELD COMMUNICATIONS TAGS

CROSS-REFERENCE TO RELATED APPLICATIONS

This application claims the benefit of U.S. Provisional Patent Application No. 61/651,412, filed 24 May 2012 and entitled Device, System, and Method for Logging Near Field Communications Tag Interactions, the entire contents of which are hereby incorporated by this reference.

FIELD OF THE DISCLOSURE

This application relates to the field of communications, and more particularly, to mobile wireless communications devices and related methods that use Near Field Communications (NFC).

BACKGROUND

Mobile communication systems continue to grow in popularity and have become an integral part of both personal and business communications. Various mobile devices now incorporate Personal Digital Assistant (PDA) features, such as calendars, email, address books, Internet ("Web"), task lists, calculators, memo and writing programs, media players, games, etc. For example, these multi-function devices usually allow users to send and receive electronic mail (email) messages wirelessly and access the internet via a cellular network, wireless wide area network (WWAN), and/or a wireless local area network (WLAN), for example.

Some mobile devices also incorporate contactless card reading technology, and/or other Near Field Communication protocols, antennae, and/or chips to enable such contactless card reading technology. Near Field Communications (NFC) technologies may be used for short-range communications. NFC may use magnetic field induction to enable communication between electronic devices, including, for example, mobile wireless communications devices, and to enable communications between, for example, devices and passive cards, tags, or the like. NFC communications are typically over short ranges, such as over distances of a few centimeters or less, and may be high frequency in nature. These short-range communications applications may include, for example, payment and ticketing, electronic keys, identification, device set-up service and similar information sharing, by way of non-limiting example.

An NFC connection may deliver, or otherwise enable transfer of, for example, address or other reference data or other information useful for referring NFC readers and/or other devices to, or otherwise identifying, remote and/or other networked computing resources, including for example both processors and memory storage devices. Such reference data may include, for example data associated with phone numbers, Uniform Resource Locators (URLs) or other Internet address information, personal or business contact information, geographic or other physical location, and the like.

As stated above, NFC technologies may employ physical and/or virtual tags, cards, and the like that may be read from, and/or written to, by mobile and other NFC-enabled devices. In some embodiments, however, the read/write capabilities of NFC tags may be limited. As such, data transferred during NFC interactions or sessions may be limited to relatively small data sets such as the network resource reference data referenced above.

It may also be advantageous, in various embodiments of such systems, for an NFC-enabled mobile device to be able to display data transferred to, or from, NFC tags and/or other devices in manner(s) which are intuitive to, or otherwise readily intelligible to or useful by, user(s) of such devices.

BRIEF DESCRIPTION OF THE DRAWINGS

The accompanying drawings illustrate various aspects and exemplary embodiments of the devices, systems, and methods disclosed herein. In the drawings, like numerals represent like elements.

FIGS. 1A-1C provide schematic illustrations of coding schemes suitable for use in implementing various aspects and embodiments of the disclosure;

FIGS. 16-34 are schematic diagrams showing embodiments of display screens comprising graphical user interfaces in accordance with, and suitable for implementing, various aspects of the disclosure.

DESCRIPTION

Figure 2:
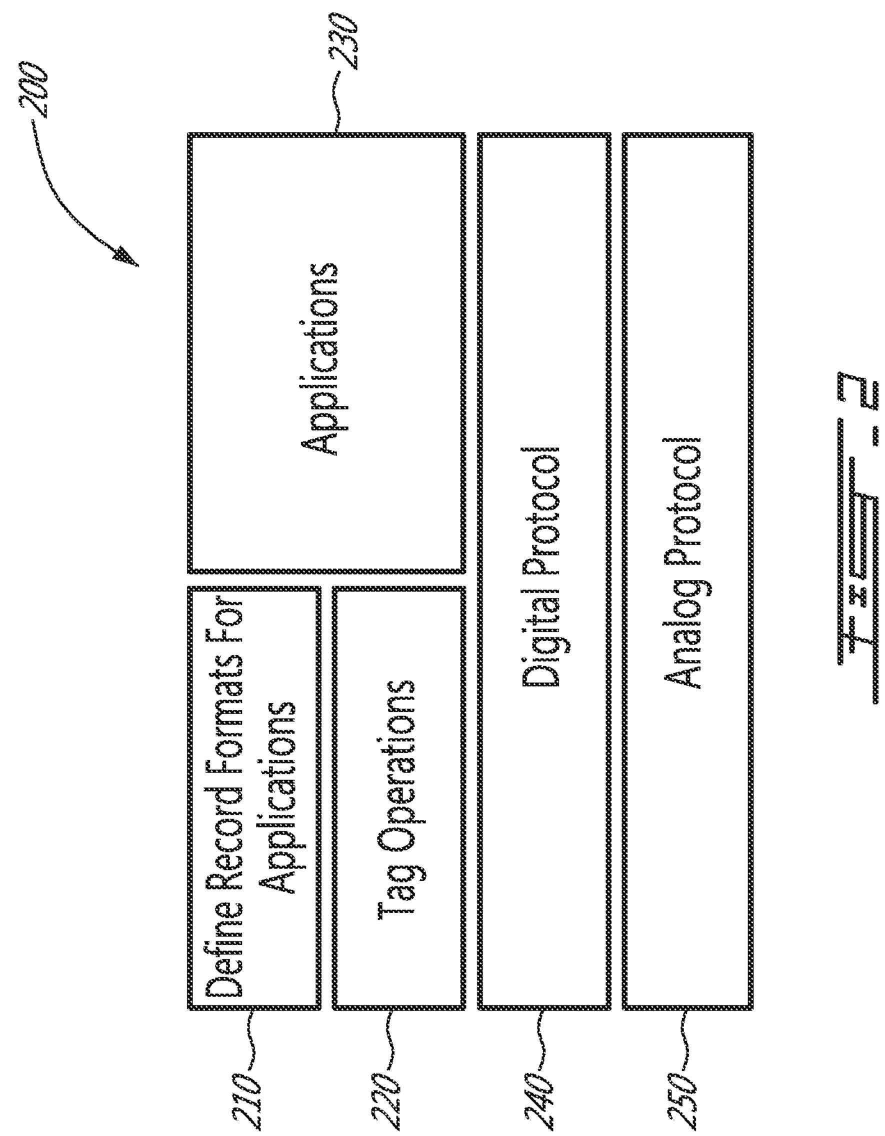
FIG. 2 provides a schematic illustration of a stack architecture suitable for use implementing NFC processes in accordance with the disclosure.

The disclosure provides systems, devices, methods, and programming products for creating, modifying, organizing, reading, reviewing, writing, and otherwise processing content and/or instruction data suitable for use in creating, modifying, and otherwise managing or administering near field communication (NFC) devices such as passive NFC tags. The various figures and descriptions herein may, in some instances, have been simplified to illustrate elements that are relevant for clear understanding, while eliminating, for the purposes of clarity and brevity, other elements found in typical communications processes. In such cases, those skilled in the relevant arts will recognize and understand any further elements and/or steps that may be desirable and/or required in implementing features or aspects of the disclosure. Because such elements and steps are well known in the art, and would not facilitate a better understanding of the present disclosure, in some cases they are not described, or are not fully described, herein. To be clear, however, the disclosure herein is directed to all variations and modifications to the disclosed elements and steps that would be known or apparent to those skilled in the relevant arts, in light of this disclosure.

Near Field Communications (NFC) include all short-range, bi-directional and/or other multi-directional communication technologies consistent with the purposes and embodiments disclosed herein.

Among the many advantages provided by NFC processes is that they are readily adaptable to a variety of means for increasing the security of data communications. Security for NFC transmissions can be provided in a wide variety of ways, including for example through the application of data encryption techniques; access authorization requirements (e.g., the use of user identification/password processes); and other methods. For example, NFC-capable devices, including tags and other passive devices, may include or otherwise enable implementation of software applications and/or code configured to require and/or otherwise enforce verification and/or other forms of authorization as a condition of successful inter-device NFC interactions. Such application(s) may, for example, be invoked when pre-defined type(s) of NFC interaction(s) are detected, and may verify that pairing device(s) or tag(s) are authorized and/or are otherwise of acceptable type.

For example, a user of an active NFC-capable mobile device may wish to ignore any undesirable or otherwise unauthorized interactions with other mobile devices, and may be enabled to selectively limit or prevent such interactions. Similarly, an NFC-capable device used for a specific purpose, such as for reading "smart" cards/tags, for example, may ignore requested interactions from any NFC-capable device, or type of device, that is not recognized as a smart card/tag. Additionally, in known embodiments, personal identification numbers (PINs) and/or other security keys may be exchanged between communications devices using, for example, NFC, as a condition of establishing a wireless communications connection.

A further aspect or layer of security can be provided by the relatively short distance NFC transmissions are effectively enabled to travel, and/or the relatively low power at which they may be transmitted. In such ways NFC communication characteristics may be used to limit or eliminate the ability of third-party devices to intercept NFC transmissions.

As those skilled in the relevant arts will appreciate, once they have been made familiar with this disclosure, NFC devices may be, or include, active devices, such as smart phones or other personal digital assistants (PDAs) comprising processors useful for initiating and otherwise conducting NFC interactions; passive devices, such as NFC-enabled cards or tags, which may be readable, under defined conditions, by one or more active NFC devices; and/or hybrid or combination active/passive devices incorporating some or all characteristics of both active and passive devices.

In many embodiments, NFC devices comprising internal power supply(ies) and processor(s) in addition to data storage device(s) are considered active, whereas tags and/or other devices lacking dedicated power supply(ies) and/or processor(s) are typically considered passive. Passive devices or tags, such as smart cards, for example, may interact with energy (and receive data) provided by an active device through coupling such as the aforementioned magnetic inductive coupling. Such a passive device or tag, when it is powered by at least one active device, may communicate and exchange data with the device or other devices.

NFC tags, which are typically implemented as active or passive NFC-capable devices fixed to other objects, such as stationary or moveable walls, posters, counters, tables, and even fixed or mobile computing devices, may be classified as passive or active. In a situation in which a passive tag is put into suitably close proximity of an active NFC-capable device, an RF signal created by the active device can, for example, provide sufficient energy to the tag to allow the tag to "boot up" and/or otherwise execute one or more processes represented by machine-readable instructions or code(s) stored in non-transient memory resident on the tag. Such code may, for example, include instructions configured for execution of suitably-encoded algorithm(s), and may initiate transfer of data to or from the active NFC-capable device. Similarly, the passive tag may accept and/or enable transfer(s) of data to and/or from the active NFC-capable device and may further communicate with one or more remote devices and/or servers using, for example, alternate data communications protocols via one or more networks 430, 900, 8141 such as the public-switched telephone network (PSTN) and/or the Internet, as shown for example in FIG. 8. Although one or more active tags may communicate together, passive tags typically rely on the availability of remote power source(s) such as one or more active NFC devices to initiate communication-related actions, or processes. In some cases, data storage and/or transfer capabilities of passive tags have heretofore been relatively limited.

Though various types of tags may be created, and a wide variety of such tags are and/or will be compatible with the purposes disclosed herein, there currently exist at least four types of widely accepted tags (having the designations of Type 1, Type 2, Type 3 and Type 4), each typically associated with different formats and capacities. Type 1 tags, for example, are commonly based on the ISO/IEC 14443 Type A standard, have read/write capabilities, may be modified during use, may contain a memory capacity up to 2 kB, use 16 or 32 bit digital security features, and may have a communication speed of up to 106 kbps. Type 2 tags are also based on the ISO/IEC 14443 Type A standard, have read/write capabilities, may be modified during use, may contain a memory capacity up to 2 kB, generally lack a security signature, and may have a communication speed of up to 106 kbps. Type 3 tags are based on the Sony FeliCa contactless smart card interface, may contain a memory capacity up to 2 kB, and may have a communication speed of up to 212 kbps. Type 4 tags are compatible with both the ISO/IEC 14443 Type A and Type B standards, are pre-configured during the manufacturing stage, are read and/or write only, may contain a memory capacity up to 32 kB, and may have a communication speed of up to 424 kbps.

Tags of all types may be coded or otherwise adapted to enable data transfers such as those mentioned above. For example, they may comprise suitably-configured stored binary code(s), or other machine-readable and/or executable data and/or coded instruction sets, or the like, consistent with implementation of such purpose(s). Thus, for example, coding of a tag can enable the tag to exchange data with compatible NFC-enabled reading device(s), e.g., as discussed throughout the disclosure.

FIGS. 1A-1C provide schematic illustrations of signaling, or coding, schemes suitable for use in implementing various aspects and embodiments of the disclosure. In the embodiments shown, FIGS. 1A-C represent three current commonly-used binary coding techniques used in NFC data transfer processes, namely NRZ-L, Manchester, and Modified Miller. In NRZ-L coding, illustrated in FIG. 1A, a high state during one bit duration refers to a 1 bit and a low state expresses a 0 bit. NRZ-L coding can use 10% amplitude shift keyed (ASK) modulation and is compatible with data transfer speeds up to 848 kbps. Manchester coding, illustrated in FIG. 1B, can utilize transitions that may occur at the midpoint of a signal period. A low-to-high transition can be interpreted as expressing a 0 bit, whereas a high-to-low transition can be interpreted as representing a 1 bit. To achieve these conditions it can be necessary, or otherwise desirable, to disregard transition(s) occurring at the middle of a bit period. Manchester coding protocols can also employ 10% ASK modulation schemes, and are generally compatible with data transfer speeds of 106 kbps. Modified Miller code can be characterized by pauses occurring in the carrier signal(s) at different positions of a period. Depending on the information to be transmitted, bits may be coded as shown in FIG. 1C. A high or "1" can for example always be encoded/interpreted in the same way, while a low or "0" may encoded/interpreted differently dependent upon what preceded it. Many mobile wireless communications devices operate in communications mode(s) using modified Miller codes and 100% ASK modulation, with data transfer rates ranging from 212 kbps to 424 kbps. Further details are set forth in the Mobile NFC Technical Guidelines, Version 2.0, November 2007 by GSMA, the disclosure of which is hereby incorporated by reference in its entirety.

An exemplary NFC stack architecture (NFC stack) 200 suitable for use in implementing NFC communications in accordance with the disclosure is illustrated in FIG. 2. An analog protocol 250 may be used to determine the operating range of an NFC capable device. A digital protocol 240 may be used to create a successful communication environment by establishing, for example, polling cycles and collision detection, in accordance with industry standards, such as, for example, those discussed herein. For example, and in accordance with the NFCIP-1 standard, responsive to sensing modulation of an initiator electromagnetic carrier field by the target device, an initiator device may perform an initial collision avoidance sequence by transmitting an ATR_REQ (attribute request) command to the target device. Responsive to receiving the ATR_REQ (attribute request) command, the target device may transmit a response called ATR_RES (attribute response).

Tag operations 220 may allow for commands and instructions to be successfully exchanged with specific tag types, and may enable read/write capabilities with suitable protocols, such as, for example, NFC Data Exchange Format (NDEF). As will be appreciated by those skilled in the relevant arts, NDEF is an industry standard data format for NFC enabled devices.

Tag operations 220 may also utilize one or more Record Type Definition (RTD) mechanism(s), or protocols, which may provide, among other features, a way to efficiently define record formats for applications 210. Suitable RTDs may include, for example, any or all of Text RTD (which can provide an efficient way to store text strings in multiple languages by using the RTD mechanism and NDEF format); URI RTD (which can provide an efficient way to store Uniform Resource Identifiers (URI) by using, for example, an RTD mechanism and an NDEF format); Smart Poster RTD (an example of which defines one or more NFC Forum Well Known Types useful in storing and/or otherwise associating URLs or other Internet address information, SMSs, telephone numbers, or other identification/contact data with or on an NFC tag, and/or to transport such data between devices, and which can build on the RTD mechanism and NDEF format, using for example URI RTDs and Text RTDs as building blocks); Generic Control RTD, which can provide a simple way to request a specific action (such as starting an application or setting a mode) to an NFC capable device (destination device) from another NFC capable device (e.g., tag or card source device); and Signature RTD, which can specify format(s) used when signing single or multiple NDEF records, define required and optional signature RTD fields, and/or provide list(s) of suitable signature algorithms and certificate types that can be used to create an NFC authorization signature.

Non-protocol or non-NDEF applications 230, 8130C, 8130N may be included and may include vendor specific applications, such as, for example, [ADD APP]. Such applications can be of any suitable format and, like all processes used in implementing the disclosure herein, may not be based on or compatible with generally accepted protocols, such as NDEF.

In embodiments in which established NFC communications protocols are used to implement processes in accordance with the disclosure, protocols such as Simple NDEF Exchange Protocol (SNEP) may be used. SNEP may, for example, enable an application on one NFC-capable device to exchange NDEF messages with another NFC-capable device during operation(s) in a peer-to-peer mode. Such protocols may use Logical Link Control Protocol (LLCP) connection-oriented transport modes to provide or enable reliable data exchange(s).

Figure 3:
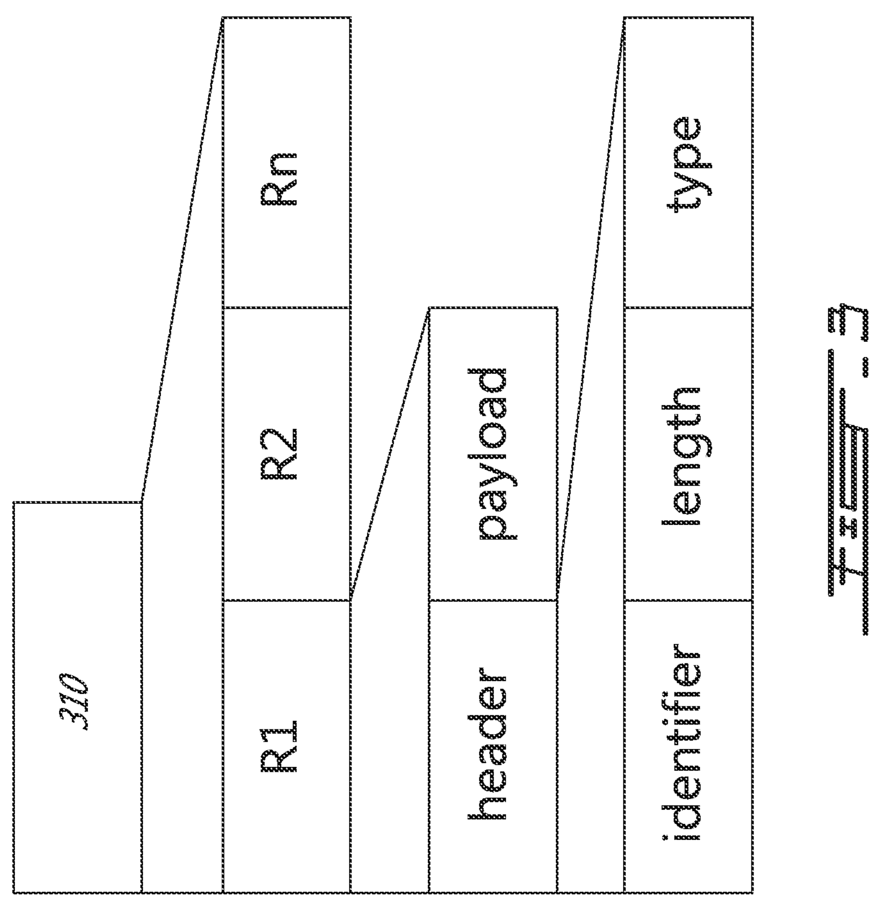
FIG. 3 provides a schematic illustration of an embodiment of a data set suitable for use in implementing NFC communication processes in accordance with the disclosure.

FIG. 3 provides a schematic illustration of an embodiment of a message data set 310 suitable for use in implementing NFC processes in accordance with the disclosure. In the embodiment illustrated in FIG. 3, NDEF message 310 comprises one or more records, or items, (R1, R2, . . . , Rn). Limits, if any, for the number of records that may be encapsulated into a single NDEF message may, for example, depend upon factors such as the NFC communications application Y10 in use, the type(s) of NFC tags used, etc. As illustrated, each message may comprise a sequence of records with each record consisting of at least two parts: a header, and payload (or "content") data. The header may include data representing a wide variety of address, control, and similar information, such as for example payload length, payload type, and payload identification. In some currently-common embodiments, the payload length as included in the header is generally four octets long (although a zero is a valid payload length). Payload type can for example indicate the kind of data being carried in the payload of that record. Such information may, for example, be used to guide interpretation and/or other processing of the payload at the discretion of the controlling application(s). The payload identifier, which in many embodiments is an optional field, may allow applications to identify the payload carried within a given record. The payload itself may be of one of a variety of different types, including for example any one or more URLs, MIME media sets, and/or NFC-specific data type (s). By way of example, for NFC-specific data types payload contents may be defined in one or more RTD files, as discussed above.

Data set(s) 310 may be used, for example, as NFC tag data sets suitable for use in storage on, and reading from/writing to, NFC tag(s) 850. Such data sets may, for example, be created, or generated, and otherwise processing using NFC capable devices 810, 912, 914, 120, etc., as described herein. NFC tag data sets 310 suitable for use in implementing the disclosure can comprise any desired or otherwise suitable numbers of data items, or records, R1, R2, etc., and may be edited or otherwise modified, in desired circumstances, to add, remove, or modify records R1, R2, etc. as needed or desired. Items or records R1, R2, etc., incorporated by or otherwise associated with tag data set(s) 310 can represent any desired otherwise suitable command, content data, and/or other payload data, including without limitation any desired or otherwise suitable computer and/or machine-executable instruction(s) or sets; image, text, audio, video, and/or other content; reference data for use in accessing remote networked resources such as any or all of device(s) 810, 850, 912, 914, 120, 1306, etc, and/or memory(ies) associated therewith.

Figure 4:
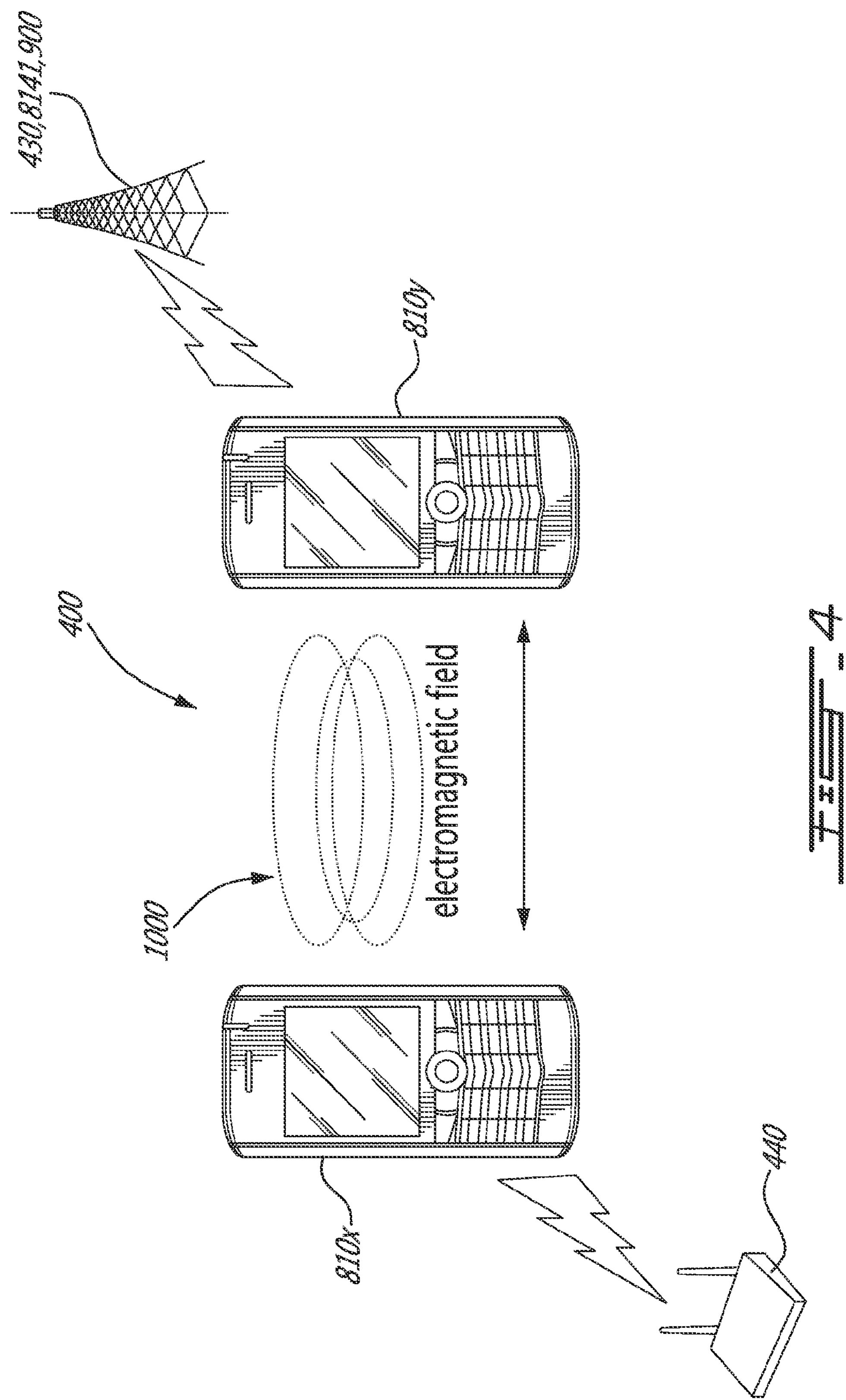
FIG. 4 provides a schematic illustration of an embodiment of a communication system suitable for use in implementing aspects of the disclosure.

FIG. 4 provides a schematic illustration of an embodiment of a communication system 400 suitable for use in implementing aspects of the disclosure. In the embodiment shown, system 400 is suitable for implementing peer-to-peer NFC communications between active NFC-capable devices 810, including, in the embodiment shown, two devices 810*x*, 810*y*.

Figure 5:
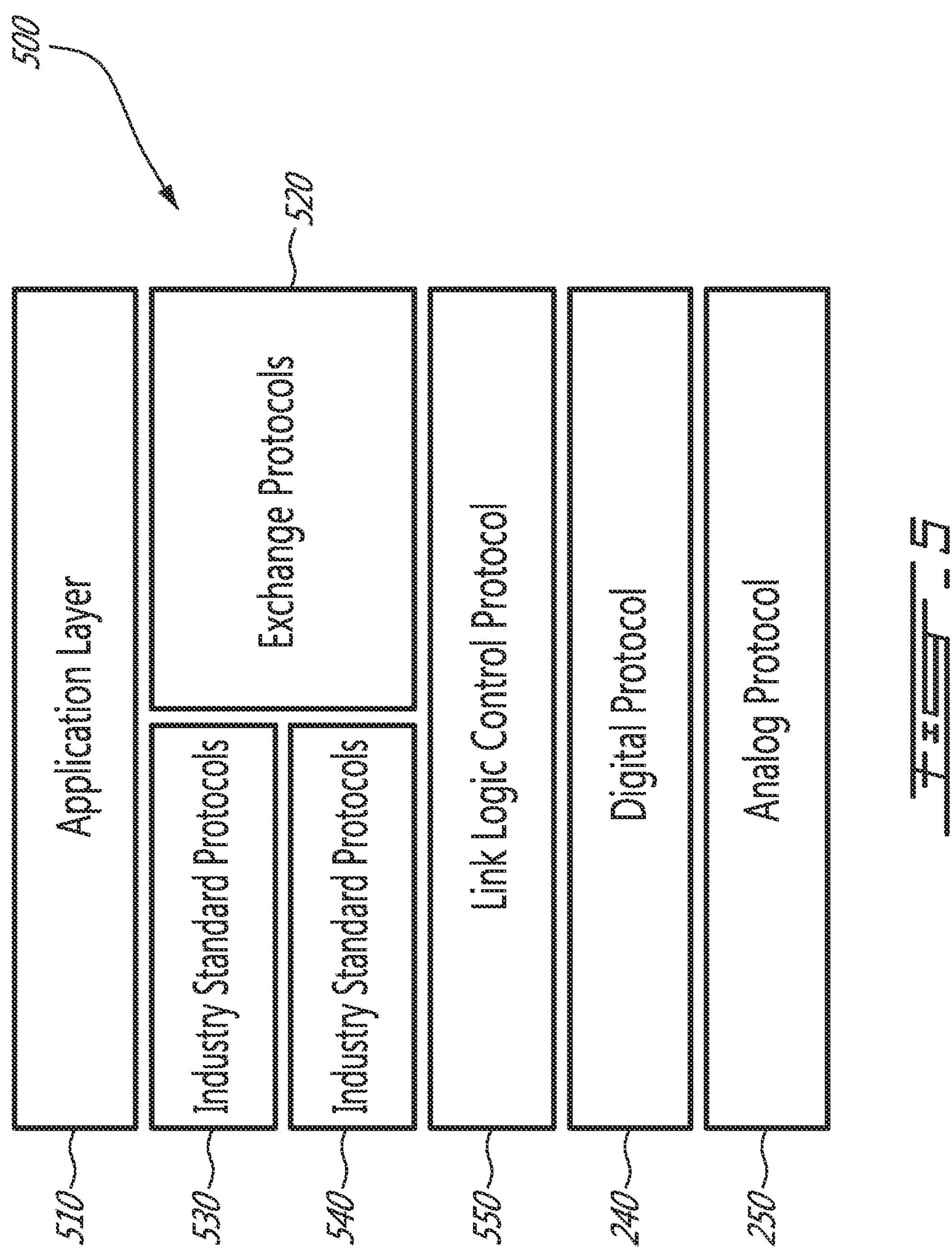
FIGS. 5 and 6 provide schematic diagrams of embodiments of stack architectures suitable for use in implementing aspects of the disclosure.

FIG. 5 provides a schematic illustration of an embodiment 500 of a stack architecture suitable for use in implementing communications using systems such as system 400 shown in FIG. 4. As previously noted, and using the example of system 400, one or more analog protocols 240 may be used to determine an operating range of either or both of NFC-capable devices 810*x,y*. One or more digital protocols 240 may be used to create a suitable communication environment by establishing, for example, polling cycles and collision detection sequence(s), in accordance with industry standards, for example. Further, link logic control protocol (LLCP) 550 may facilitate transfer of data between the devices when peer-to-peer or other suitable communication session(s) have been established. LLCP(s) 550 may, in part, define open systems interconnection (OSI) data link protocol(s) used to support the peer-to-peer or other communication. Further, either or both of protocols 540, 530, may include original vendor, industry, and/or other standard protocols and may interact with exchange protocol(s) 520, which may for example facilitate the exchange of messages between communicating devices (e.g. devices 810) and may allow for protocol(s) 540 and/or 530, for example, to run over LLCP 550. Any or all such protocol layers may contain or otherwise implement security keys, and may be used in authentication process(es) initiated between communicating devices. Further, application layer(s) 510 may run on top of each of protocols 540, 530 and 520 and may include code as described herein.

NFC-capable devices may operate in a great variety of communications modes, including many now known and many others which will doubtless hereafter be developed. For example, NFC-capable devices, including active devices 810, may operate in card emulation modes useful in commercial, access, and other secure information transactions, using a variety of digital and analog protocols now known and hereafter developed, including manners compatible with known industry standards. Such emulation modes may, for example, include proprietary contactless card/tag applications for payment, ticketing and building—or area access control processes.

Figure 6:
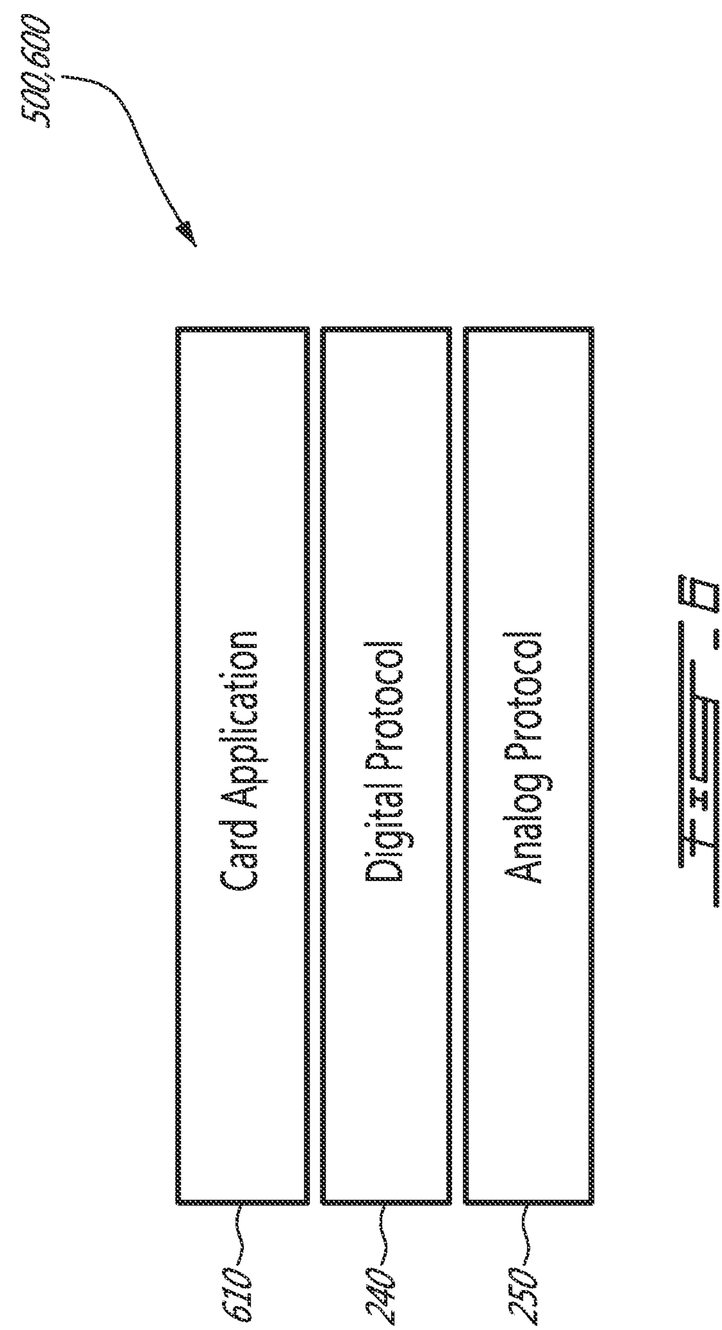

FIG. 6 provides a schematic illustration of an embodiment of a stack architecture 500, 600 suitable for use in implementing card emulation mode(s) for NFC communications, including for example reading of suitably-configured NFC tag(s). As illustrated in FIG. 6, protocol stack 600 for card emulation allows card application(s) 610 to ride on analog protocol(s) 250, which may be used among other purposes to determine the operating range of an NFC capable device, and digital protocol(s) 240, which may be used among other purposes to create successful communication environment(s) by establishing, for example, polling cycles and collision detection, in accordance with industry standards, such as, for example, those discussed herein.

As shown for example in FIG. 4, a first NFC capable device 810*x* may communicate via NFC communication process(es) with at least one other NFC capable device 810*y* when the devices are in sufficiently-close proximity to each other. Such interaction may be considered a peer-to-peer NFC interaction between the devices, even though each one of the devices may have the concurrent ability to communicate with other NFC and non-NFC capable devices using both NFC and other communication means. For example, as illustrated, NFC capable device 810*y* may be engaged in peer-to-peer communication with NFC capable device 810*x* while communicating with baseband access 430, such as a telephone (i.e., voice) system 8141 or other network 900, which may take the form of a cellular base station, for example. As will be appreciated by those skilled in the relevant arts, baseband communications may take place using various wireless communication means, such as CDMA, TDMA, FDMA, OFDMA, SC-FDMA, and other wireless protocols.

Similarly, NFC capable device(s) 810*x* may be communicatively coupled to one or more wireless local area networks WLAN 440, such as a Wireless Fidelity (WiFi) network, or a wireless wide area network (WWAN), such as 3GPP or 4G Long Term Evolution (LTE) (not shown), for example. By way of non-limiting example, and as will be appreciated by those skilled in the relevant arts, WiFi is typically deployed as a WLAN that may extend home and business networks to wireless medium and may follow standard(s) such as the IEEE 802.11 standard. Wireless communications connection(s) may also be established using, for example, short-range communications subsystem(s) which may for example include infrared device(s) and associated circuits and components as described above, and/or Bluetooth communications module(s), to provide for communication with compatibly-enabled systems and devices as well as NFC communications, etc. By way of further example, the herein disclosed devices, systems, and methods may utilize any short- and/or long-range communications subsystem(s) which enable communication between at least two devices, active and/or passive, whether proximate or not, including, for example, at least one server remote from a first device.

Figure 7:
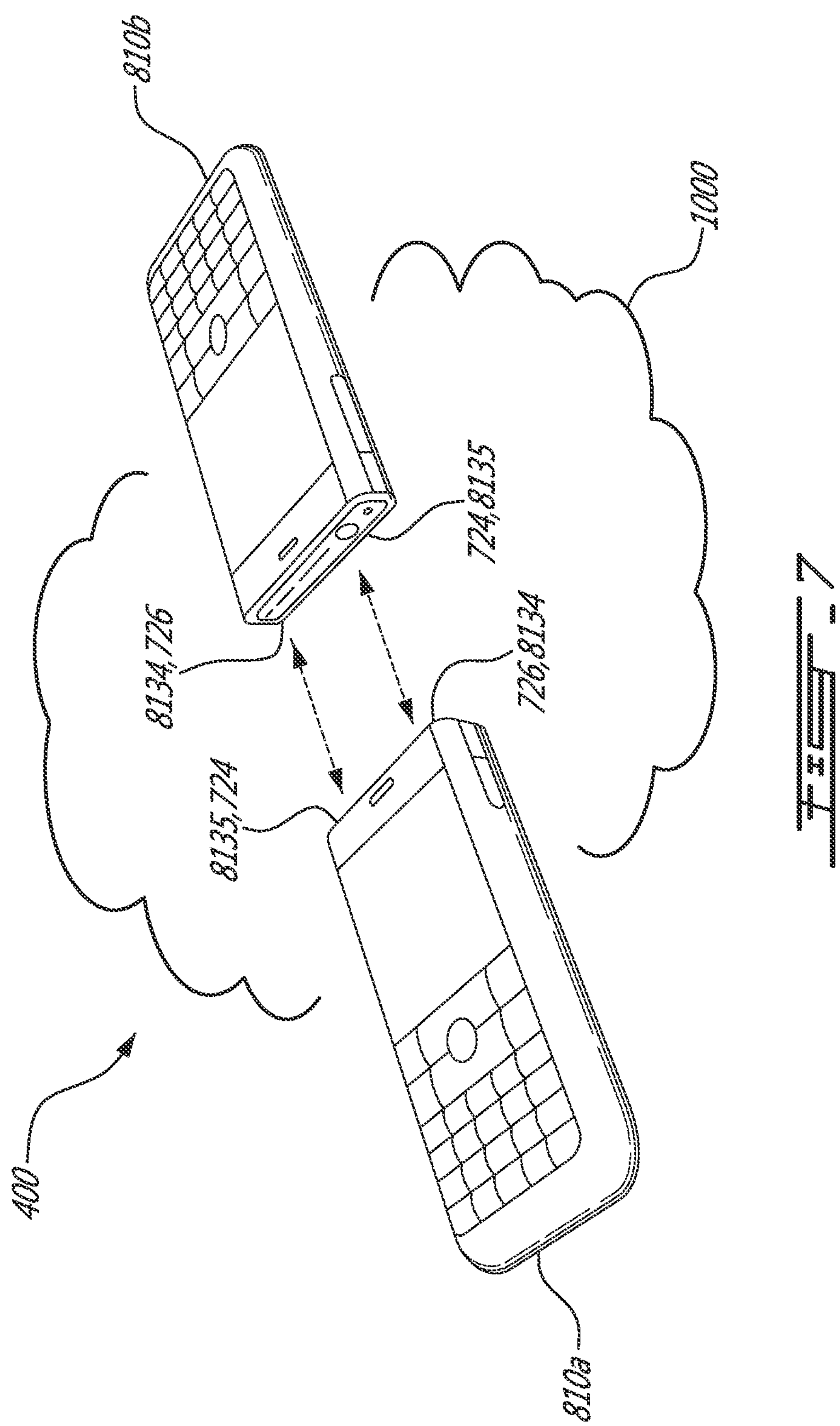
FIG. 7 provides a schematic illustration of an embodiment of a communication system suitable for use in implementing aspects of the disclosure.

FIG. 7 illustrates an example of two similar or otherwise compatible wireless communications devices 810*a*, 810*b* brought together, as for example through a physical movement or gesture towards each other, into sufficiently close proximity, including for example actual physical contact, in order to establish a simple interface and initiate a wireless NFC connection. The embodiment(s) discussed in connection with FIG. 7 are applicable to both active device(s) 810*a* and passive device(s) 850, e.g., tag(s), as discussed further below.

Physical placement of device(s) in close proximity to or contact with each other device can provide a suitable environment for establishment of simple and low-powered wireless connection(s), through employment of, for example, the Hall Effect, which, can be used, by for example means suitable magnetic field sensors, to trigger Bluetooth, WiFi, and/or other wireless NFC connections. In the example shown in FIG. 7, each device 810*a*, 810*b* is provided with a magnet 724 and an environment or field sensor 726,8134 such as a Hall Effect sensor. Such devices 810 may be matched by touch or gesture, sometimes termed a “kiss” or “tap” gesture because the two devices 810*a*, 810*b* typically lightly and briefly touch, or “kiss,” or “tap” each other or are very close and in adjacent proximity. An example of this adjacency may be proximity in the range of about less than 10 or 20 mm, depending on the strength of the magnet(s) 724 and/or sensor(s) 726, and in one example, about 7 mm or less between a tag 850 (e.g., FIG. 9) and a device 810, or between the two devices 810*a*, 810*b* in the illustration.

Sensor(s) 726 on each device may for example be aligned to one or more magnets 724 on the respective other device, as illustrated in FIG. 7. One device's sensor senses ("sees") the other's magnet via the Hall Effect, and a voltage or other field and/or signal variation from the sensor is transmitted to a processor such as one or more of processors 8180, 8132*a*, 8158, etc., in order to activate a Near Field Communication (NFC) circuit 8132 and communicates with the other device using, for example, protocol(s) associated with NFC Stack(s) 500, 600. The devices 810, 850, etc. can then read data from each other using NFC. Communications protocol data for wireless connection(s), such as the Bluetooth connection, can also be obtained based on data received using the NFC connection. For example, PIN numbers and security keys may be exchanged using NFC to establish a Bluetooth connection.

As will be explained in detail below, a communications device 810 may likewise establish communication with a passive peripheral 850, such as a tag, by placing the device 810 into close proximity or touching the device to the passive magnetic tag (NFC tag 850 in this example), thus initiating an NFC connection with the peripheral. As used herein, a passive magnetic tag, magnetic tag, or simply tag may refer to any of a variety of different devices, including NFC tags, RF ID tags, or other data storage devices with limited or passive transmission capability. If the tag 850 is blank, the tag may be programmed by device 810*a* in some cases. If the tag 850 is already programmed, the communications device 810*a* may overwrite information stored thereon, write additional information to the tag, and/or read information from the tag, which may lead to further action. For example, if the tag 850 is associated with a printer, the communications device 810 can run a print job on the printer, as discussed further below.

An advantage of such systems is that the Hall Effect can be used in passive mode, so as to avoid any requirement for the mobile wireless communications device 810, etc. to have the NFC or Bluetooth circuit 8102, 8132, etc., constantly "on," or continually powered, and thus avoid a constant or continual power draw. Only when, for example, a first communications device 810*a* determines ("sees") the presence of a magnet 724, such as on a second communications device 810*b* or passive tag 850, will the device 810*a* trigger the initiation of a wireless NFC or Bluetooth connection. Of note, the Hall Effect may require a closer contact than a typical NFC circuit, meaning that a deliberate "gesture" may be required in Hall Effect embodiments, such as requiring touching the two communications devices, or the device and the tag 850, together; but this effect may be used beneficially to control unwanted connections. Hall Effect embodiments thereby avoid accidental or invasive connections, such as when other Bluetooth-enabled devices are in the area, with which communications are not desired.

Figure 8:
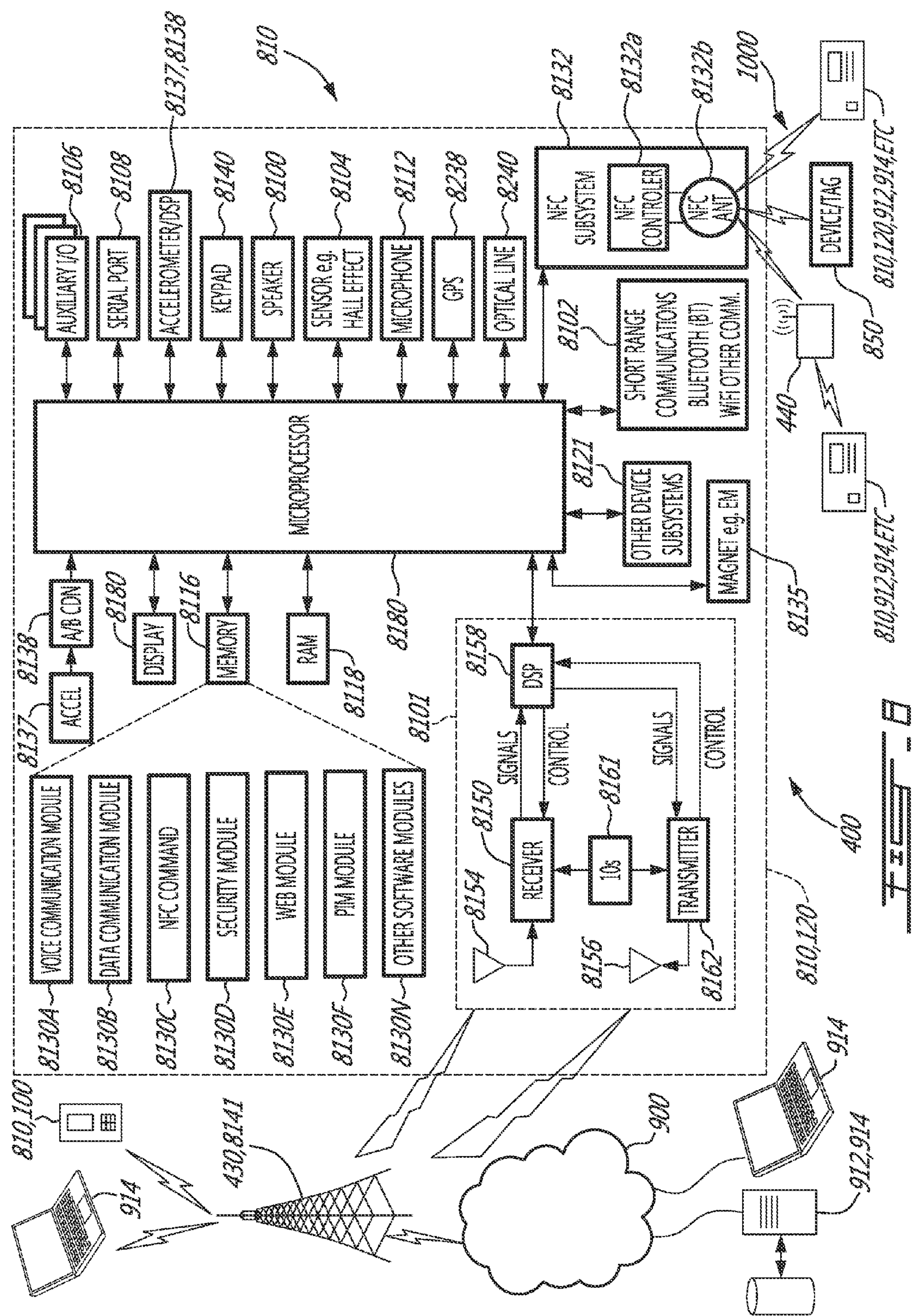
FIG. 8 provides a schematic illustration of an embodiment of a communication system suitable for use in implementing aspects of the disclosure.

FIG. 8 provides a further schematic illustration of an embodiment of a communication system 400 suitable for use in implementing aspects of the disclosure, including schematic details of an active NFC-capable device 810 suitable for use NFC and other communication interactions between the device 810 and other systems and devices.

In the embodiment shown in FIG. 8, an active wireless handheld device 810, 120 is configured for communication with a wide variety of external devices via a number of communications (sub)systems. For example, using an NFC (sub)system 8132, the device 810, 120 is configured to communicate with any one or more of passive NFC device(s) 850, such as RFID and/or other NFC tags; optionally non-mobile active device(s) 120, 850, 912, 914 etc such as stationary computers or other devices, including for example vendor point-of-sale transaction devices; and/or NFC-capable mobile devices 810, 120 such as smartphones and/or laptop, palmtop, and/or tablet computers.

As explained further below, the device 810 shown in FIG. 8 is further capable, via wireless network communications (sub)system 8101, 8102, of communicating with a wide range of devices, including for example server(s) 912 and/or other computers 914 via the Internet, the public switched telephone network (PSTN) and/or other wired wide-area or local-area public or private network(s) 900, 8141, 430, and/or one or more smartphones 810, computers 914, servers 912, and other active systems 120 via cellular and/or other wireless telephone networks. For example, an active NFC device 120, 810 may be communicatively coupled to one or more wireless local area networks (WLANs) 440, such as a Wireless Fidelity (WiFi) network, or a wireless wide area network (WWAN) such as 3GPP or 4G Long Term Evolution (LTE) network (not shown).

The embodiment of the mobile NFC-capable device 810, 120 shown in FIG. 8 comprises a range of functional components that may be included in, for example, smartphone embodiments of devices suitable for use in implementing the disclosure. In the example shown, a device 810, 120 includes, among other components, housing(s) 8120; input device(s) such as keypad(s) 8140, microphone(s) 8112, analog/digital (a/d) converter(s) 8138, touchscreen and/or other display(s) 8160, hall effect or other field/proximity sensor(s) 8134, 726, and optionally navigational/positioning aids such as global positioning system(s) (GPS(s)) 8238, optical or imaging reader(s) 8240, such as one or more digital cameras and/or barcode readers, quick response (QR) readers, or other scanners; output device(s) such as touchscreen and/or other display(s) 8160, speakers(s) 8110, and magnet(s) or other field/proximity generator(s) 8135, 724; and input/output (I/O) device(s) such as uniform serial bus (USB) auxiliary input/output port(s) 8106, parallel or serial port(s) 8108, NFC (sub)system(s) 8132, including Bluetooth and/or other short-range communication (sub)system(s), touchscreen display(s) 8160, and wireless/radio transceiver (sub)system(s) 8101.

As will be understood by those skilled in the relevant arts, device(s) 810, 120 may include any of a wide variety of these and other components and (sub)systems, in any desired combination(s); and they may interact in any of a wide variety of ways, in addition to those described herein.

As will further be understood by those skilled in the relevant arts, handheld device(s) 810, 120 can comprise any of a very wide range of mobile devices, including for example cellphones, smartphones, and other radio-based communications devices, as well as, in some embodiments, laptop, palmtop, and tablet computers. "Handheld" means portable and operable using one or both hands; and, in the case of smart phones, can but does not necessarily mean devices that are roughly the size of an average human palm.

One or more processors 8180, 8158, 8132(*a*), etc., working singly or in any desirable or otherwise suitable combinations, can use inputs generated and/or otherwise provided by any one or more of the various input device(s) 8140, 8112, 8138, 8160, 8134, 726, 8238, 8240, 8106, 8108, 8132, 8101, 8102, 8121, and locally and/or remotely-accessible peripheral devices 912, 914, such as printers, servers, telephones, computers, etc., to generate, according to suitably-configured logic rules, output signals suitable for processing by any one or more of the various output device(s) 8160,

8110, 8135, 724; 8106, 8108, 8132, 8101, 8102, 8121, and locally and/or remotely-accessible peripheral devices 912, 914, etc. . . .

Any or all of processor(s) 8180, 8132*a*, 8158, etc., along with any other desired components and/or (sub)systems incorporated by a device 120 may be protectively and/or functionally contained within housing 8120 (s) and coupled, as for example by means of suitably-configured buses, etc., between the various memory, input, output, and auxiliary devices (such as battery(ies), solar power generators, etc) in order to perform the functions disclosed herein. Processor(s) 8180, 8132*a*, 8158, 8102, 8121, etc., may be of any suitable form(s). For example, CPU(s) 8180 may comprise one or more microprocessors chip contained on or otherwise attached to one or more circuit boards within housing(s) 8120. CPU(s) 8180 can provide general command and control functions including, for example, operation of the display 8160, as well as the overall operation of the mobile device 810, in response to received information and inputs, such as in response to actuation of keys on the keypad 8140 by the user. Processors 8102, 8121, 8132*a*, 8158, etc., may be provided to control specialized functions such as operation of NFC and other particular communications channels.

Logic rules suitable for use by processors 8180, 8138, 8132*a*, 8102, 8121, etc., in generating such outputs can be accessed from any suitable locally and/or remotely located source(s), including, for example, any one or more applications modules 8130A-N, etc., as, for example, explained herein. Such rules and modules can be provided in any form(s) suitable for achieving the purposes addressed herein, including for example software instructions stored in transient (volatile) and/or non-transient (persistent) memory, firmware, and hard-programmed hardware device(s) or component(s) and configured for causing processor(s) 8180, 8132*a*, 8158, 8102, 8121, etc., to execute, singly or in combination, any or all of the process(es) described herein.

Memory(ies) 8118, 8116, etc., which can be of any form compatible with the purposes disclosed herein, including, for example, flash, EEPROM, RAM, ROM, disk, register, etc., can be accessed, controlled, and otherwise used 8180, 8158, 8138, 8132(*a*), etc., for reading data used in the various processes described herein, for storing output so generated, and for holding executable forms of suitably-configured application and/or module instruction sets. Such stored data may, for example include operating system, application, and other software executed by the processing device 8180, as well as inputs and/or outputs for such software.

As shown in FIG. 8, an active NFC device 810, 120 can comprise and/or otherwise support multiple communications abilities, and thus may have the ability to conduct concurrent communications sessions with other devices 810, 850, 912, 914, etc., using NFC, voice, and/or other communication means. For example, as illustrated, an NFC capable device 810 may be engaged in peer-to-peer communication with a second NFC capable device 810, while also communicating, via baseband access point 8141, 430, which may take the form of a cellular base station, for example, or devices or systems connected thereto, with a wide range of devices such as telephones 810, servers 912, computers 914, etc.

Long-range (e.g., cellular) voice and/or text communications processes may be provided for an active device 810, 120 by one or more wireless communications subsystems 8101, comprising transmitter(s) 8152, 8156, receiver(s) 8150, 8154, and digital signal processor(s) (DSP(s)) 8158.

Short-range communications may be provided by either or both of NFC subsystem(s) 8102, 8132, which may for example comprise dedicated antenna systems for short-range aspects; specialized memory device(s) 8116, 8118, and other device subsystems 8121.

Mobile NFC-capable device(s) 810, 120 in accordance with the disclosure may therefore be considered, in the examples shown, example, two-way RF communications devices having voice and data communications capabilities using RF circuitry. In addition, the mobile device 810, 120 may have the capability to communicate with other computer systems 810, 912, 914, etc., via the Internet or other network(s) 900. For example, a device 810, 120 may communicate with one or more servers 912, such as Internet servers, via RF subsystems 8101 and the associated components, including web module 8130E, and further via short-range communications subsystem(s) 8102, such as via web/browser module(s) 8130E. System(s) 8102 may include, for example, one or more Bluetooth communications modules for establishing Bluetooth wireless connection(s), and other communications modules, such as infrared modules or devices, WiFi circuits and modules, and associated components and circuits that may also form part of the RF circuitry.

Predetermined set(s) of applications that control basic and/or optional device operations, such as data and voice communications 8130A and 8130B, may be installed on the device 810, 120 during manufacture. Application modules 8130A-N may include native and non-native modules for security 8130D, Web interaction 8130E, social interactions or applications, and the like.

NFC communications module(s) 8130C may include any or all hardware, firmware, and/or software necessary or desirable for enabling NFC controller(s) 8132A (which may themselves include hardware, software, and firmware as required) working optionally in conjunction with microprocessor(s) 8180, etc., to perform NFC communications and/or any desired related tasks. For example, NFC communications module(s) 8130C may, in various embodiments, support responsive operability for tag 850 reads/writes, whether virtual or physical, by interacting with other modules and apps to affect data stored on tag(s) 850, and/or to obtain or write tag data. Such other modules may for example include web module 8130E, PIM module 8130F, and other software modules 8130N (such as apps and video players, by way of non-limiting examples). Microprocessor(s) 8180 may also cooperate with NFC module (s) 8130C, and with NFC subsystem(s) 8132, which may include one or more NFC chips comprising NFC controller(s) 8132*a*, and antenna(s) 8132*b* to facilitate communications with other active and/or inactive NFC device(s) 810, 850, as discussed herein. For example, an NFC communications module 8130C may allow a microprocessor 8180 to control the NFC subsystem 8132 and/or memory stores 8116, 8118.

In the same or other embodiments, the same or other NFC communications module(s) 8130 may execute and/or otherwise support any other desired NFC-related operations, including for example selection, modification, deletion, transmission, transfer, saving, duplication, deletion, and/or manipulate in any other desired manner, any one or more desired data sets 310, or assets, read from, writable to, or otherwise associated with any one or more NFC tag(s) 850 as described herein. For example, such NFC module(s) 8130 may enable generation and display of interactive graphical user interface(s) (GUI(s)) for use in such data manipulations, and/or associated read, write, and other processing operations, such as GUI(s) 200 described below.

NFC chips 8132*a* suitable for use in implementing aspects of the disclosure may include, for example, one or more PN531 microcontroller-based transmission modules produced by Koninklijke Phillips Electronics N.V. Such NFC chips 8132*a* may, for example, include both digital and analog circuitry, and one or more contactless Universal Asynchronous Receiver Transmitters (UARTs), cores, and host interfaces. Incorporated circuitry may include output drivers, integrated demodulators, bit decoders, mode detectors and RF-, magnetic, and/or level detectors as suitable. Suitable contactless UARTs may include elements for data processing, Cyclical Redundancy Checking (CRC), parity generation, framing generation and check bit coding and decoding, and/or other functions. Cores may, for example, include one or more 80051 microcontroller, 32 Kbytes or other amounts of ROM and, one Kbyte or other amounts of RAM, for example. A set of host interfaces may interface with the microprocessor and interface according to such known standards as I2C, serial UART, SPI and USB. NFC circuits may be tuned to any frequency(ies) suitable for accomplishing the purposes disclosed herein, as for example about 13.56 MHz.

NFC (sub)system(s) 8132 may comprise and/or otherwise cooperate with one or more magnets/magnetometers or other magnet sensors 8134, such as Hall effect sensors 8134, 726, communicatively connected to the microprocessor(s) 8180, 8132*a*. Sensor(s) 8134 may include components suitable for operation as a Hall effect sensor 726, including any necessary coils or other circuits. There is also illustrated a magnet/magnetometer 8135, 724 that, in various embodiments, may be advantageously be provided in the form of one or more electromagnets and may operate with microprocessor(s) 8180, 8132*a*, etc., to allow one or more alternate communications pathways using electromagnetic energy, which may be changed to correspond to changing data. Electromagnet(s) 8135, 724 may perform a variety of different functions, including working as an active or passive device in association with other components of the device 810. For example, when an electromagnet 8135, 724 is used instead of a permanent magnet (non-electromagnetic) in the devices of FIG. 3, a pulse of energy may be delivered to a Hall effect sensor 726 in another device 810, 850. The other device receiving the pulse may accordingly activate its NFC circuit. A WiFi connection, for example, in the alternative may be established if an NFC and/or Bluetooth connection is not established. Other modules 8130N may include, for example, software that interoperates with the magnetic sensor 8134 and any magnet or electromagnet 8135 or other magnetic circuitry that may be included within the overall electromagnet 8135.

Figure 9:
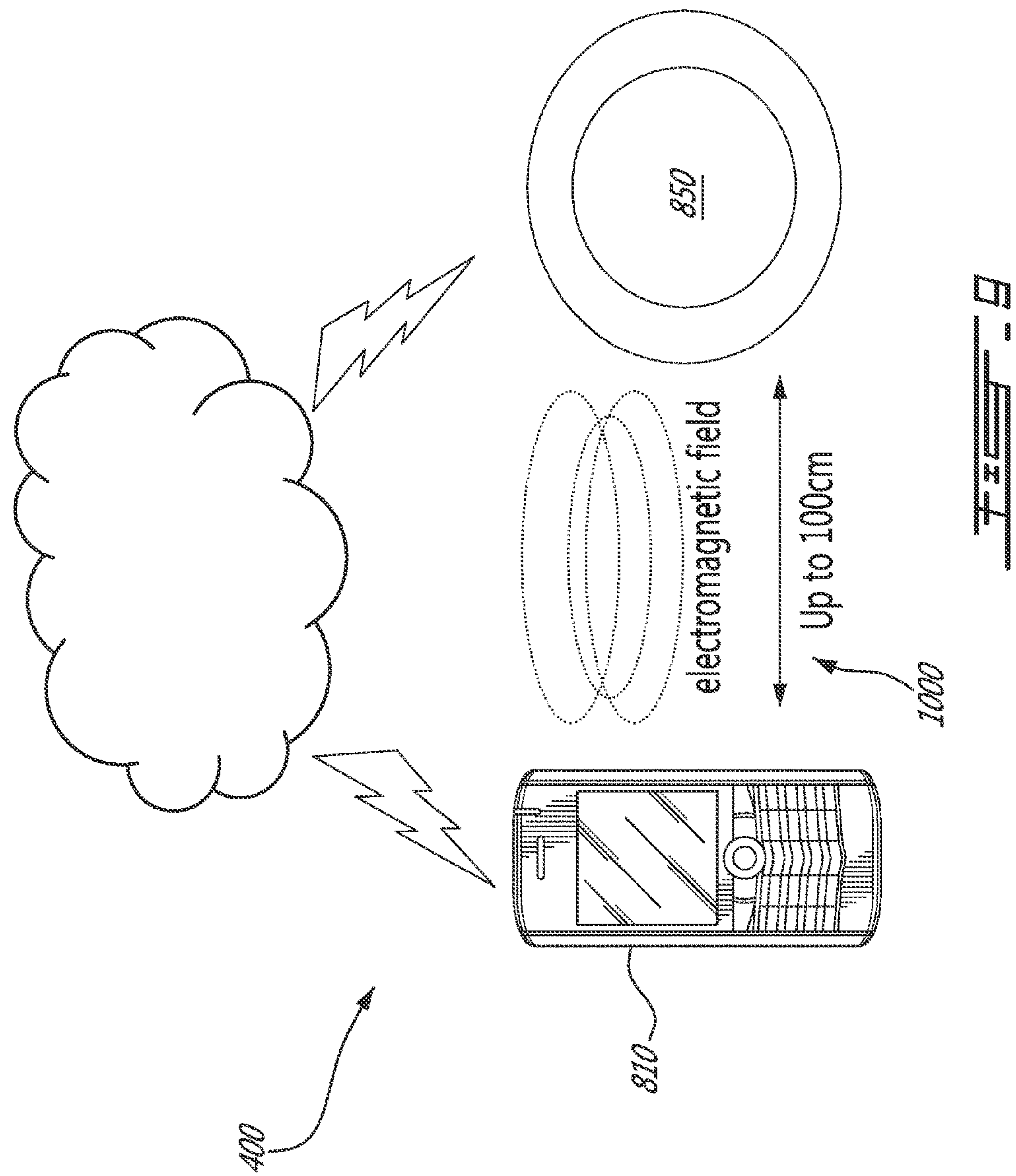
FIGS. 9-11 provide schematic illustrations of embodiments of communication systems suitable for use in implementing aspects of the disclosure.

Accelerometer(s) 8137 and analog/digital converter(s) 8138 may be connected to the microprocessor 8180 as illustrated, and may allow another implementation of the NFC automatic tag detection (and automatic peer-to-peer detection). The accelerometer 8137 can be used, in conjunction with processor(s) 8180, etc., and suitable module(s) 8130N, to recognize the tapping of a communications device against a tag or another device, thus recognizing at least one vibration. Instead of, or in addition to, using the Hall Effect sensors 726 and magnets 724 to wake up the NFC circuit, the circuit can use tap recognition vibration sensors in the form of, for example, algorithms processing data provide by accelerometer(s) 8137. It should be understood that when the device is tapped against another object, for example, an NFC tag 850 as illustrated in FIG. 9, a data transfer set-up profile may generated as a matter of predetermined accelerometer parameters being met or exceeded. If such a profile is compared against a known tap profile, it will wake the NFC circuit and initiate communication. In other embodiments, accelerometer 8137 may be part of a motion sensor system, and other motion sensor systems other than an accelerometer may be used such as a cadence sensor or cadence detection system.

As will be appreciated by persons skilled in the relevant arts, an accelerometer is a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals, depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface.

Accelerometers suitable for use in implementing the disclosure may be of any suitable form, including, but not limited to, capacitive, piezoelectric, piezoresistive, and/or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

In addition, personal information manager (PIM) application module(s) 8130F may comprise one or more native modules installed during manufacture; and/or user-specific modules implemented on removable memories such as micro SD cards, etc. PIM (s) 8130F may be capable of organizing and managing data items related to, for example, specific users, such as email, personal or business contacts, financial accounts, calendar events, voice mails, appointments, and task items. A PIM application 8130F may also be providing and/or receiving data transmitted by via wireless network 40, 8141, and, for example, web module(s) 8130E. PIM data items may be seamlessly integrated, synchronized and updated via such wireless network(s) with the device user's corresponding data items, such as may be stored locally in memory(ies) 8116, 8118, etc., and/or in the cloud or as may be associated with a host computer system, for example.

Communication functions, including data and voice communications, may be performed through communications subsystem(s) 8101, and/or through the short-range communications subsystem(s) 8102. The specific design and implementation of the communications subsystem(s) 8101, 8102 may be dependent upon the communications network(s) and/or environments 8141, 430, 900 in which the mobile device 810 is intended to operate.

Such communication functions may, as referenced above, be carried out by software/instruction/data module(s) 8130B, voice module(s) 8130A, and/or web module(s) 8130D, including at the instruction of or through other cooperation with NFC module(s) 8130C, 8102, 8132, etc., in accordance with the disclosed embodiments, with security for these communications, such as in the granting of access to PIM module 8130F, overseen by security module(s) 8130D. Security module(s) 8130D may include one or more native or non-native security applications, including anti-virus/anti-malware applications or functions, and may provide protection for PIM information via applications or functions 8130A-N, and be applied during external interactions such as during NFC or Web communications processes, for example. Accordingly, security module(s) 8130D may allow for degrees of security in interacting with other devices, such as the aforementioned tags, and/or other devices such as servers (herein defined to include any device acting as an Internet, intranet, extranet, or other public or private network node, host, server, or the like), and particularly with devices, components, or other aspects of devices that enable the occurrence of communication exchanges by the device occur over a network 900, such as the Internet.

As previously noted, NFC processes may be conducted according to any of a wide variety of wireless, short-range communications protocols. Such protocols typically comprise sets of standards to enable devices 110, 120, such as smartphones and the like, to establish radio communication with each other by bringing them into close proximity, or by touching them together, and thereafter communicate clearly and efficiently. Applications of such processes include wireless data transactions and simplified setup of communication sessions involving communication technologies such as Wi-Fi and Bluetooth. Communication is also possible between a powered NFC device and a powered or unpowered NFC "tag" or button. Suitable standard currently in use are have been p promulgated by the NFC Forum, which was founded in 2004 by Nokia, Philips and Sony, and which now has more than 160 members. The NFC Forum also promotes NFC and certifies device compliance.

Standards have been developed that cover both NFC Forum—sanctioned communication protocols and other short-range wireless data exchange (NFC) formats. Specifically, an example of NFC standards ISO/IEC 18092/ECMA-340; Near Field Communication Interface and Protocol-1 (NFCIP-1); ISO/IEC 21481/ECMA-352; and Near Field Communication Interface and Protocol-2 (NFCIP-2). NFC also encompasses a variety of pre-existing standards including ISO/IEC 14443 both Type A and Type B, and FeliCa. The standards specify the NFC air interface, modulation schemes, coding, transfer speeds, and frame format of the RF interface of NFC devices. The standards also comprise initialization schemes and conditions required for data collision-control during initialization for both active and passive NFC modes. In addition, they define a transport protocol, including protocol activation and data-exchange methods.

NFC protocols sanctioned by the NFC forum typically operate within a globally available and unregulated radio frequency band of 13.56 MHz, and generally have a working distance of up to about 20 centimeters. Three data rates are currently defined in the NFC standards: 106 kilobits per second (kbit/s); 212 kbit/s; and 424 kbit/s.

In addition, the NFC Forum has defined a common data format called NFC Data Exchange Format (NDEF), which can store and transport various kinds of items, such as MIME-typed objects and URLs. The NFC Forum also added the Simple NDEF Exchange Protocol for sending and receiving messages between two NFC-enabled devices. As will be understood by those skilled in the relevant arts, the NDEF protocol is compatible with, for example, stack architectures 200, 500, 600 and data record format(s) 310.

All of the above-mentioned standards and formats, along with any other existing and applicable NFC standards, are incorporated herein by reference as if fully set forth in their entirety, in their finalized condition.

Both passive and active communications modes have been defined. In active communication modes, both an initiator device and a Target device may generate their own NFC fields 1000 (see e.g., FIGS. 4 and 7). The initiator device may start the NFC communication, with the target device responding to commands received from the initiator device, as appropriate, by modulating the NFC field 1000 generated by the Target device.

Between two active NFC devices 810, either or both devices can act as either initiator or target. In passive communication mode, one of the devices lacks 850, or does not employ, an ability to independently create an electromagnetic NFC carrier field 1000, and therefore generally does not serve as an initiator.

Figure 10:
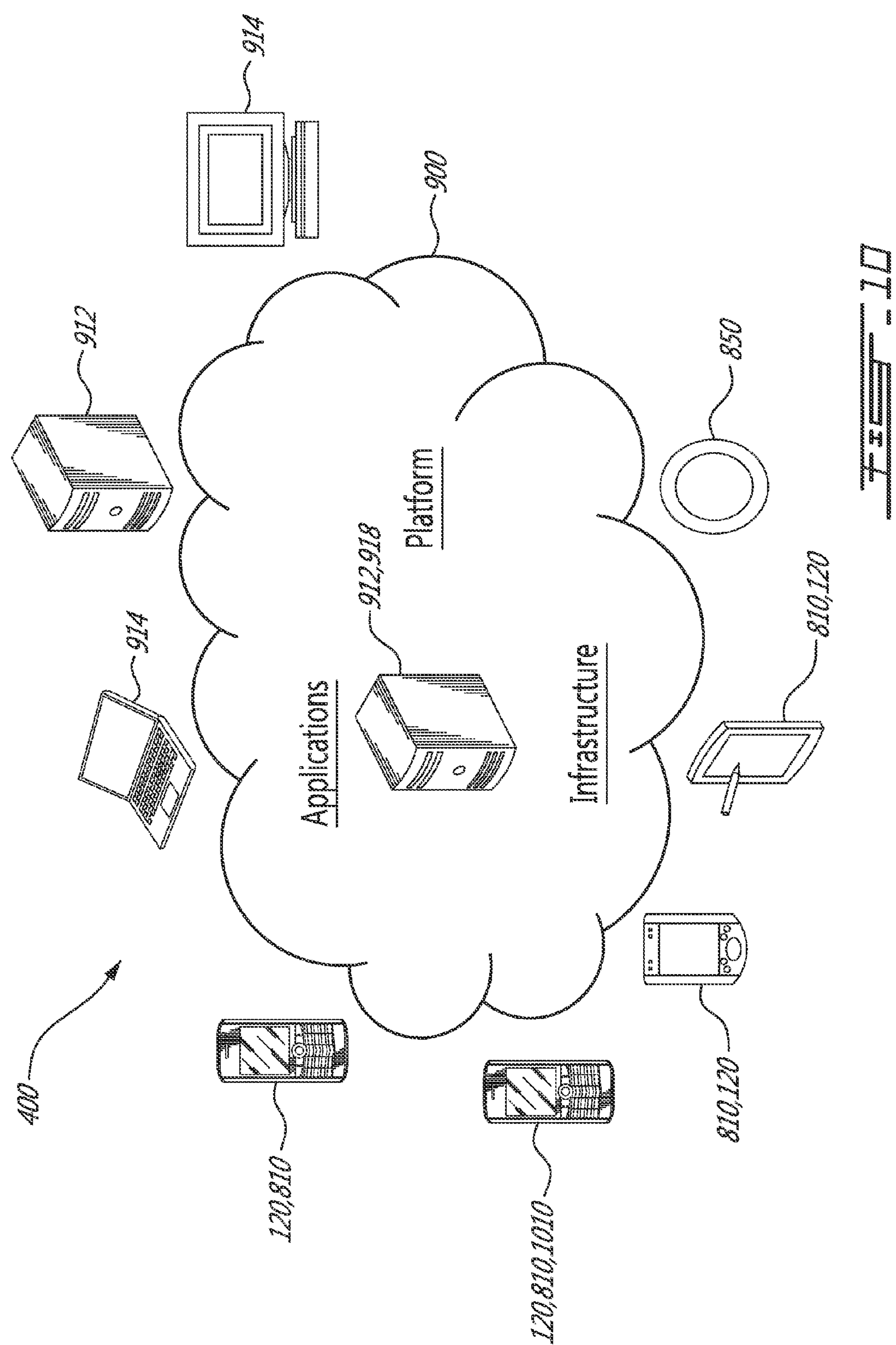

In the embodiment of a system 400 shown in FIG. 10, aspects of server(s) 912 are expanded, and as shown include an infrastructure model which may for example logically assign fault tolerance concerns within a software layer to provide, among other things, load balancing both internal and external to the cloud, thus allowing for more intelligent resource allocation, and a reduction in hardware needs, which may reduce costs, downtime issues, and which may increase communication efficiencies (including the speed of communication). In general, the provisioning of a cloud server 912, 918 may include at least one node server running at least one Cloud OS, for example. Through access as described herein, devices such as, for example, laptops 810, 914, 120 servers 912, desktops 914, active ones of tags 850, tablets 810, 914, 120 and mobile devices 810, 120 may communicate with the at least one node server 912, 918. The server 912, 918 may include applications for such things as, for example, monitoring systems (for both content and service), content storage and management, collaboration, security modules, communications modules, and/or at least aspects of native/non-native applications. As used herein, native applications include applications included with or published by an NFC device original equipment manufacturer (OEM). Non-native applications are typically applications provided by third party developers or vendors, not the OEM. At least one platform level may include the provisioning of any one or more of at least the following resource types: database, queue, runtime, identity and object storage, for example. Further still, and as discussed herein, a server 912 may include infrastructure including, for example, any one or more of least one the following: processors, block storage, network and a node servers.

As previously noted, systems 400, and devices 810, 120, 850, 912, etc., in accordance with the disclosure can be used to significant advantage in a very wide variety of applications. As a particular example, the disclosure herein provides improved methods for making and writing data to smart posters, and for systems 100 and devices 810, 120, 850, useful for making and writing data to such posters.

The present disclosure is directed to near field communication (NFC) processes, and more particularly to creation, storage, and other management and processing of data representing device-executable and/or other-machine-executable instruction data sets, and/or associated content, which are sometimes called "actions," for NFC-capable devices, including passive NFC devices 850, such as tags, and making such data available for reading and/or execution by active NFC device(s) 810, 120. Such instruction sets and/or content may comprise data, including for example URLs and/or other Internet or other address or reference data useful for referring a device 810, 120 to one or more remote networked resource(s) 912, 914, etc. Reading and interpretation of such instruction data sets may alternately, or in addition, cause suitably-configured processor(s) 8180, etc., invoke or otherwise access one or more local and/or remote application(s), and/or other local and/or remote resources, for execution. Locally-executed applications can for example include any one or more applications stored in module(s) 8130A-N; remote application(s) can include any one or more applications stored on any one or more of servers 912, devices 914, 810, 850, etc.

Thus, for example, a cloud-based server 912, 918 referenced by an NFC tag 850 (also referred to herein simply as a "tag"), may store, and make available for access by any one or more devices 810, 120, any desired actions, and/or content, and thus may be used in reading, creating, updating, reprogramming, or otherwise processing actions by an owner, administrator, or other authorized accessor operator of the NFC tag 850 (hereinafter also referred to as a "tag owner" or "tag creator") occasionally and/or in accordance with a predetermined schedule or in real time.

Content and actions provided in accordance with the disclosure may be secured and/or otherwise protected at and between various nodes 912, 914, 918, 850, 812, 120, etc., within a system 400, and may be used by, uploaded from, and/or discernable to one or more native device software applications 8130A-N, and/or one or more non-native apps (collectively, hereinafter "apps").

Actions, or coded instruction sets, suitable for use in implementing the disclosure may, for example, include machine-executable instruction(s) for any act(s), modification(s), indication(s), or other occurrence(s), and/or other device- and/or machine-executable instruction(s) which may be performed by any one or more device(s) 810, 120, 912, 914, etc., either in hardware, software, or firmware. By way of non-limiting examples, actions, as used herein, may include generating, reading, and/or sending e-mail(s); displaying information (such as a note or advertisement); navigating to, reading data from and/or writing data to any one or more network addresses (such as an Internet Protocol address or other reference); instantiating or invoking a media player and playing media; updating a calendar, voicemail, social media or other personal or device profile status; launching an instant messenger and/or reading or creating an instant message; downloading a file and/or an application; changing a device control profile, such as a user preference profile for a wireless communication device 810, 120, etc., or a control profile for a home, office, vehicle, or other environmental control system, such as heating/air-condition system(s), interior/exterior lights, burglar alarms, etc.; creating a post (such as to a blog, Facebook, or Twitter, for example); sending an address or other location or contract identifier, or importing or exporting data associated with one or more business or personal contacts; performing a function in a non-native application; dialing a phone number; generating a hardware action (buzzing, ringing, lighting, etc.), or the like.

Among the many uses to which system(s) 400, and/or device(s) 810, 120, 850, etc., and corresponding modules 8130C, 8130N, 8132, etc., according to the disclosure may be put is the creation, modification, organization, reading, reviewing, writing, and other processing of type, content and/or instruction data suitable for use in creating, modifying, and otherwise managing or administering near field communication (NFC) devices such as passive NFC tags 850.

Figure 11:
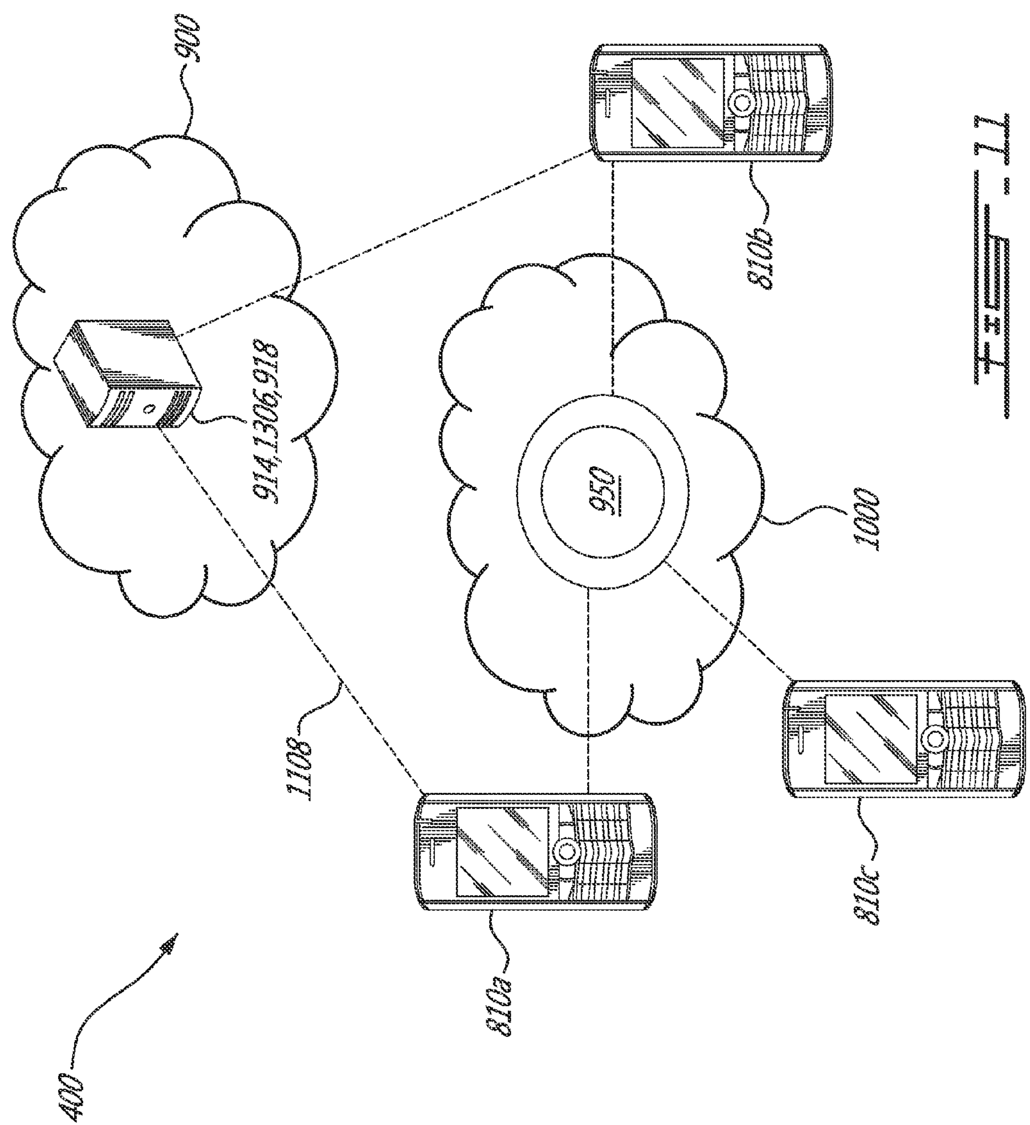

In FIG. 11 is illustrated a schematic network diagram showing a network, or system, 400 suitable for use in implementing aspects of the disclosure. In the embodiment shown, system 400 comprises a plurality of mobile devices 810*a*, 810*b*, 810*c*, at least one NFC tag 850, and communicative connection(s) 1108 between the various devices and one or more servers 912, 918. As previously noted, mobile devices 810 of FIG. 11 may be of any type compatible with the purposes disclosed herein, including, by way of non-limiting example, the Blackberry Bold 9900.

As for example illustrated in the network diagram of FIG. 11, one or more devices 810, 810*c* may interact with NFC tag(s) 850, and may access thereon, and/or otherwise obtain therefrom, data and/or other information, including for example tag identifier data and at least one content data record.

Tag identifier data can, for example, comprise any data useful for uniquely identifying the accessed tag(s) as individuals, or as belonging to any one or more defined or definable types or sets. Both individual tags and/or sets or types of tags can be of any suitable protocol(s) or format(s), and can serve to identify individual and/or groups of tags 850 on any desired bases, including for example all or all of the various types described herein.

Content data record(s) can comprise any data useful for enabling any or all of processor(s) processor(s) 8180, 8132*a*, 8158, etc., to access image, text, audio and/or other content for any of the purposes disclosed herein. For example content data record(s) stored on and/or otherwise accessible via NFC tag(s) 850 can comprise any one or more of image(s), text, audio or other displayable or renderable content data set(s), and/or any one or more resource identifiers associated with memory storing content data where, for example, the content data is not stored on the tag(s) 850 themselves. For example, a resource identifier can comprise a URL or other Internet Protocol (IP) or other address data useable by any one or more of processor(s) 8180, 8132*a*, 8158, etc. to access and display, play, and/or otherwise process content associated with the resource identifier. Such content may be stored in any one or more resources accessible by the processor(s) 8180, 8132*a*, 8158, etc., including for example any one or more of memory(ies) 8118, 8116, etc., and/or any one or more remote networked resources 912, 914, etc., via one or more communication links 1108.

As an example, a device 810 can access data stored on a tag 850, the stored data being formatted according to the protocol shown schematically in FIG. 3, the data stored in a record 310 comprising a record or item R1 comprising tag identifier data, and one or more data content records R2 . . . Rn comprising text, image, and/or audio or other content, and/or resource identifier(s) associated with such content. Each Record or item R1 . . . Rn can comprise a header, payload, etc., suitable for accomplishing the purposes disclosed herein.

The disclosed embodiments may be operable using active or passive NFC tags 850. As used herein, an active tag is an NFC tag 850 comprising an independent power source, or otherwise capable of operating pursuant to its own power. A passive tag 850 is one that operates responsive to the providing of an electric field or other form of energy from an active reader device 810, etc. Further, for the purposes of this disclosure, tags 850 may also be switchable between, or otherwise comprise, active and passive modes or states, such as responsive to the presence of a particular reader in proximity to the tag.

Moreover, the term "tag", as used herein, may, depending upon context, refer to either or both of physical NFC tags 850 and virtual tags, which virtual tags may reside on or within a device 810, 850, 912, 914 etc, in the form of one or more suitably-formatted data records 310, and which, although not necessarily read from or written to a physical NFC tag 850, may be treated by a processing device 810, 912, 914 etc., as having been read from or written to a physical NFC tag 850. That is, a virtual tag 310 is a tag data set 310 that may, for example, be organically read or written internal to a device 810, e.g., from any one or more of memory(ies) 8118, 8116, etc., and/or which may result from reading of a physical tag, and/or that may have been generated for the purpose of being written to a physical tag. For example, although a virtual NFC tag 310 may or may not interact with an NFC (sub)system 8132 such as that shown in FIG. 8, actions undertaken in accordance with a virtual tag data set 310 and information read from or written to a virtual NFC tag may interact with, or cause interaction with, the remaining elements and systems of a device 810 of FIG. 8, and/or device(s) 912, 914, etc. in the same manner as would be effectuated by a read from or write to a physical NFC tag, including interacting with NFC module 8130*c*, and with other modules out inputs/outputs of device 810 at the direction of NFC module 8130*c*.

Physical NFC tags 850 suitable for use in implementing any aspects of the disclosure may be of any suitable type(s), including a wide variety now known to those skilled in the relevant arts, including but not limited to NFC tags, radio frequency identification ("RF ID") tags, 2D barcode tags, 3D barcode tags, QR code tags, holographic tags, or the like, that are capable of being read by a reading device. Doubtless other suitable types will hereafter be developed. Accordingly, in various embodiments and as otherwise noted herein, tags 850 may also include one or more of the foregoing when provided from one mobile device to another, such as in the embodiments of FIGS. 4 and 7, and as discussed further below.

By way of non-limiting example, and as referenced above, mobile device(s) 810 can include one or more NFC transceiver modules or (sub)systems 8132, and/or associated application(s) 8130A-N, including for example one or more NFC communications modules 8130C, suitable for interactions with physical and/or virtual smart-tags, smart accessories, and other NFC enabled devices and data sets 810, 850, 310, etc. That is, NFC smart tag application(s) 8130 may form part of and/or otherwise cooperate with one or more NFC communications module 8132 and may interact externally with device(s) 810, such as through a suitably-configured NFC transceiver subsystem 8132, with one or more virtual and/or physical tags 850, 310, and may interact internally with its own various components, including for example with any of the various (sub)systems, components, models, and devices shown in FIG. 8.

By way of non-limiting example, certain Blackberry® devices from Research in Motion Limited of Ontario, Canada, are equipped with embedded, native Smart Tag applications 8130C, N suitable for reading and/or otherwise accessing data sets 310 stored on NFC tag(s) 850, and optionally storing identical and/or otherwise corresponding data sets in any one or more memory(ies) 8116, 8118, wherein the Smart Tag application 8130C, N may provide for display on the device display 8160 of certain of the data 310 that is read/written/stored in relation to the tag. As used herein, a native application can include, as would be understood by those skilled in the relevant arts, an application designed for use on a particular device or platform. Further, an embedded application, as used herein and as would be understood by those skilled in the relevant arts, can include any application(s) embedded in the operating system(s) for a particular device or platform 810, 912, 914, 1306, etc. Although certain of the examples discussed herein may be made in reference to embedded and/or native tag reading and display applications, those skilled in the relevant arts will appreciate in light of the disclosure, that the embodiments described may similarly be employed with suitably-configured non-native and/or non-embedded NFC reading and display applications.

As a further example, one or more virtual and/or physical tags 310, 850 may be used to set up, invoke, or otherwise initiate a Bluetooth audio connection controllable through a communications (sub)system 8102, etc. of a device 810 An NFC tag reading application 8130 of a device 810 may, for example, detect a suitably-configured smart-tag 850, 310 via NFC (sub)system 8132 and/or by causing a processor 8180 to access a suitable data set 310 in a memory 8118*m* 8116 of a device 810, and may cause a display 6160 to present a graphical user interface (GUI) indicating to a user that pairing has been initiated, and thereafter the device 810 may begin streaming or otherwise processing content data representing audio signals for output by associated Bluetooth-enabled speakers.

Further, such pairing information, and/or a URL "pointer" or other address or reference information associated with suitable pairing information, once read from an appropriate source, may be stored by a device 810, 912, 914, etc., in desired memory, either locally and/or remotely (such as in the cloud), for example in a suitably-configured log or table, i.e., suitably configured or formatted data base or data set, with desired or otherwise suitable flags or other data associations, such that tags 310, 850 may be read or otherwise processed according to any desired categorization(s), such as for subsequent display to any desired user(s). Accordingly, at any convenient or otherwise desired time, a user may access a tag data set 310 associated with a tag or category of tags, which has/have been stored, and perform any desired pairing or other processing anew, without need to re-read the tag(s). This may be advantageous at least because physical NFC tags 850, being typically designed to facilitate transfer of small amounts of data over short distances from the tag to mobile device(s) 810, may be limited to transmitting data such as the discussed Bluetooth pairing information, a web address wherefrom a user may retrieve additional information, such as may be indicated from a smart poster tag, geo-location information, contact information, and/or identification information, such as for a smart-dock.

Data transfer from an NFC tag 850, 310 may be limited in size and transfer rate, for example due to the limitations of the NFC tag's 850 transmitter and/or the NFC tag's storage capability. Consequently, the embedding of rich media, such as images, video, and the like on standard physical NFC tags may be inefficient, impractical, or even impossible or otherwise undesirable. Accordingly, the simultaneous display of a variety of different tag reads and writes performed by a mobile device's NFC tag application may be of limited use.

Among other functions, NFC module(s) 8130C, processor(s) 8180, 8132*a*, 8158, etc., and/or other component(s) of devices 810, 912, 914, 1306, etc., may enable and/or otherwise facilitate may allow for creation, modification, categorization, logging (i.e., categorizing and storing in memory), display, and other processing of data sets 310 suitable for read/write operations in connection with physical NFC tags 850. This can, for example, enable the use of data read from and/or written to tag(s) 850 when proximity to a physical tag 850 is no longer available, or access to physical tag(s) is otherwise not possible. Such an NFC module 8130C (which may operate, for example, in conjunction with a tag logging application and/or other applications and modules 8130N) may, for example, visually divide (i.e., parse and separately store separate items R1, R2, RN of a data set 310 and categorize/log the read or written tag information, by, for example associating one or more default, user-defined, and/or otherwise determined flags or category identifiers with such sets 310 and/or records R1, R2, RN, etc.

Category identifiers associated with records/sets 310 and/or items/records R1, R2, etc. may, for example, may be associated with any desired types or categories of data useful for organizing, presenting, displaying, and/or otherwise processing sets of data records 310, including for example categorizations indicating data content type, such as image, text, audio; source, such as names of private and/or public entities, individuals, groups, etc.; user-preferred categorizations such as 'preferred,' disfavored, etc.

As such, in some embodiments, an NFC module 8130C may direct storage of tag data 310 and other information (e.g., comprising simple tag data assets and/or pointers/indicators from a tag of large data assets not suitable for storage on a physical tag 850) in an internal tag log record that may point to the storage location of data assets for retrieval by a smart tag application. Such tag log(s) may thus point or otherwise refer to local, on-device storage for certain data assets, and/or may point to addressing stored internally that leads to rich data assets stored remotely.

The creation, modification, organization, review, and other processing or management of data sets 310 suitable for storage and/or other use in combination with tag(s) 850 and other devices may be facilitated by, among other activities, accessing, combining, generating, and/or otherwise defining data which can be used to access, generate, and/or otherwise define presentation schema representing individual or pluralities of tag(s), according to, for example, type, category, and/or content. Such presentation schema can, for example, comprise any desired and/or otherwise suitable graphic, text or other display element(s), and feature(s) and/or characteristic(s) thereof, and may be defined according to any desired, convenient, and/or otherwise suitable criteria.

For example, presentation schema can comprise any desired text, graphical, audio, video, and/or other elements, and can include for example distinct or otherwise desired color schemes, thumbnail or other images, including images thematically related to content included by or otherwise associated with any or all data of one or more set(s) 310.

As noted above, presentation schema suitable for use in implementing such aspects of the disclosure can comprise any graphical, text, or other element(s), including any desired and/or otherwise suitable displayable object(s) (which can also be referred to as graphical object(s)) of any suitable format(s), including for example file folders icons, image tiles, color coding, recognizable icons for tag type, combinations thereof or the like. Such graphical objects may, for example, include both textual and graphical elements, and may be associated with audio data such as various types of alerts, etc. if/as desired.

Figure 16:
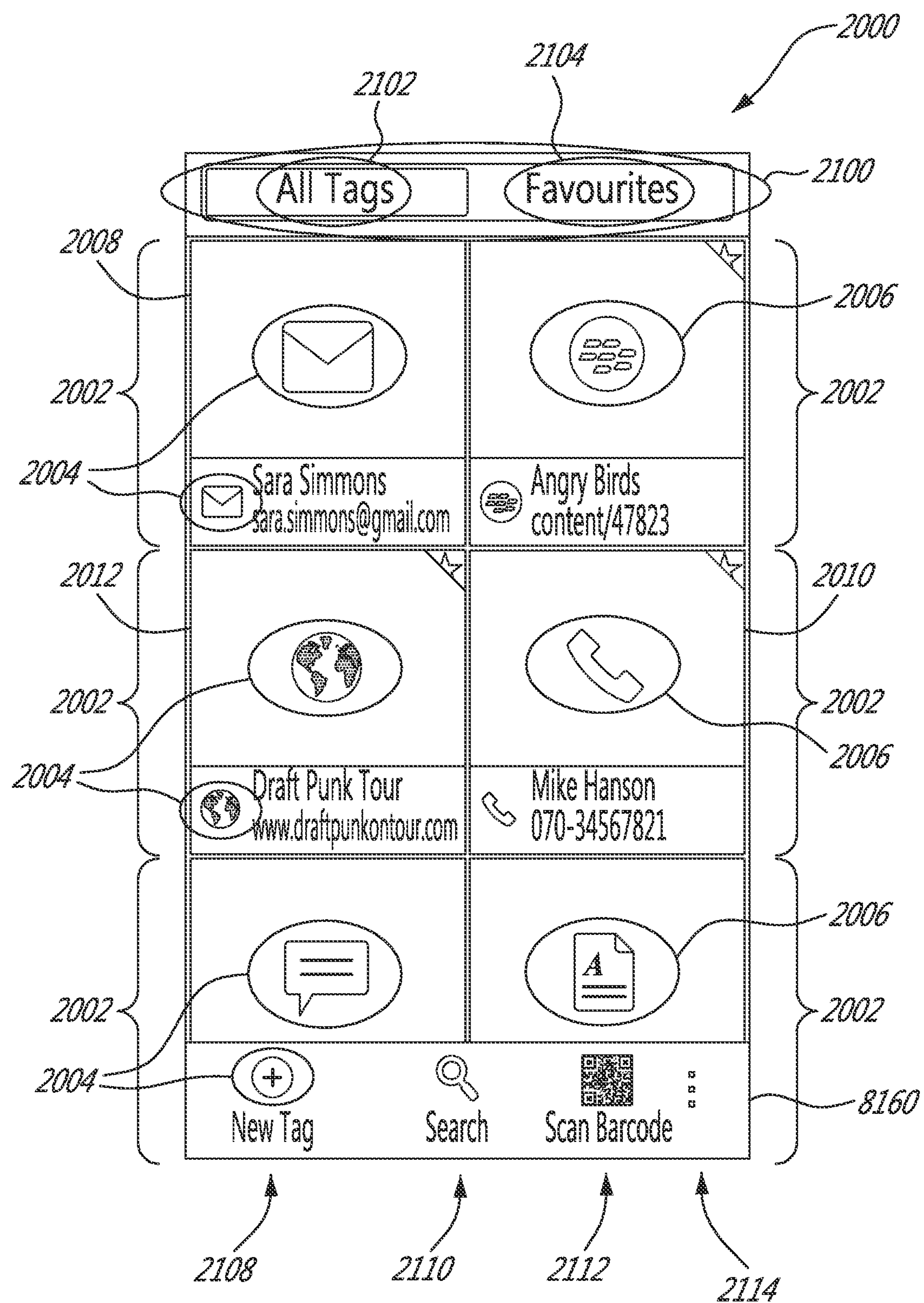

An example of a GUI 200 comprising a plurality of graphical objects 2002 (also referred to as displayable data objects) defined according to a presentation schema and suitable for use implementing various aspects of the disclosure is shown, for example, in FIG. 16. In the example shown, each graphical object 2002 comprises one or more graphical elements 2004 and one or more text elements 2006, as further discussed below.

Using such GUI(s) 2002 and/or graphical object(s) 2002, a user of a device 810, 912, 914, etc., may among other things select and modify, delete, transmit, transfer, save, duplicate, and/or manipulate in any other desired manner, any one or more desired data sets 310, or assets, from a group of associated data sets, database(s), or log(s) stored on the device, without rescanning any physical tags 850 associated with the logged tag. NFC or other module(s) 8130C, N, etc., may then execute, or cause the execution of, device actions responsive to the information that was read from the tag and logged.

In various embodiments, graphical element(s) 2004 and text element(s) 2006 may represent any desired information, including the same or different things.

For example, graphical element(s) 2004 may represent specific image data content, including for example a complete image or reduced-content image such as a 'thumbnail image' content stored within or otherwise referenced by any one or more records R1, R2, etc., of a data set 310. Alternatively, any graphical element(s) 2004 may represent a type or class, or category, associated with image, video, audio, text, or other content data associated with a data set 310. For example, any one of data records R1, R2, RN of a data set 310 can comprise, or point to, a type of content associated with the data record, and such content may be, or may further be associated with, a graphical object representing content included within or otherwise associated with the data set 310. For example, if any of records R1, R2, RN of a data set 310 are related to an e-mail message and/or an e-mail application, or type of e-mail application, a data record RN associated with desired 'envelope' icon 2008 can be comprised by the data set 310, and display of a graphical object 2002 associated with the data set 310 can include accessing data representing the envelope icon 2008 and displaying it on a display 8160 of a device 810, 912, 914, etc. Similarly, data set(s) 310 associated with telephone calls or applications may be represented by a telephone icon 2010; contact or other information such as physical and/or e-mail or other virtual address(es), telephone number(s), associated with a contact-management application 8130 can be represented by a suitable icon 2012, etc.

As will be understood by those skilled in the relevant arts, information associated with personal or business contacts can be of any desired or otherwise suitable type, including for example physical and/or virtual addresses (such as street addresses; e-mail, SMS or other text addresses; URLs, and/or other IP or internet addresses); telephone numbers; photographs or other visual representations, including photograph(s) or other visual representations of human being(s) and/or other creatures, buildings such as homes or businesses, geographic locations, items associated favorites or other sentiments associated with the contacts; maps; etc.

In various embodiments, data categorization images such as an envelope icon 2008 are not included in the corresponding NFC tag data sets 310, but are graphical objects generated or otherwise acquired by an NFC tag application 8130 based on, for example, the application's algorithmic categorization of the data. Thus, for example, any NFCs tags 850 and/or tag data sets 310 containing email addresses can be represented by the same envelope icon without the need for that icon to be specified in the NFC tag dataset.

In the same and other embodiments, data and/or other information used in generation and display of graphical object(s) 2002 representing NFC tag data set(s) 310 can include, for example, business logo(s) stored in or otherwise associated with record(s) R1, RN etc., along with further records RN, etc., representing phone number(s), URL(s), associated with a corresponding business. Data stored in or otherwise associated with a record RN can be used directly by the application as the source of the graphical object representing this data set.

Likewise, text element(s) 2006 may represent any desired specific, type, category, or other information associated with any one or more data sets 310, including for example a type, class or category associated with the data set(s) 310 (e.g., e-mail, text, contact, calendar, image, advertisement, etc.); and or any specific identification, including creator(s), administrators, title, etc. As shown, for example, in several of the figures, including FIG. 16, in various embodiments text element(s) 2006 comprise data representing or otherwise associated either tag and/or tag-type identifiers, e.g., "Sara Simmons," "Angry Birds," "Daft Pink Tour," etc., which identifiers can correspond either to single tag data sets 310 or classes or types of tag data sets.

For example, a "smart" movie poster containing or otherwise associated with an NFC tag 850 promoting a movie, by way of non-limiting example, may point to an official movie-related URL, such as http://www.moviecompanyname/movietitle/on a suitably-configured server 912, 1306, etc. A moviegoer may scan the poster tag 850 with his or her mobile device 810, which may respond by reading from the tag 850 a data set 310 comprising one or more records R1, R2, etc., comprising a suitably-configured reference to the movie-related URL, parsing the data set 310 to recognize that a URL is included within the record 310, launching a web browser application 8130E and wireless (sub)system 8101, accessing the movie site, and downloading and relatively large, rich content data associated with the movie that are stored at that address. Thereby, a potential moviegoer may easily access trailers, presentation posters, movie stills, reviews, actor biographies, and the like. Thereafter, the user's mobile device may store, such as in an on-board virtual tag 310 in memory(ies) 8116, 8118, etc., any or all of the data set(s) 310 accessed from the tag 850, and thereafter display data representing, or otherwise associated with the data set 310 to the user, such as in a tile format or other graphical object 2002, including for example an invokable link to the movie website, on a display 8160.

For example, a corresponding tile-type graphical object 2002 can comprise a graphical element 2004 representing a thumbnail picture associated therewith, suitable thumbnail content data having been downloaded to the user's device 810 upon accessing the web address designated by the physical tag 850 and/or read tag data set 310. The thumbnail picture graphical element 2004 may represent, for example, a movie still and may be associated with one or more text element(s) 2006 indicating the movie title, etc., so that the user may later simply and intuitively select the tile 2002 to gain access to the rich media regarding the movie, without having to access the physical smart poster tag. Pursuant to the user selecting the movie tile 2002, the mobile device 810 may be directed to the foregoing web address, and may download, stream, or otherwise view the associated large assets without having had to download those large assets from the web address obtained from the physical NFC tag 850 upon the initial read.

Among the many significant advantages offered by systems, methods, and coding products according to the disclosure is that once a tag data set 310 and/or any individual data records R1, R2, RN, etc., are logged, including for example an associated URL or other referral data, the physical tag(s) from which such data has been read need not be read from or otherwise involved anymore. In fact, any data 310, R1, RN, etc., suitable for writing to one or more tags 850 may be created by a user and saved into a log or other data set or data base without a physical tag being involved at all. For downloading content, the physical tag does not need to be present. This allows a number of advantages. For example, once a data set 310 has been logged on a user's device, remotely-stored data referred to by one or more fields R1, RN, etc., may be accessed at any desired later time. For example, if sufficient network bandwidth or other coverage is not available at the time the data is read from the physical tag, and desired associated data may be accessed any desired later time.

Thus, for example, at an application presentation layer, data 310 acquired from an NFC tag 850 may be combined with or otherwise associated with, rich or simple presentation data in a seamless and automatic fashion for later selection and display by the user.

Thus, any or all tags and/or tag data sets 850, 310 that have been read/created by a device may be displayed to a user, such as in a categorized data set or log, or a portion thereof, for ready access by the user to obtain the data associated with the tag, or to be directed to a remote location to obtain the data associated with the tag. Tags 850 and/or tag data sets 310 may, on display, be organized by default or selectively sorted, for example, based on particular categories, search features, content, creator, or the like. For example, tag content may be color coded, such as wherein phone numbers are displayed under a green category, weblinks and locations in a purple category, applications in a blue category, and so on. Such categorization may be designated by a user at any convenient time, on-line or off-line, wherein for example off-line occurs without cellular coverage.

Figures 12, 13:
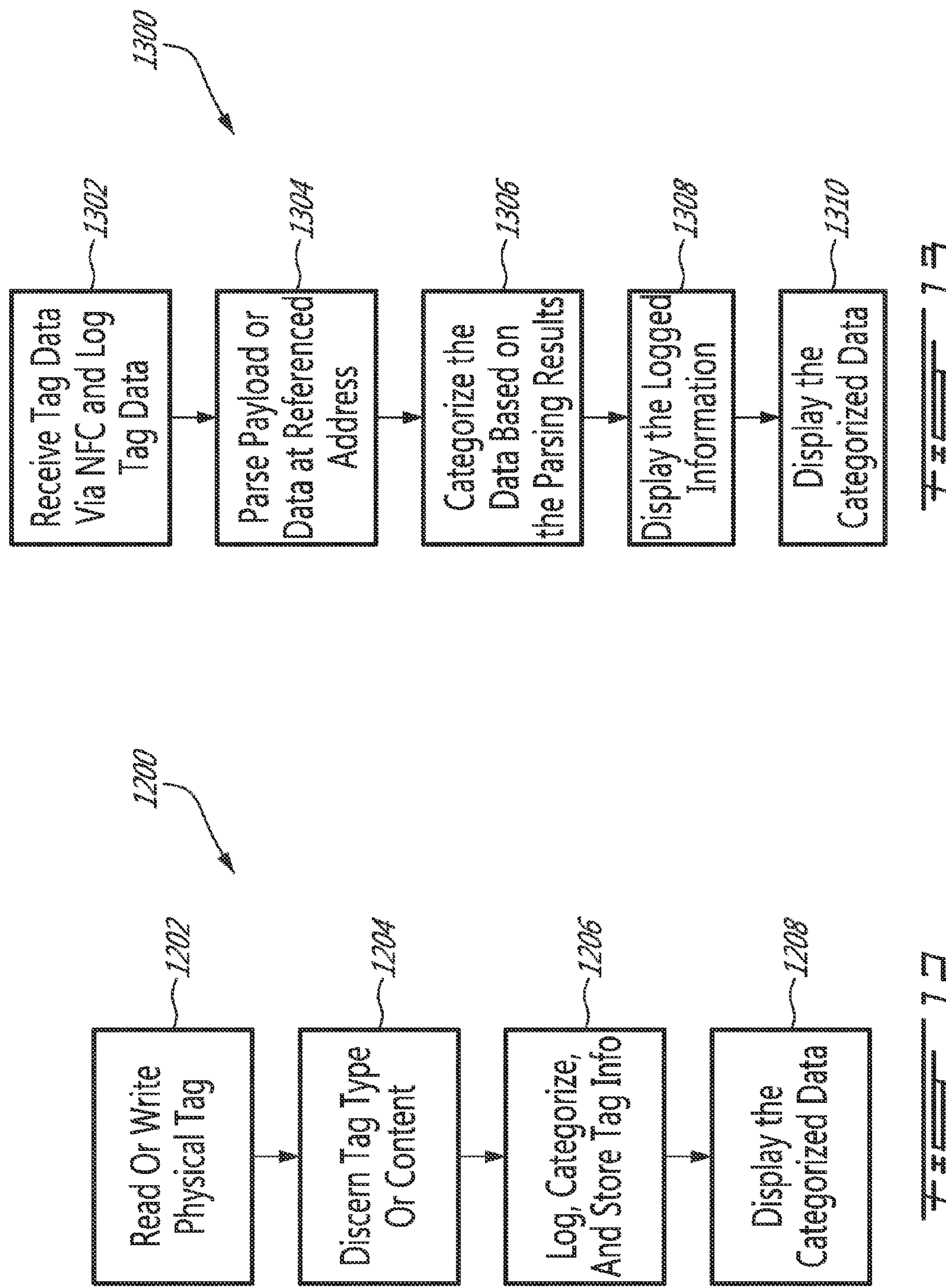
FIGS. 12-15 are schematic flow diagrams of methods in accordance with aspects of the present disclosure.

FIG. 12 is a schematic flow diagram illustrating a method 1200 of characterizing tags in accordance with various aspects and embodiments of the disclosure. In the embodiment illustrated, at 1202 a physical tag 850 may be read or written, as for example by a device 810 employing an NFC (sub)system 8132 and/or further components as discussed herein.

At 1204, information regarding the tag 850, such as one or more identifiers indicating types associated with the tag 850 and/or content data stored thereon, may be discerned (i.e., determined) by one or more processors 8180, 8132*a*, 8158, etc., as for example by parsing (i.e., by reviewing the payload information associated with the data) records R1, R2, etc. of the data set 310, according to a protocol such as the aforementioned NDEF format.

At 1206, processor(s) 8180, 8132*a*, 8158, etc. may use the parsed or otherwise processed data from the data set 310 to log, categorize, and store the tag data set 310, such as by associating with the data set 310, and/or portion(s) R1, R2 and/or RN, etc., thereof, with any one or more desired category(ies). One or more log data record 310 may be generated, comprising any desired numbers and/or types of newly-generated and/or retrieved, previously generated records R1, R2, RN suitable for use in indicating or otherwise identifying, for example, any desired type(s) of content data associated with the tag 850, and/or any additional tags 850 and/or tag data records 310 of one or more corresponding type(s) (i.e., text, audio, still picture, video, geo-location lat/long, web address, remote or local, etc.); and/or content data associated with the tag data set(s) 310 (i.e., a game, a movie, contact information, etc.); and/or the formatting of any or all of the data, the file size of the assets associated with the tag, the creator of the tag and/or of the data assets, commonality of one or more search features with other tags, date(s) and or location(s) of creation or modification of the tag data set(s) 310, or the like.

At 1208, categorized data may be presented to the user on, for example, a device display 8160 in a manner indicative of the category and/or content of the logged tag(s) 850 and/or tag data set(s) 310. By way of non-limiting example, video tags may be one color, phone tags another; or video tags may have associated therewith a film icon, and phone or contacts tags may have associated therewith a telephone handset icon; or games may all be placed in a folder together labeled "Games," or all games by the same creator may be placed together in a folder labeled with the name of the creator, or labeled with mini-thumbnails of still images from one or multiple or all games in the folder.

In such categorization embodiments, algorithms may be employed for detecting and interpreting tag categories and types. Standard format reads, such as using the NDEF standard formatting, may be employed to identify data record types in text, header, meta tags, or the like, among others. For example, a TNF field value R1, R2, RN, etc., may be employed to indicate the structure of the value of the data type for data associated with a tag 850 and/or tag data set 310. TNF field(s) may, for example, comprise standard NDEF 3 bit fields with values defined in accordance with said NDEF specification. As referenced above, tag and/or data types may be indicative of, and/or otherwise associated with tag and/or data category(ies), which category(ies) may be indicated by, for example color coding of displayed icons or other graphical objects 2002, such as wherein a graphical telephone icon element 2010 indicates that phone number data has been read from an NFC tag 850, pictures, audio, or the like that are associated with the tag data 310, text or file folder indicators, including text elements 2006, or combinations thereof, by way of non-limiting example.

Additionally and/or alternatively, NFC data sets 310 and/or records R1, R2, etc., may be parsed to determine the type and/or content of the data they represent, such as to allow for placement of the data into a display category. Whether the tag data 310 is categorized based on the TNF field, or by other parsing, categorization of a tag 850, 310 may allow for sorting or searching of tags 850 and/or data sets 310, grouping of tags/data together, such as in a file folder, such as based on information regarding the tag data, and the like.

In various embodiments, tag data 310 can include location data relating to either geographic location and/or resource references or identifiers, such as, for example, a URL and/or address or other location in storage external to a requesting device 810, that may for example comprise presentation information which may be used to represent one or more tags 850 and/or tag data sets 310 to a user. For example, tag data 310 may include one or more data items R1, R2, etc., such as a phone number, location, etc. as discussed above and one or more additional data items R1, R2, etc. specifying a URL, address, and/or other remote location reference associated with memory from which presentation information elements 2004, 2006, etc., may be retrieved or otherwise accessed.

Using, for example, any one or more geographic locations automatically, semi-automatically, and/or manually generated by any or more of input device(s) 8140, 8112, 8138, 8160, 8134, 726, 8238, 8240, 8106, 8108, 8132, 8101, 8102, 8121, etc., including for example a global positioning system (GPS) or other navigational aid 8238, categorization or grouping of tags and/or tag data 850, 310 may be accomplished on the basis of locations and/or movements in and out of buildings, banking transactions, and displayed for example in places other than the NFC tag application (e.g. the inbox, a banking or location application that tracks user activity). In such and other grouping examples, a "dynamic placeholder" could be used that is representative of the last tag read (showing info such as date, time, transaction type, location, etc.). The placeholder could be dynamically updated with the last tag action (or transaction/location logged).

In various embodiments, including for example embodiments relevant to personal access/banking application(s), an NFC-enabled mobile electronic device 810 may be used for personnel access (i.e. to access a secure location, such as a building). For example, the device 810 may communicate a security code data set 310 to an NFC-equipped security controller located outside of a building. The security code can include a series of alphanumeric and/or other characters, and in some embodiments the security code may be encrypted to provide enhanced security. The security controller may grant personnel access if the security code is valid, and denies personnel access if the security code is invalid. In this embodiment, the device may store a log of all NFC interactions with personnel access systems. Such logs can be categorized and displayed under a 'personnel access' category.

In the same or other embodiments, a device 810 may be used in payment and/or other financial transactions. For example, a device may communicate a credit card number to an NFC-equipped point-of-sale terminal 120 in a store. A corresponding purchase may be approved if, for example, a server 1306, 912, 914, etc., determines that the credit card is valid and there is sufficient credit available. Alternatively, a debit card may be used, and the purchase may be approved if there are sufficient funds in the account. In such embodiments, the device 810 may store logged data sets 310 corresponding to all NFC interactions with point-of-sale terminals 120. Such logged data sets 310 can be categorized and displayed under any desired categories, including for example a 'purchases' category.

In the same and/or other embodiments, categorized NFC-related interaction data stored on and/or otherwise accessible by a mobile device 810 can be displayed using applications 8130 other than an NFC application 8130C. For example, NFC interaction data stored under or otherwise associated with a 'purchases' category can be displayed via a money management application 8130N; NFC interactions under a 'personnel access' category can be displayed in a travel application 8130N; and/or all NFC interactions can be categorically displayed in a unified inbox application, for example.

FIG. 13 is a schematic flow diagram illustrating an exemplary embodiment of a method 1300 of parsing tag data 310 for categorization and display on a device 810, 912, 914, 120, etc. For example, and as illustrated in FIG. 13, in a parsing embodiment the tag data may be read or otherwise received and logged, including header and payload portions of the data, at step 1302. For example payload information received from and/or otherwise associated with one or more tags 850 and/or other tag data sets 310 may be parsed to determine the type(s) of data comprised by and/or otherwise associated with the tag(s) 850 and/or data 310. As an example, data records R1, R2, etc., read from a parsed data set 310 may comprise address and/or other reference data suitable for identifying a remote networked resource 912, 914, 120, etc., and data set(s) 310 and/or records R1, R2 stored at or otherwise associated with such resources 912, 914, 120 may be accessed and further parsed to determine its data type(s), at step 1304. For example, a parser application 8130 may by accessed by any of processors 8180, 8132*a*, 8158, etc., and machine-executable instructions associated where with may be used to identify specific text strings, markers, or the like in the payload or referenced data, and use one or more lookup table(s) to determine the data type(s).

Based on the type(s) of data determined at 1304, one or more appropriate category(ies) to be associated with the content and/or type(s) of the item(s) 310, R1, R2, etc. may be determined at step 1306.

At 1308, the data 310, R1, R2 etc., may be logged by associating any one or more of the categories and/or types determined at 1304-1306 and storing them in any memory(ies) accessible by the processor(s) 8180 8132*a*, 8158, etc., including for example any or all of memories 8116, 8118, and/or memory(ies) associated with any one or more remote networked resource(s) 912, 914, 1306, 120, etc. Information representing parsed, determined, and/or logged data, including for example graphical object(s) 2002 comprising suitably-configured graphical element(s) 2004 and/or text element(s) 2006 may be displayed, e.g., on one or more display(s) 8160 associated with the device 810, 120, etc. Such logged information may be displayed to the user at step 1308.

At 1310, categorized or other payload information R1, R2, etc., may also optionally be displayed. For example, if the received payload comprises location data, then a reading device 810 may categorize the received information in the geo-location category (step 1306), may display, for example, a tile, icon, folder, or other graphical object 2002 or element 2004 indicative of the information in category (step 1308), and may retrieve and display a map of the indicated location (step 1310).

In an additional example, if received or otherwise accessed data 310, R1, R2 etc., comprises a web page address (e.g., a URL associated with a web page), then a device 810 may retrieve the web page, and may parse and display accessed data representing the web page, as well as associating the web page with any one or more proper category as parsed in a thumbnail format, wherein subsequent accessing of the thumbnail on the display indicates the device to open the web browser and surf to the correspondent page that was indicated by the tag. For example, a thumbnail service may be used to obtain graphics to represent a website URL, a Google Maps picture may be used to represent a particular location, a brand trademark or icon of an application may be used if the parsed data suggests that the tag 850 directs to an application or type of application, a picture of a particular person may be fetched if the suggested category is contacts/email/phone (the picture may be, for example, either from the present device contacts or from a social network), the first frame or title frame of a video from YouTube or a theatrical release may be fetched and displayed as a framed icon object or element 2002, 2004, and so on.

As a more particular example, when a user invokes or otherwise accesses the representation 2002, 2004, 2006, etc., of the NFC tag data 310, such as by selecting, touching, or the like, using a touchscreen 8160 of the device 810, an NFC smart-tag application/NFC module 8130C may invoke an included or associated application handler that assesses and launches an appropriate second application (such as a video player) 8130N to manipulate/display content data 310, R1, R2, etc., comprised by and/or otherwise associated with the tag data 310.

Figure 14:
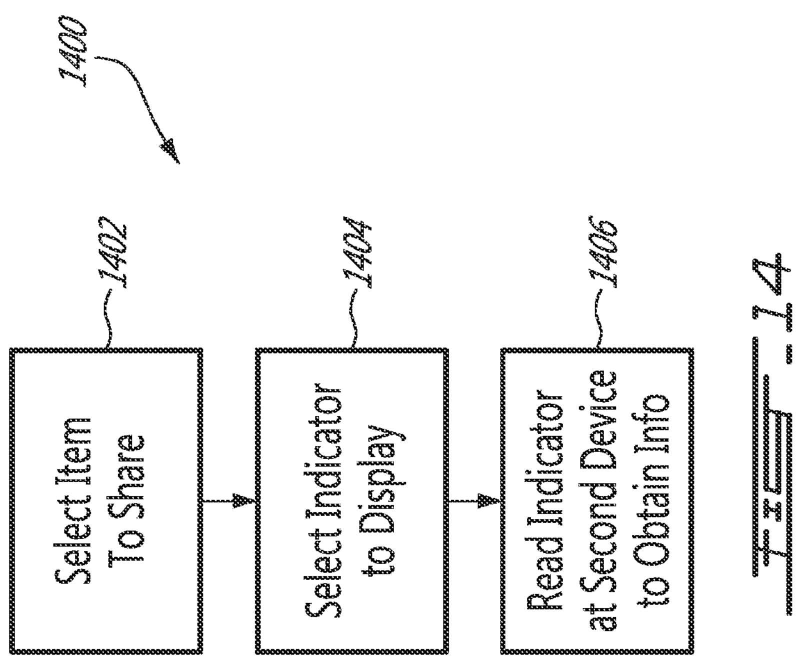

Those skilled in the relevant arts will understand, when they have been made familiar with the discussion herein, that a user may wish to share data 310, R1, R2, etc., read from or otherwise accessed via, or writeable to, one or more tags 850. In such embodiments, and as illustrated for example through reference to method 1400 of FIG. 14, a user may be enabled to select, such as from categories and/or via search using a suitably-configured interactive GUI displaying any of a wide variety of suitably-configured input fields and command items such as are shown, for example, in FIGS. 16-34, a particular tag data set 310 or item R1, R2, etc. such as based on a displayed icon or object 2002, 2004, 2006, etc. corresponding to such record 310 and/or item R1, R2, etc. at step 1402.

Such selection or invocation can be used to generate commands and/or data associations indicating further characterizations useful in logging and otherwise manipulating data set(s) 310. For example, a user using such GUIs can be enabled to indicate, such as by selection from a menu associated with the selected item, that an externally readable graphical object or other indicator, such as a barcode or quick-read (QR), be displayed in association with the selected item, at step 1404. Such displayed indicator(s) may allow a second user device 810 to use a barcode reading application 8130N to read the indicator/barcode at step 1406, and accordingly obtain the same or other information known to the original user's device from the underlying tag 850.

Figure 15:
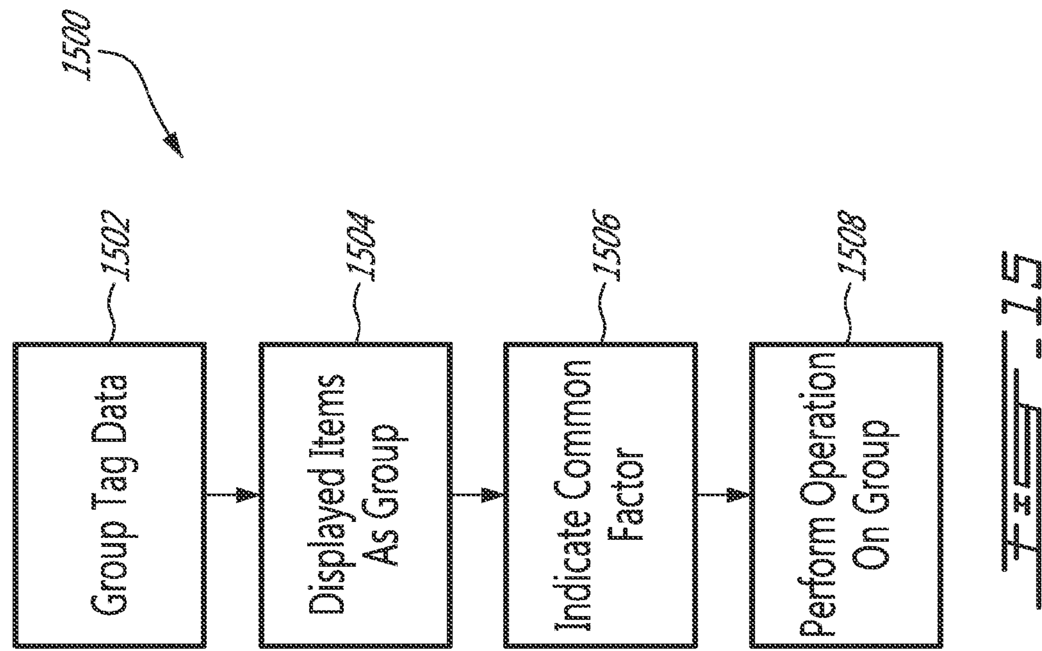

Irrespective of the manner of categorization of tag information, it may be preferable that like tag data/content be grouped together, such through the use of virtual folder mechanism. A method 1500 of grouping data sets 310 is illustrated in FIG. 15. In such embodiments, tags 850 and/or tag data 310 may be grouped based on any one or more desired factors at step 1502, such as having been read from a single NFC tag 850 or class or type of tags 850; as having been written to the same tag 850, or class or type of tags 850; as having been generated by or being otherwise associated with a common data source 810, 912, etc., and/or creator or administrator; as being of the same data type, such as all games; as being "favorites", or preferred in various circumstances or based upon desired criteria, or frequently used; as having the same or similar content, or the like.

At 1504, grouped data sets 310 and/or items R1, R2, etc., may be displayed as whole or partial groups, using for example any suitably-configured or otherwise desirable graphical objects 2002 and/or elements 2004, 2006, etc., such as in a virtual folder, all on a same tiled page GUI 2000 as shown for example in FIG. 16, etc. Further, the group may be associated, on display, with one or more category codings, such as a particular icon 2004 or color as discussed above, to indicate the common factor that binds the group, at step 1506.

Among other advantages, grouping or categorization of data sets 310 for display and other processing can facilitate the performance of various actions with respect to such data sets on a group basis. For example, the sending of a categorized or grouped set of data items or records 310, R1, R2, etc., or the making available to second user devices 810 such as via a barcode read, may be performed on an entire group simultaneously at step 1508. For example, upon reading an NFC tag 850, the reading device 810 may receive data representing a phone number, a geographic and/or network location, and a web address associated with a particular individual or entity, as for example a particular restaurant. Commonly-categorized data items may be displayed together as a group using a single folder icon 2002, based on the fact that the three data items were read from the same NFC tag.

In various embodiments embodiment, when a group folder object 2002 is tapped, or otherwise selected, all records 310 associated with the indicated group may be displayed separately, such as being displayed as independent tile objects 2002 on the same display page 2000. For example, a game tag folder may have several different games associated in it. Accessing the game tag folder may accordingly display a group of all of the games with that game tag indicator. In an additional example, a hotel tag may provide a phone number, a location, and a website address, all of which may be displayed as a group within a folder indicative of that hotel. As would be appreciated by the skilled artisan, the aforementioned NDEF standard includes multiple indicator fields R1, R2, etc., that may readily allow for this categorization of items having certain individual fields together into a group for display, such as for display within the same folder. Likewise, groups may be created using data parsing, as discussed above.

In the same and/or other embodiments, a plurality of interactions may be available for execution by the smart-tag application(s) 8130C. For example, such an application may permit a user to retain a log of physical and/or virtual tags 850, 310 read and written, which log may include data from a tag, and/or pointers or other references to data/content obtainable based on the data from a tag. Likewise, a log may be maintained for QR codes or barcodes read/written by the device, which log may be maintained in the same manner as a tag log, and as discussed herein.

Further, smart-tag application(s)/NFC module(s) 8130C may allow a user to create tags 850, 310, such as a tag associated with on or more URL-based, email, SMS, text, phone, or other networked and/or communication applications (such as Blackberry World® and/or other applications for Blackberry devices), and/or geographic locations, by way of non-limiting examples. Tags thus created may be placed in the tag log. The smart tag application 8130C may interface with NFC (sub)system(s) 8132 to allow a user device 810 to write a logged tag data set 310 to a physical tag 850. Moreover, a logged tag or tag data set may 850, 310 be marked as a favorite and/or may be searchable, which may allow for quick filtering of the tag log. Additionally, the smart tag application 8130C may allow for the virtual or other locking of a physical tag 850, so as to prevent further unauthorized writing to the tag (such locking may be reversible or irreversible). Further, a smart-tag application 8130C may allow a user to share content 310, R1, R2, etc. to a tag or tag data set, and/or to share content with other device(s) 810, 912, 914, 120 etc.

FIG. 16 provides a schematic illustration of a GUI 2000 suitable for implementation by a device 810, 912, 914, 120, 1306, etc., in generating, reviewing, modifying, managing and otherwise processing categorized sets 310 of data read from and/or suitable for writing to physical NFC tags 850. In the embodiment shown, GUI 2000 comprises a plurality of graphical objects 2002, each object 2002 comprising one or more graphical elements 2004 and text elements 2006; and each object 2002 representing one or more individual or categorized logged NFC data sets 310. Further, in the embodiment shown, the plurality of graphical objects 2002 are displayed in a tiled format. GUI 2000 is suitable, for example, for display on a display output 8160 of a device 810.

In the example shown in FIG. 16, GUI 2000 further comprises a header 2100 which may allow a user to employ filters, based for example on any desired category(ies), or type(s), to be employed by the device 810, etc., in displaying logged data set(s) 310. In the embodiment shown, header 2100 enables a user to toggle between an 'all tags' view of a selected set of logged tag data sets 310, and a 'favorites' view, in which only graphical objects 2002 associated with data set(s) 310 which are, in turn, designated as 'favorite' or otherwise preferred by association with category(ies) items R1, R2, etc., or other suitable filter means. Header(s) 2100 can enable rapid and efficient selection, display, and redisplay of objects 2002 based on desired category(ies) by, for example, selection of suitably defined command objects 2012, such as "All Tags" command object 2014 or "Favorite" command object 2016, using for example a touchscreen display 8160.

Further, and as shown in FIG. 16, a user of a device 810, 912, 914, 120, etc., may be enabled to create a new tag data set 310, starting from a base GUI 2000 generated by a smart tag application 8130C, which new tag may be logged and thereby added to any appropriate tag list(s), and/or which later may be used to write data to and/or otherwise create a new physical tag 850 using for example an NFC (sub)system 8132. The user can be enabled to initiate generation of such new data set(s) 310 by, for example, selecting "New Tag" command object 2108, and thereby invoking a 'create tag' function of an NFC tag application 8130C, resulting in generation and display of an interactive GUI 2000, 2200, as shown for example in FIG. 17 (described below).

Yet further, and as also shown in FIG. 16, such user may be enabled to search for particular logged tag data sets 310, or categories of tag data sets, or the like, by selecting a "search" command object 2110, and thereby invoking a 'search tag(s)' function of an NFC tag application 8130C, resulting in generation and display of an interactive 'search' GUI 2000, which search GUI may facilitate entry of filter(s) and/or other search criteria to be employed by application(s) 8100 in searching a database or other set of logged tag data set(s) 310 using, for example, standard in-app search functionality, as will be apparent to those skilled in the relevant arts.

As further shown in FIG. 16, a user may be enabled to read or otherwise access one or more tag data sets 310 represented by a bar code, QR code, or other image object, by selecting a suitably-configured 'scan barcode' command object 2112, and thereby invoking a 'scan image code(s)' function of an NFC tag application 8130C, resulting in generation and display of a suitably-configured barcode command GUI 2300, as shown for example in FIG. 20B and discussed further below. Such 'scan image code' command functions can, for example, enable users of devices 810 to share designated tag data sets 310 by using display(s) 8160 and image processing systems/application(s) 8240, 8130N to display and read QR or other image-based codes on different devices as shown and described, for example in connection with FIGS. 4, 7, 20B, 20C, and 21B. For example, actuation of the scanned barcode object feature 2112 may allow the user to select a tag data set 310, whereupon the barcode indicative of such tags data set may be displayed on the user's device. Thereafter, a second user may invoke a camera viewer to scan said barcode in order to obtain the desired tag data.

Further command objects, and corresponding application functions, may be accessed by means of application menu object 2114. Menu options may include, for example, lock tag, which allows a user to prevent additional data from being written to a physical tag owned by or associated with that user and that user's tag log. Moreover, an overflow menu may allow the user to select multiple tags, such as to group tags for display, or to permit for multiple deletions and/or multiple sharings.

Figure 18:
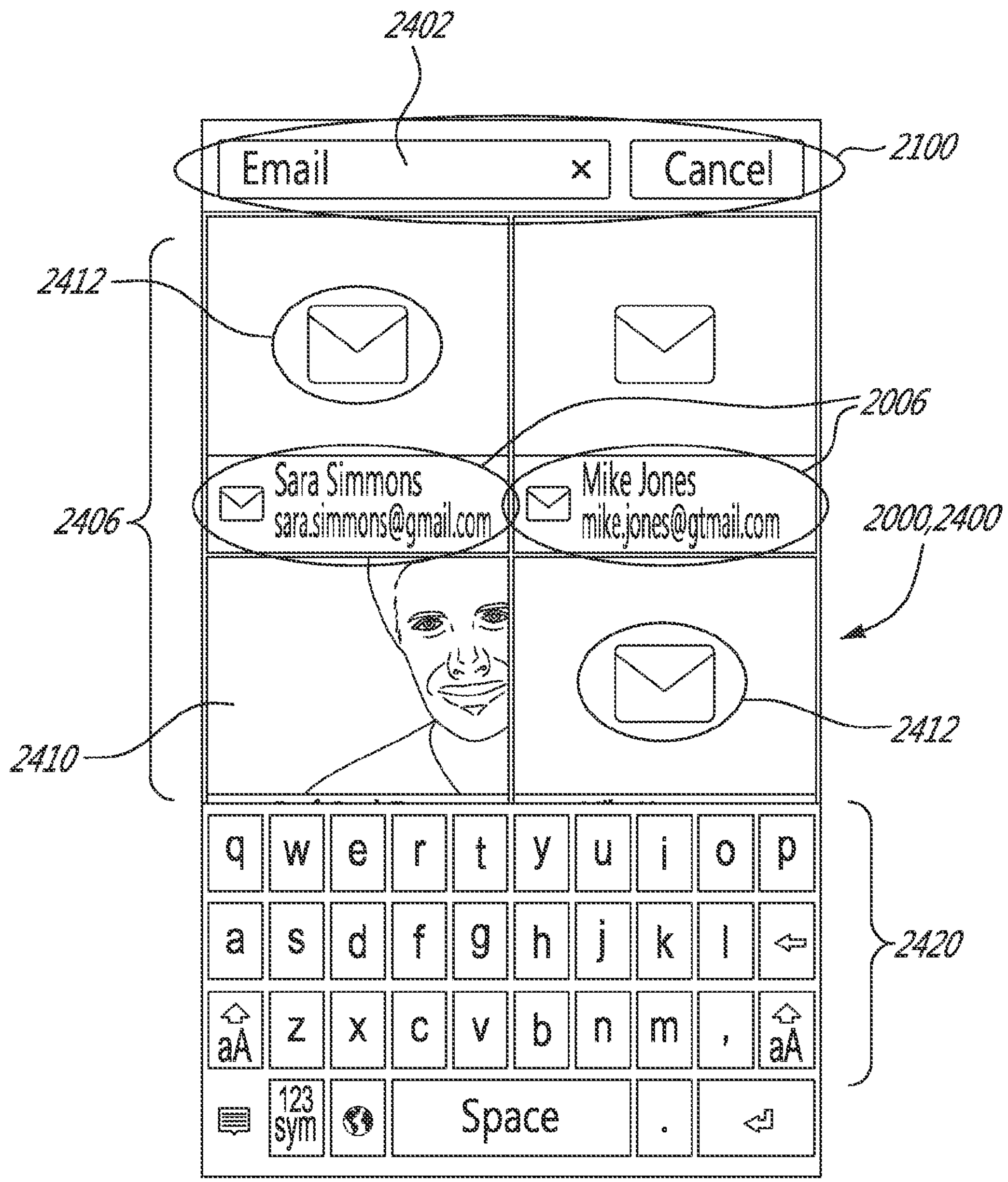
Figure 23:
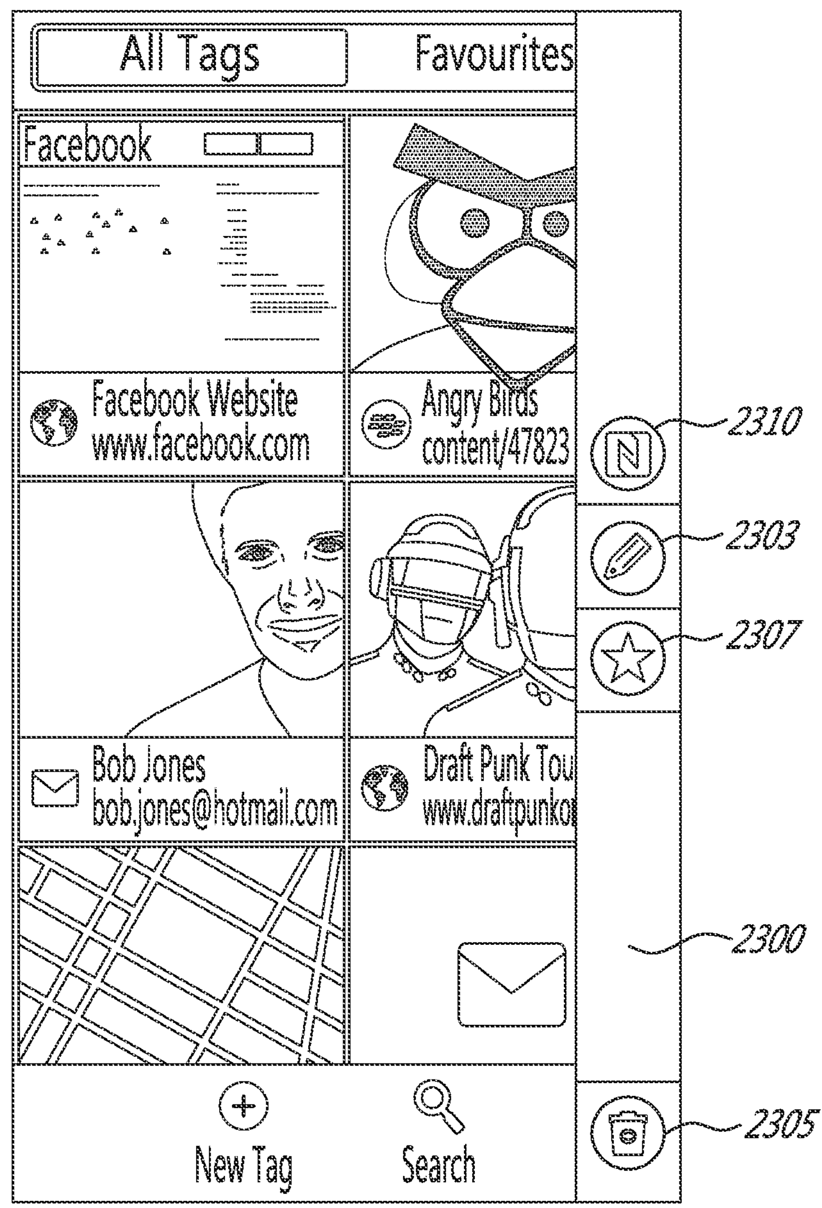

Menus displayed in response to selection of a command object 2114 can, for example, include side-bar menus such as side bar 2300 shown in FIG. 23, and may comprise further command objects such as 'write,' 'compose, or 'edit' object 2303, which can for example cause display of a virtual keyboard or keypad 2420 (see for example FIG. 18); 'delete' object 2305, which can cause deletion of any selected graphical objects 2002 and/or data set(s) 310 associated therewith; 'favorite' object 2307, which can cause a suitably-configured flag or filter to be associated with a data set 310, as for example by generation and insertion of a suitably configured command data item R1, R2, RN.

Figure 17:
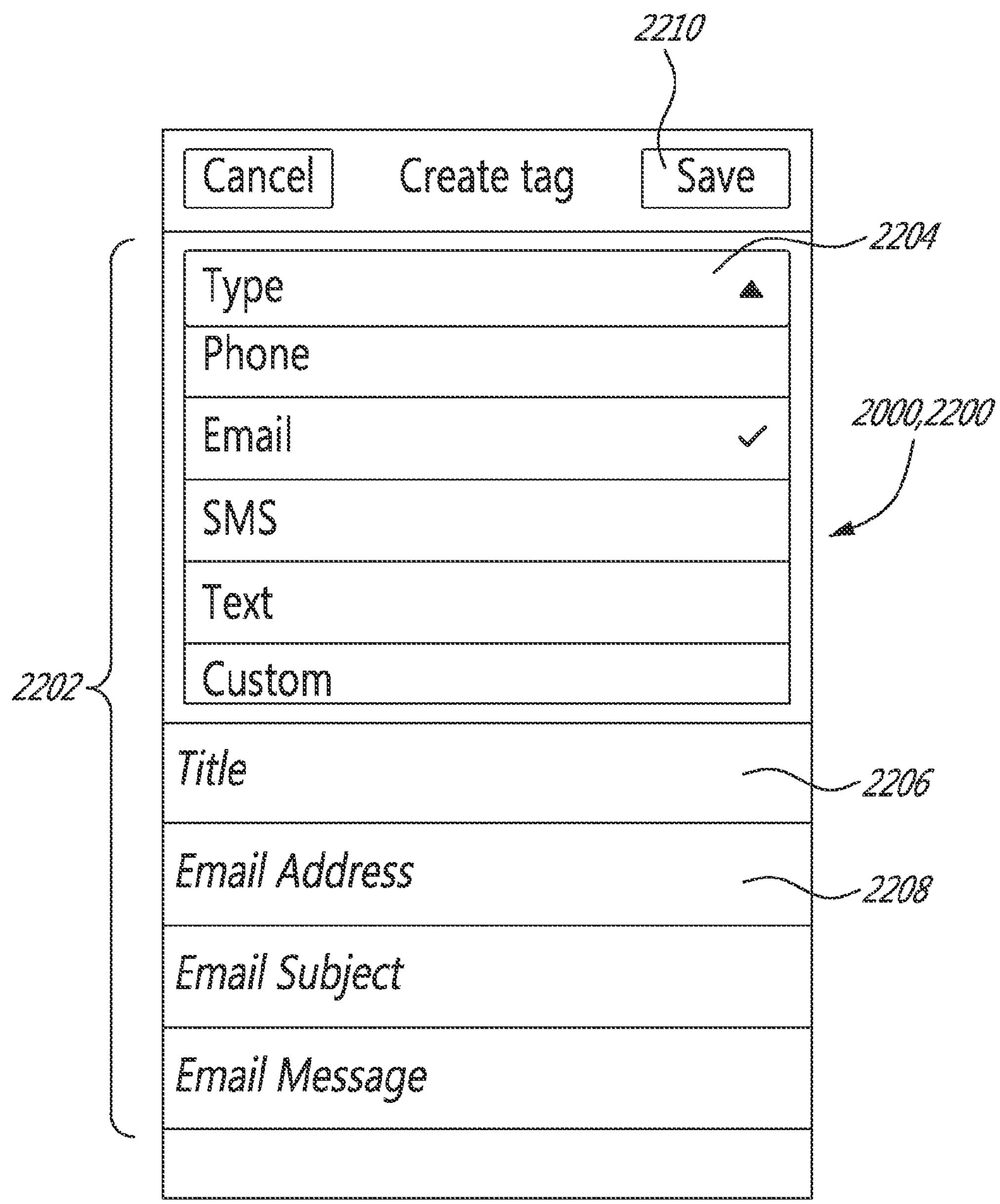

As noted above, invocation of a tag or tag data set creation or generation function by, for example, selection of a 'New Tag' command object 2108 can result in generation and display of a 'Create Tag' GUI 2200, such as shown in FIG. 17. A GUI 2200 can provide a plurality of interactive fields, or objects, 2202 adapted to elicit and receive input relating to any desired characteristics and/or content to be associated with one or more records R1, R2 RN of a newly-generated or modified data set 310 according to any user preferences. Such input can, for example, be generated using physical and/or virtual keyboards, touchscreens, and/or other input devices, such as any or all of input device(s) 8140, 8112, 8138, 8160, 8134, 726, 8238, 8240, 8106, 8108, 8132, 8101, 8102, 8121, etc. Input fields can include, for example, objects adapted to accept input via keyboard(s) or keypad(s) 8140, such as field 2204 for any category(ies) or type(s) to be associated with the created or modified tag data set 310, phone numbers, titles, etc., as shown. Options to be chosen from pre-defined lists can be provided via, for example suitably-configured drop-down menus. Selection of a 'save' command object 2210 can cause any input entered in any of fields 2202 to be read and processed into one or more items R1, R2, etc., of a record 310, and saved in any desired local and/or remote networked memory(ies), as, for example, an entry in a user's tag log. Correspondingly, a user may cancel a tag creation, such as by actuating a cancel button if data has been entered, or a user may actuate a back button to move backwards in the process of tag creation.

For example, a tag creation application 8130N such as a suitably-adapted wizard-type application, may allow a user to select, such as via a drop-down menu, among several different tag types, which may include phone, email, SMS, text, URL, app world, geo location, or custom. Moreover, content fields 2202 presented by and useful for accepting input in the tag wizard may be dependent upon user- and/or application-defined associations, including for example tag type(s), and may likewise be selected from a drop-down, for example. Content fields 2204, 2206, 2208, etc., may include, by way of non-limiting example, a title, phone number, email address, email subject, email message, SMS message, body text, browser linked URL, an app world or app store link URL, latitude value, or longitude value.

Activation of a 'search' command object 2110 can result in generation of a search GUI 2400 such as that illustrated in FIG. 18. In such an embodiment, a header 2100 may comprise one or more input fields or objects 2402 adapted to elicit and accept input identifying filters, such as categories or text content strings, to be used in searching sets of logged data sets 310, as for example by parsing data items R1, R2, RN, etc., of such logged data sets 310. For example, a search feature may allow a user to search a tag log categorically, by tag title, by tag type, by content, or other suitable filters or mechanisms. In exemplary embodiments, such search feature may be a free-form text search configured to enable string searching of records R1, R2, etc., comprising searchable data such as text or other ASCII- or standard-format. In the example illustrated, a user has searched for all tags in the tag log associated with a type or category "email". Correspondingly, all tag data sets 310 having associated therewith an email aspect, such as data item R1, RN, etc., useable as a filter, are displayed in the search window 2406, including email address tag data shown in text element(s) 2006, contacts (PIM) tag data, which may for example include associated specific graphical element(s) 2410 and/or placeholder elements 2412, etc. Further search options may be provided by, for example, presenting virtual keyboard(s) or keypad(s) 2420, adapted for accepting input from a touchscreen 8160, etc.

Figure 29:
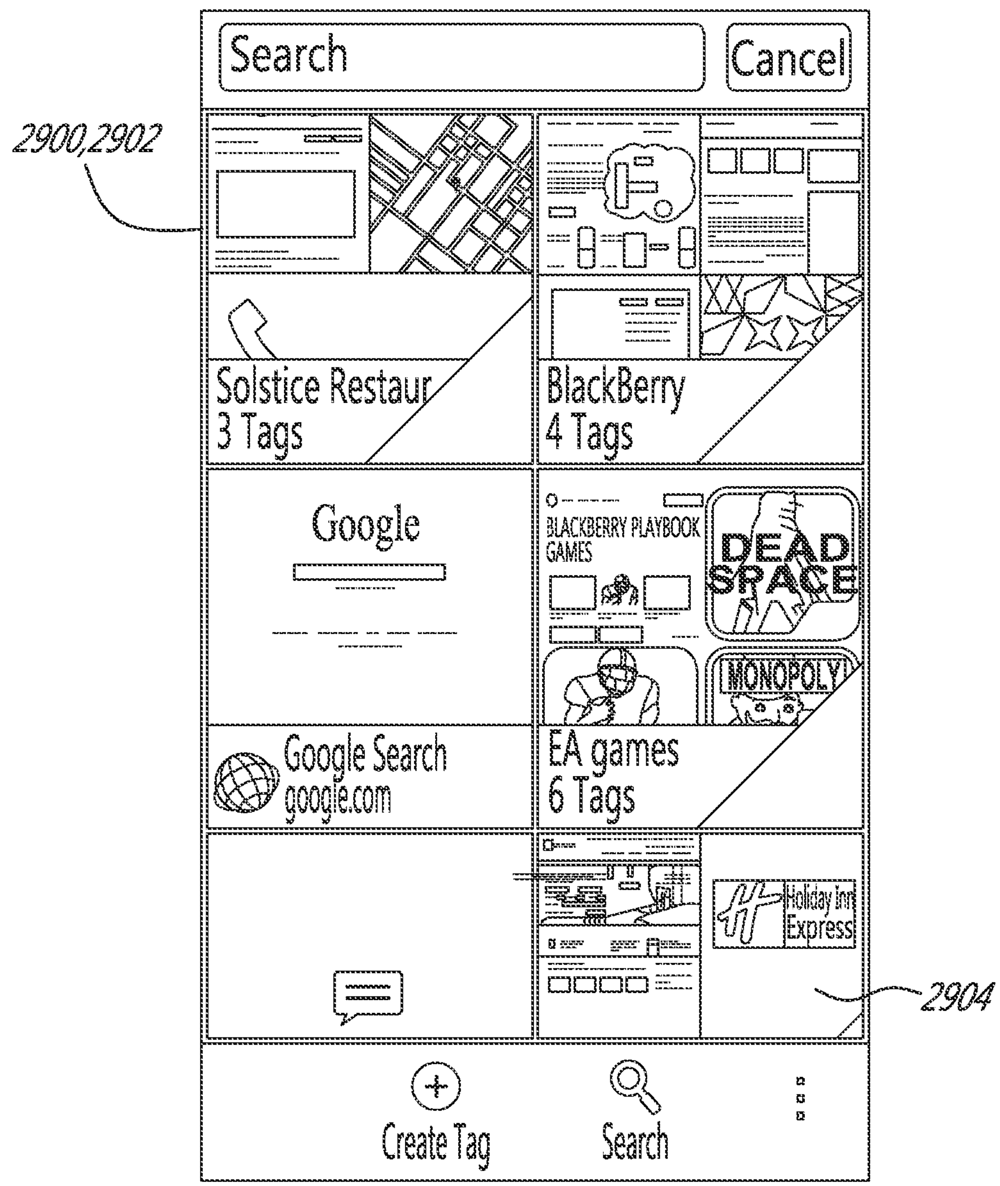

FIG. 29 shows results of searches based on parsing or filtering of records R1, R2, etc., of a plurality of logged data sets 310 as described above. In the example shown, suitably-configured searches have identified 3 tag records 310 related to Solstice Restaurant, four tags related to Blackberry devices, and six tags of games produced by or otherwise related to Electronic Arts (EA) gaming. Identification of the six data sets associated with EA gaming is indicated in graphical object 2902.

In various embodiments of the disclosure, when any one of a plurality of data sets 310 in a categorized group matches a search, then the entire group may be returned in the results. This enables, for example, display of related, but not specifically-identified data sets identified as belonging to a common grouping or categorization in the same group as something that specifically matches the search.

Figure 30:
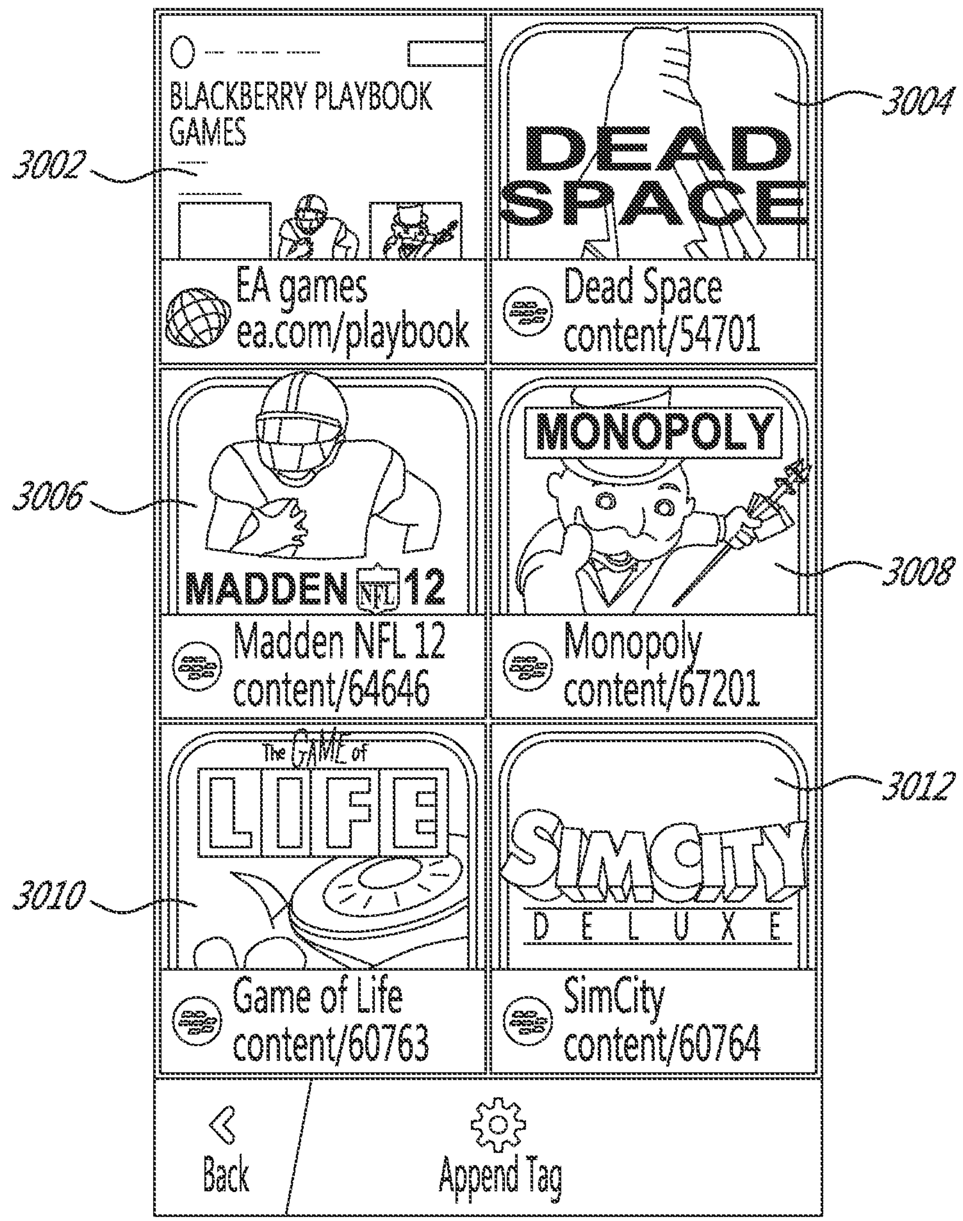

FIG. 30 shows an example of the effect of "drilling down" to a plurality of search results or otherwise grouped or categorized data sets 310 by, for example, selecting a graphical object 2002, 2902 displayed in response to a search command. In the example shown, selection of graphical object 2906 results in generation of an application command causing graphical objects 3002-3012 corresponding to the six tag data sets 310 identified by the search as being associated with the characteristic 'EA games.' Additional tags also falling within this category and/or group may be later appended to the subject group from the screen of FIG. 30, as indicated by way of example in the lower portion of the illustrated display.

Figure 31:
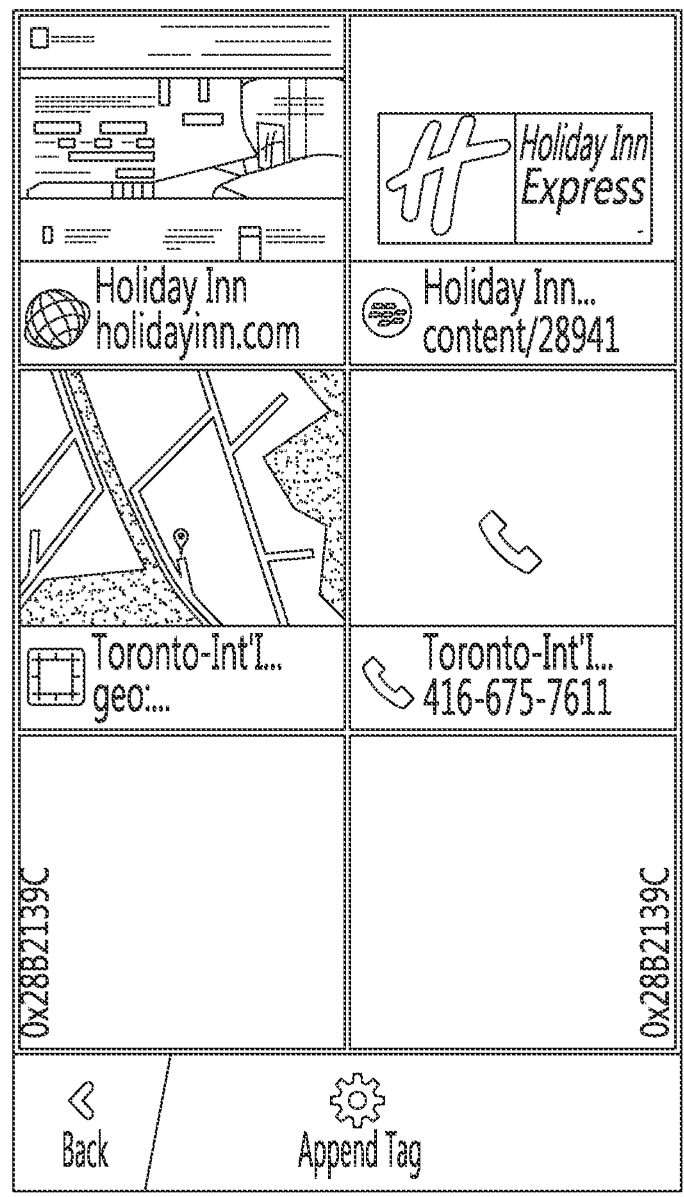

Likewise, FIG. 31 illustrates all travel tag data sets 310 included within a travel group identified by search-results graphical object 2904 shown in FIG. 29. Additional travel tags may be appended to this group, as discussed above. A similar display may result from selection of grouped or otherwise categorized tag data sets 310 read from a single source, such as a single physical tag 850; or identified as belonging to any one or more desired groups categories by a user through entry of suitable application control commands.

Figure 20:
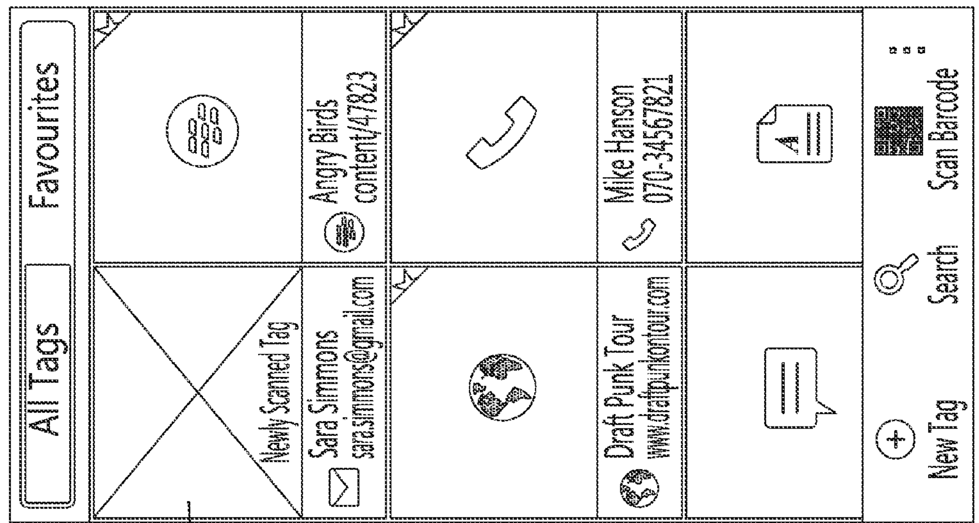
Figure 19:
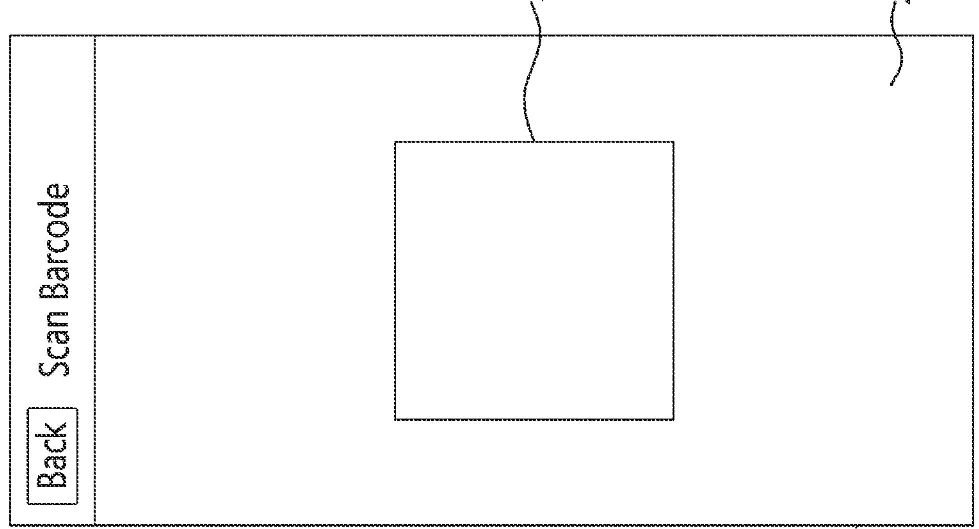

As previously noted, invocation of a 'scan barcode' function of an NFC application 8130C, by for example selection of a 'scan barcode' command object 2112, can result in generation and display of a suitably-configured barcode command GUI 2300, as shown for example in FIG. 19. For example, a GUI 2300 may comprise a camera viewer controlled by an imaging application 8130N controlling a camera (sub)system 8240. For example, such a GUI 2300 may comprise an active image viewing are 2500 representing a live, dynamic feed from the camera system 8240, with an overlaid targeting image 2502, such as a red square, configured to assist the user in centering a barcode for target QR reading by an image-reading application 8130N. Once the barcode has scanned, tag data associated therewith may be used to generate and log a tag data set 310 and to display a corresponding new graphical object 2004, 2504 as shown in FIG. 20.

Figure 21:
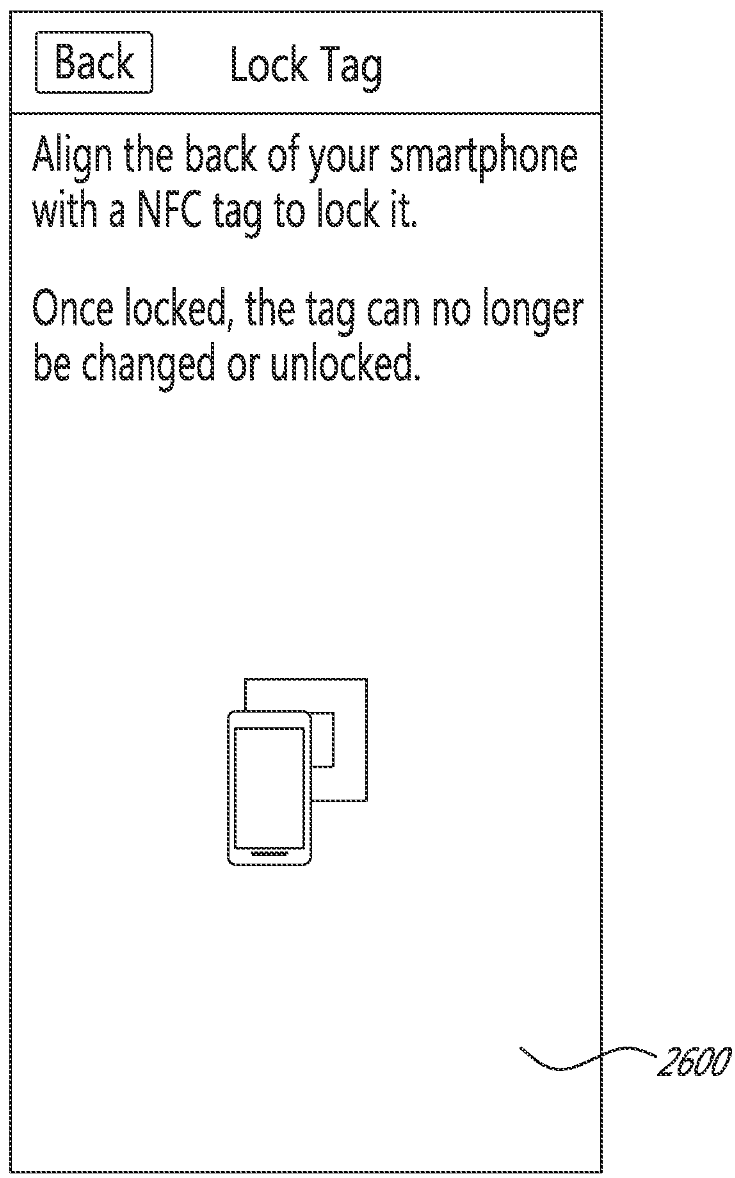

FIG. 21 illustrates the locking of a physical tag 850, so that only authorized user(s) and/or user device(s) 810 are able to access and/or modify, and/or otherwise interact with, data set(s) or record(s) 310, R1, etc. stored thereon. As illustrated, the user may invoke a "lock tag" function by selecting a suitable command object from a menu, such as from the overflow menu. Thereafter, a suitably-configured GUI 2600 may be provided, instructing the user to elect whether or not to lock the subject tag, and optionally providing further guidance or instructions in doing so. Responsive to the presentation of this display, NFC reader/writer circuitry and transmitter of NFC (sub)system 8132 may be activated, to perform suitable read/write operations to provide data to the target tag(s) 850 to provide any desired restrictions on read/write access. Finally, the user may be returned to the tag log once the locking has been completed successfully.

Figure 22:
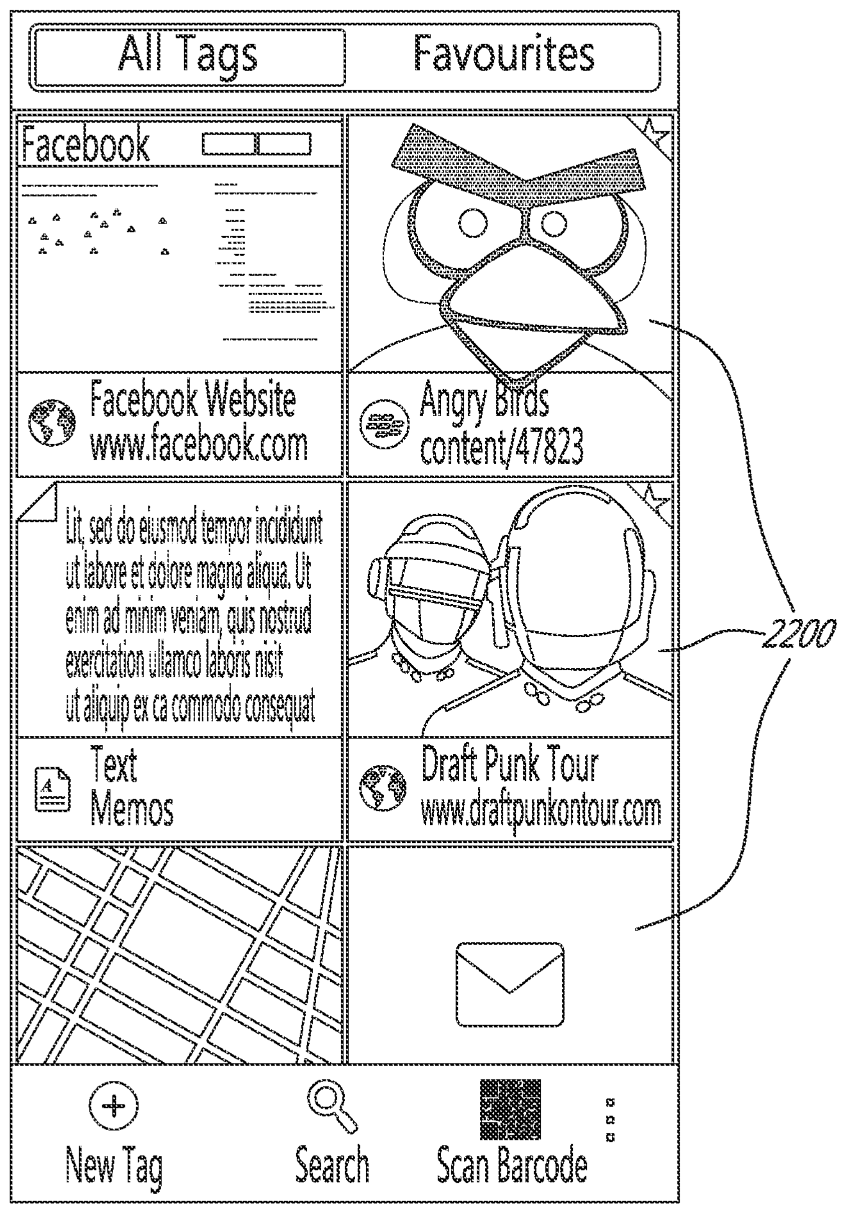

As illustrated in FIG. 22, a plurality of graphical objects 2200 representing tag data sets 310 and/or items R1, R2, etc, may be categorically displayed in a tag log format. Correspondingly, a single tag object 2002 may be selected from the tag log display, whereupon access to the corresponding tag data set(s) 310 will invoke an application associated with the tag data set, as for example by use of suitably-configured application execution commands stored in records R1, R2, etc. of the data set(s) 310. Interactions may include, for example, an email tag that may open with a composition GUI generated by or otherwise associated with a default personal email application. The email tag may pre-populate the addressee, subject and/or body fields, if so defined by the tag data. At the predefined or selectable option of the user, such email may not be sent immediately, but rather may be sent only upon specific direction by the user.

Likewise, selection of an SMS tag object 2002 may invoke an SMS messaging application, and open a message composition GUI. Selection of the SMS tag object 2002 may cause pre-population of the addressee and/or SMS body, if so defined by command data set(s) R1, R2, etc. associated with the tag object and/or tag data set 310. The SMS tag may not cause immediate sending of a generated SMS.

Similarly, selection of a URL tag object 2002 may cause the opening of an on-board browser application 8130E, and the browser may be directed to open a web page specified by one or more tag records R1, R2, associated with a corresponding tag data set 310. Further, a phone tag may open in a phone dialer, and may cause pre-population of the phone number indicated by the tag. However, the subject phone number may, for example, not be dialed until an instruction to do so by the user. A geo tag may open in a map application, a webpage, or the like, whereupon the address specified by latitude, longitude values may be shown. A text tag may open in a text app, with the text and/or text document displayed. A tag provided by, or otherwise in association with, an application store such as BlackBerry World tag may be opened, for example in the store, and the user device may be directed to the subject app product page of the app indicated by the tag read.

Figure 24B:
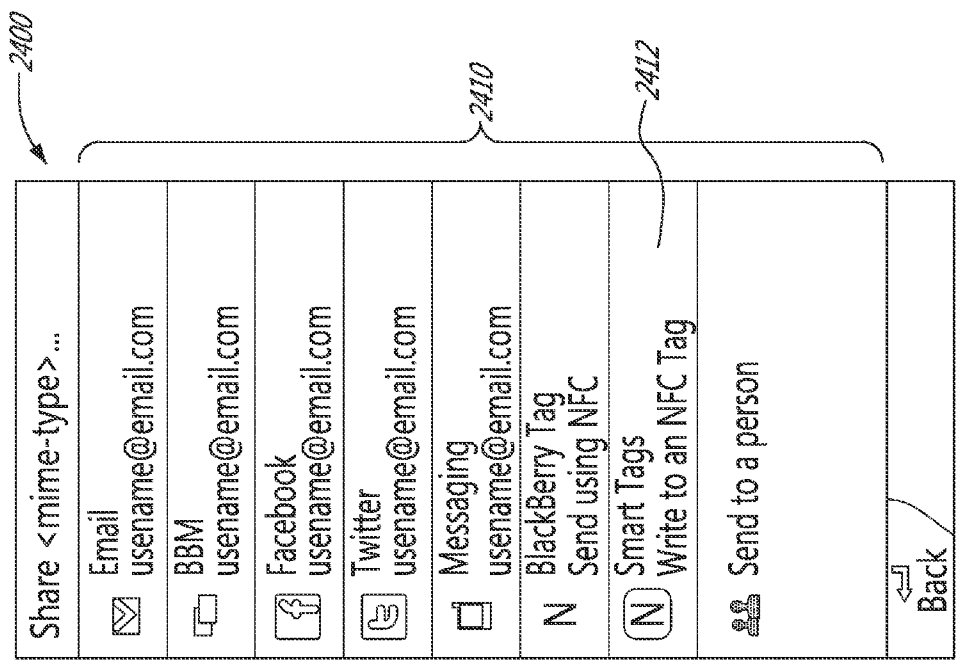
Figure 24A:
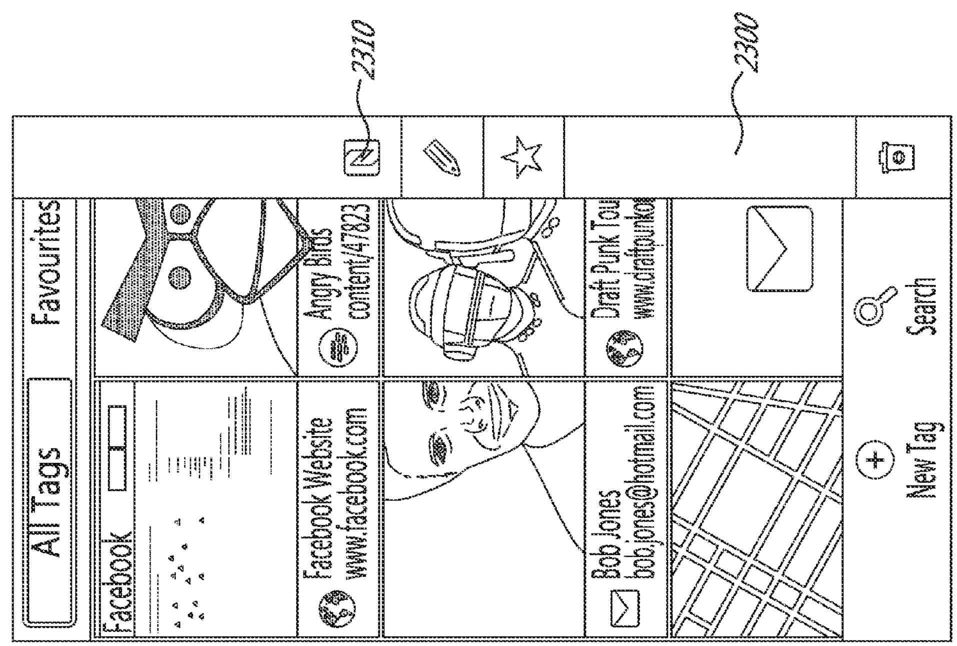
Figure 24D:
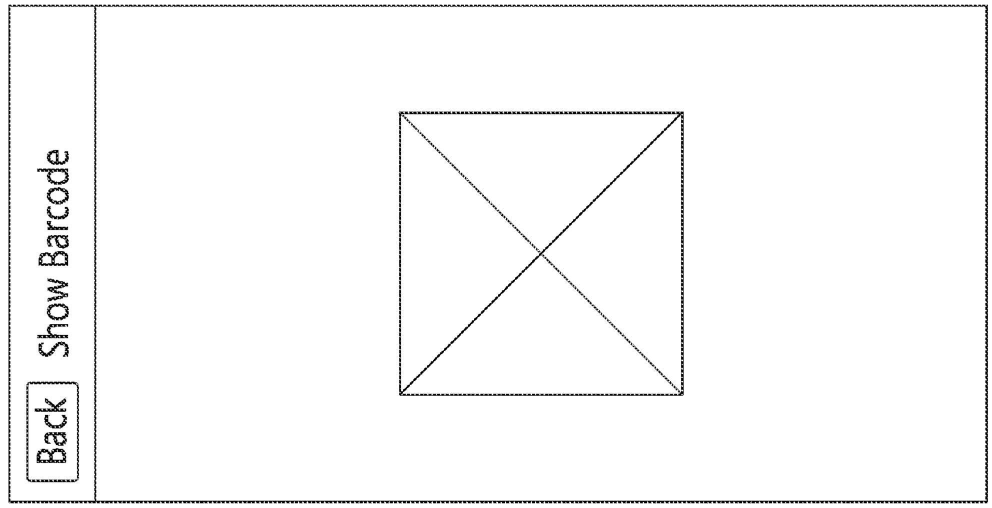
Figure 24C:
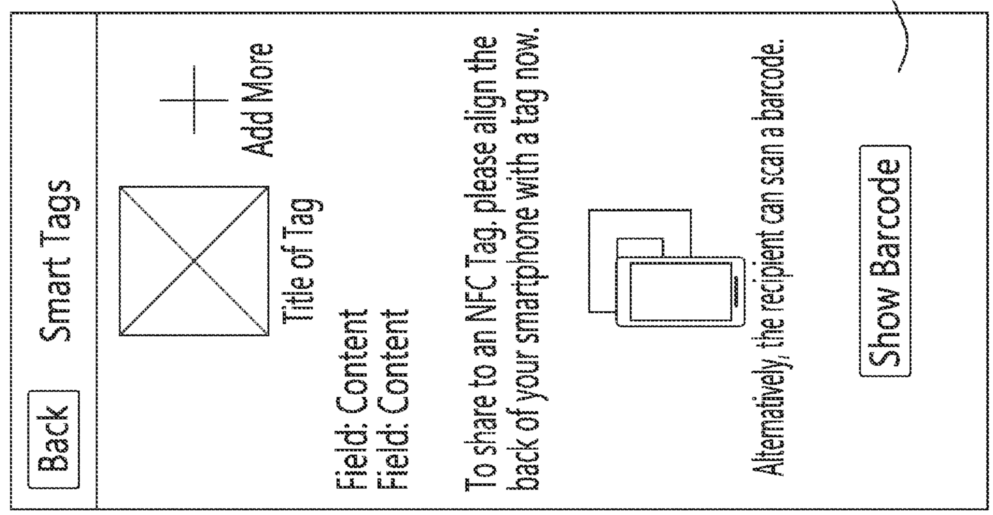

As is illustrated in FIGS. 24A, 24B and 24C, and as discussed above, tag data set(s) 310 may be shared. Such sharing may be enabled in any suitable manner, including for example selection or other invocation of a suitable command object 2310 from a base menu, and/or from a sidebar menu 2300, for example. In the embodiment shown in FIGS. 24A-C, a user may actuate a share feature by selecting a 'share' command object 2310, whereupon the user may be shown a suitably-configured share user interface 2400, comprising one or more share option objects 2410, each corresponding to a different communications application 8130 to be used in sharing the desired data set(s) 310.

For example, a user of a device 810 may navigate to and select a graphical object 2002 corresponding to a tag data set 310 the user desires to share, and then invoke a share feature or function by selecting a share command object 2130, and then select a communications application object 2410 associated with a communications application 8130 to be used in sharing the selected data set 310. If for example the user selects a smart tags or other NFC or NFC-related application object 2412, the user may be presented with an NFC tag share GUI 2450, as shown in FIG. 24C, with suitably-adapted instructions and command objects, configured to solicit and process all required inputs for the desired sharing operation. Upon selection of a smart tag to share from the smart tag log, and as illustrated in FIG. 24C, the user may be shown a preview of the tag and content to be shared, and instructions on how to share the tag. The user may be enabled to choose to show an indicator, such as a barcode, to a fellow user in order to allow the sharing to occur, such as wherein the second user receiving the share may execute a barcode scan to obtain the tag data as discussed above. Upon selection of the sharing by a barcode feature, the device may display the barcode related to the tag to be shared, as illustrated in FIG. 24D.

Modification, or editing, of a tag data set 310 may be facilitated through the use of a suitably-configured GUI 2500, such as that illustrated in FIGS. 25A and 25B. For example, a user of a device 810 may navigate to and select a graphical object 2002 corresponding to a tag data set 310 the user desires to modify, and then invoke a modify or edit feature or function by selecting an edit command object 2303, and then use any desired virtual or physical keyboard(s), keypad(s), pointing device(s), etc., to edit desired information into any of fields 2502, each corresponding to one or more input items R1, R2, etc of the data record(s) 310. Selection of 'save' object 2504 can cause a new or modified data set to be logged and saved as previously discussed. Invocation of an edit tag feature and a subject tag, a display may be provided with a form template for editing the selected tag. Available edits may include, by way of non-limiting example, drop-down edits, free form text edits, search, texts, tag types, and the like. As shown, a user may elect to save edits, cancel edits, or go back to a prior screen.

Figure 26:
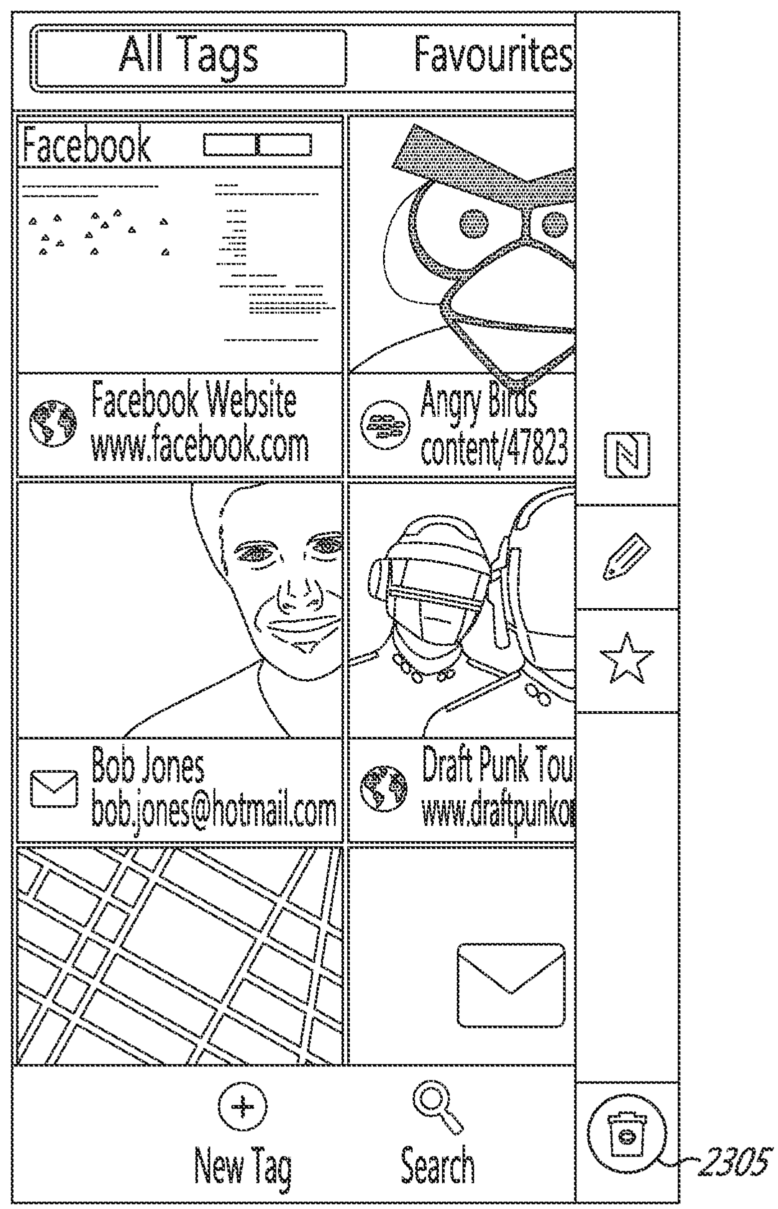

As shown in FIG. 26, a user may delete any desired tag data record(s) 310. For example, a corresponding tag graphical object 2002 may be selected, followed by selection of a deletion command object 2305, such as a trash can icon. Upon such an actuation, the user may or may not be asked to confirm the deletion, and optionally undo or otherwise not irrevocably complete the deletion. Upon deletion, the user may be returned to a tag log grid view 2000 such as with the deleted tags now removed from the displayed log.

Figure 27:
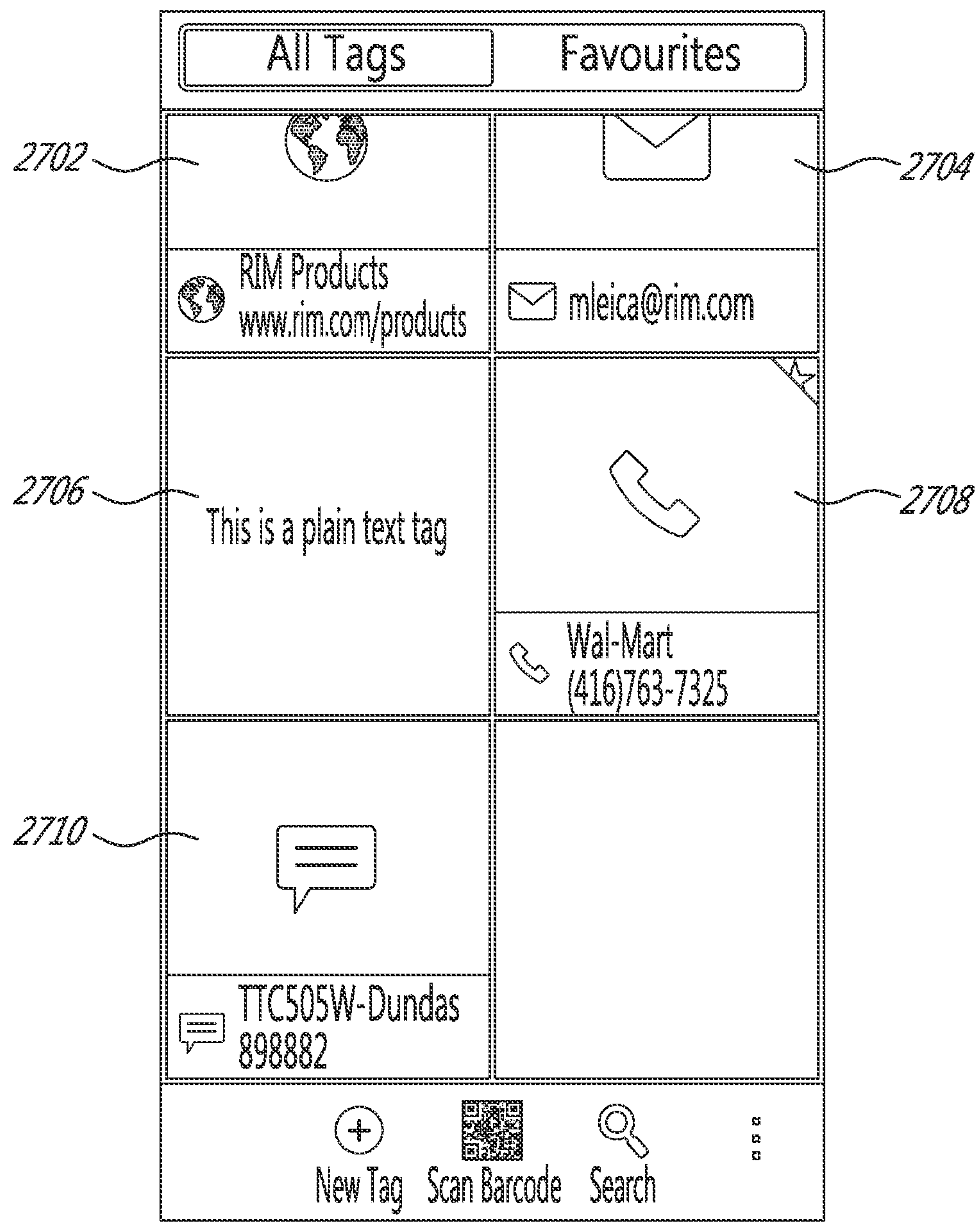
Figure 28:
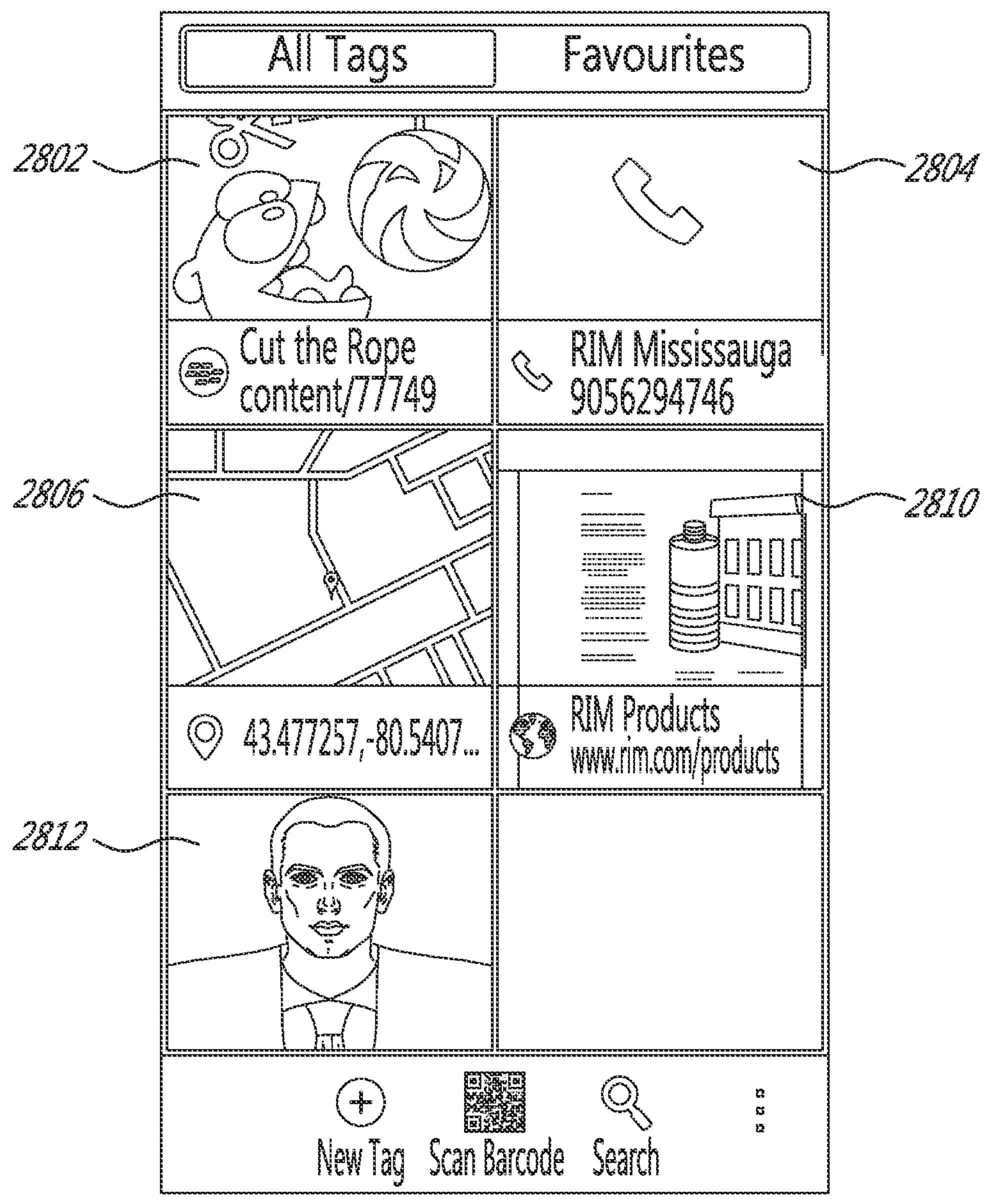

FIGS. 27-34 illustrate a plurality of embodiments in which a categorized log of tag data records 310 is displayed to the user to allow for the foregoing and other interactions with the tag log. For example, FIG. 27 illustrates tag-related graphical objects 2702 related to products or related resources such as associated websites, etc., 2704 related to emails and/or e-mail applications, 2706 related to a plain text tag, 2708 related to a contact or other tag set comprising telephone number data, and 2710 related to an instant message and/or instant message application. FIG. 28 illustrates a game-related tag object 2802, a telephone-related tag object 2804, a geographic location tag 2806, a product or product/related tag 2810, and a contacts tag 2812 associated with an individual or business.

Figure 32:
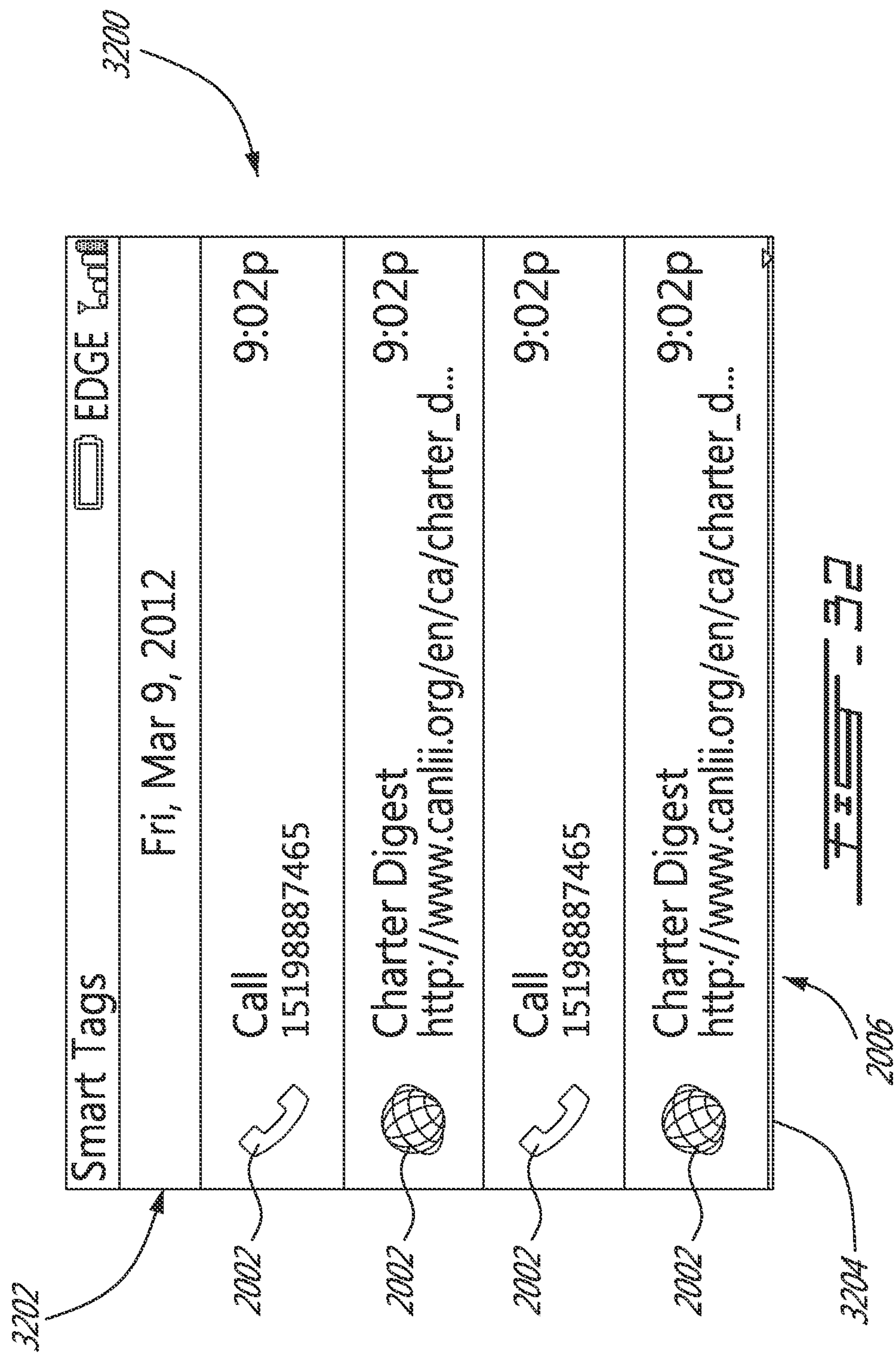

FIG. 32 shows an additional embodiment, wherein categories may not be indicated by groups or colors, but rather may be driven by icon indicators. In the illustrated embodiment, graphical objects 2002 corresponding to telephone tag data sets 310 are provided in a line tile format GUI 3200, and are indicated by graphical elements in the form of a telephone icon 3202, and URL tags are likewise provided in a line tile format and are indicated by a web browser icon 3204.

Figure 33:
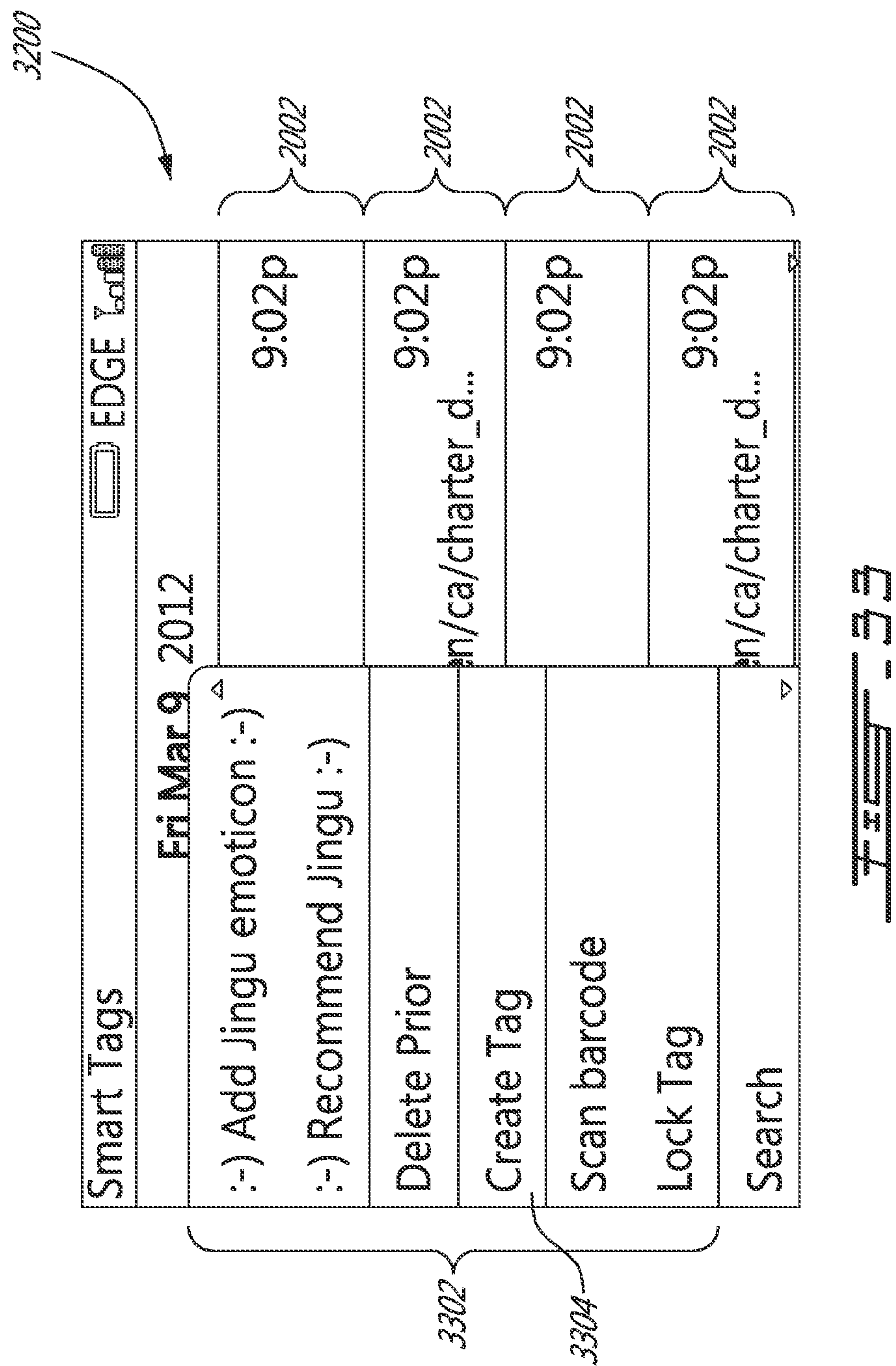

In such embodiments, and as discussed above with reference to a tiled and/or colored categorized tag log display 2000, a tag data set 310 may also be readily created from a line tile display view 3200. In any such embodiments, a pop-up menu 3302 may be actuated, such as is shown in FIG. 33, wherefrom a "Create Tag" command object 3304 may be selected.

Figure 34:
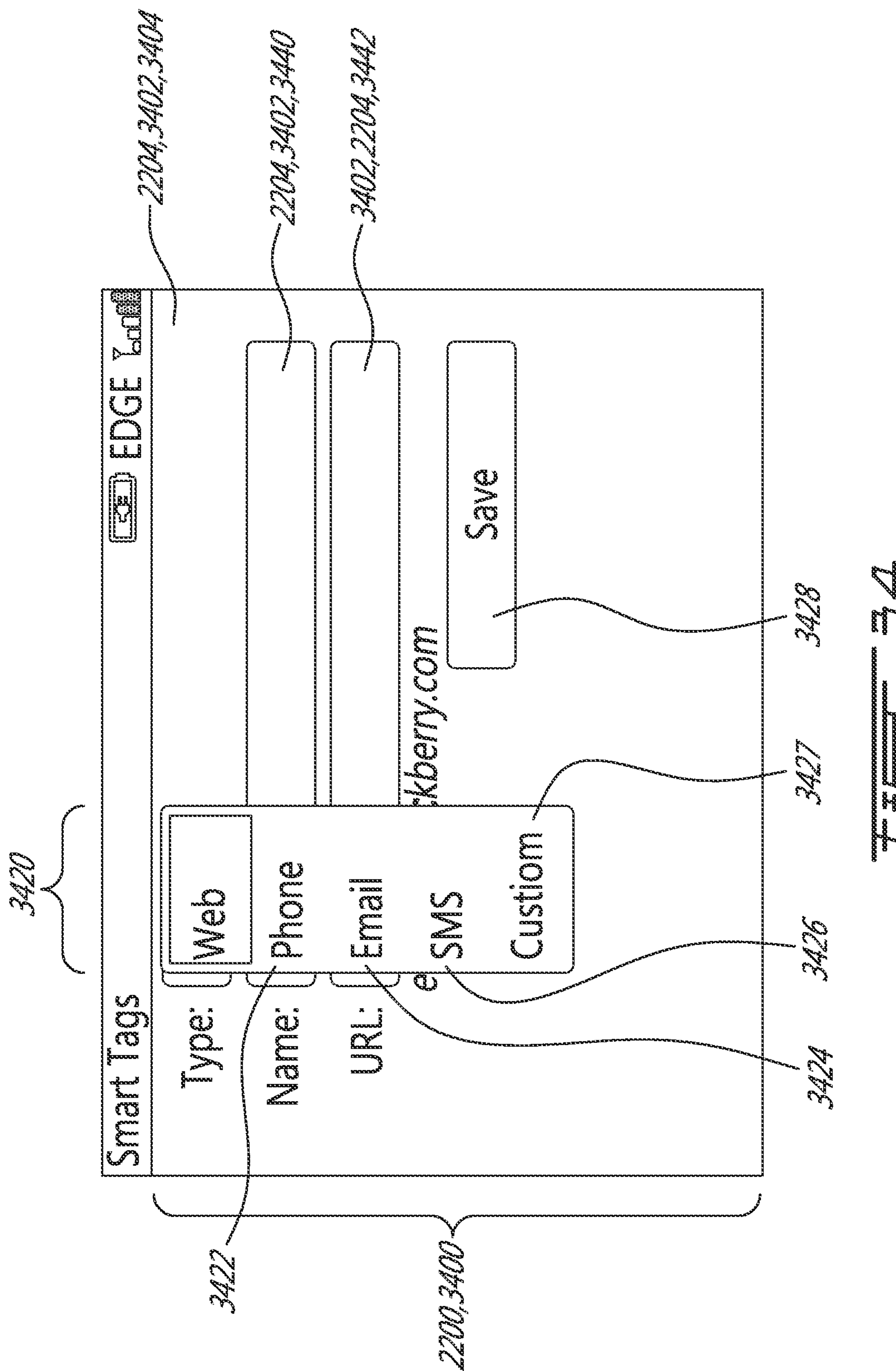

For example, selection of a "Create Tag" command object 3304 such as that shown in pop-up menu 3302 can result in display of an interactive GUI 2200 adapted for input of data items R1, R2, etc. relevant to a desired type or class of tag data set 310, such as GUI 3400 shown in FIG. 34. In the example shown, tag-creation GUI 3400, 2200 comprises a plurality of data item input fields 2204, 3402, adapted for generation of a tag data set 310 related to a web page. By for example placing a cursor or otherwise selecting a "type" data field 2204, 3402, 3404, a user can be presented with a drop-down, pop-up, or other menu or input device comprising a listing of available tag data set types 3420. In the example shown, tag type or class list 3420 comprises types 'web', 'phone', 'email', SMS, and 'custom.' Selection of any of corresponding type objects 3422, 3424, 3426, 3427, 3428 can cause a tag-management application 8130N to generate a suitably-configured input GUI 3400, comprising record input fields 2204, 3402 adapted to elicit and receive suitable corresponding inputs. In the example shown, selection of 'web'-type command object 3422 has resulted in display of 'name' and 'URL' input fields 3440, 3442 adapted to receive corresponding inputs, which may for example be used by a web browser application 8130E in navigating the Internet, etc.

Thus, in various aspects the disclosure provides wireless handheld communication devices adapted for creating, modifying, and otherwise processing data suitable for storage on and reading from and by NFC-capable devices 810, 850, 120, etc. In various embodiments, such a device comprises at least one near field communication (NFC) (sub)system 8132 operable for data communications with at least one other NFC-capable device 810, 850, 120, etc.; at least one display 8160; one or more input devices input device(s) 8140, 8112, 8138, 8160, 8134, 726, 8238, 8240, 8106, 8108, 8132, 8101, 8102, 8121 for generating input command signals; and at least one processor 8180, 8168, 8132A, etc. The at least one processor may be configured to access data associated with at least one of a plurality of NFC tags 850, the accessed data comprising, for each of the at least one of the plurality of NFC tags, at least a tag identifier R1, R2, RN, etc., and at least one content data record R1, R2, RN etc., and, using the accessed data, cause the display 8160 to display at least one tag-specific graphical object 2002, each tag-specific graphical object 2002 comprising at least: a text element 2006 associated with the corresponding tag identifier, and a graphical element 2004 associated with the corresponding content data record.

In further aspects and embodiments, the disclosure herein provides methods and transient and/or non-transient machine-readable and machine-executable instruction sets adapted for causing processor(s) 8180, 8158, 8132A, etc. to carry out such steps.

The systems and methods disclosed herein have been discussed in relation to, and are applicable to all forms of short-range communications technologies, including those which involve reading/writing of stored, computer readable data signals, such as computer data, and all forms of image-based data technologies, including barcodes, QR codes and the like.

In related aspects, any apparatuses disclosed may include additional processor components, which may be in operative communication with other components via buses or any other suitable communication coupling(s). The respective processors may affect some or all of the processing of, and/or the initiation and/or scheduling of, the processes and/or functions performed by the electrical components discussed throughout.

In other related aspects, exemplary apparatuses as described herein may include additional radio transmitter/receiver components. Such apparatuses may also include, or include additional, network interfaces and/or network controllers (not shown) for connecting to one or more network entities. Disclosed apparatuses may optionally include additional components for storing information, such as, for example, RAMs, ROMs, and/or flash memory device(s)/computer readable media, and/or other computer readable medium such as a magnetic or optical drive. Such computer readable media may be operatively coupled to the processor(s), memory component(s), or other components of the apparatuses, such as via busses or the like. Such data storage components may be adapted to store computer readable instructions and data for affecting the processes and behavior of the components described in each of the apparatuses, and subcomponents thereof, and/or the processors, and/or the methods disclosed herein. The memory components described herein may retain instructions for executing functions associated with various components of the apparatuses. While shown as being distinct from the memory and processing components, it is to be understood that one or more of the other components may be realized within or in cooperation with the memory and processing components illustrated. It is further noted that the components shown may comprise their own respective processors, electronic devices, hardware devices, electronic sub-components, logical circuits, memories, software codes, firmware codes, etc., or any combination thereof.

Information and signals discussed herein may be represented using any of a wide variety of techniques. More particularly, data, instructions, commands, actions, information, signals, or symbols that may be referenced herein may be realized using, or may at least in part represent, voltages, currents, electromagnetic waves, magnetic fields or particles, optical fields or particles, or any combination thereof.

Further, the various illustrative logical blocks, modules, circuits, methods and algorithm steps described in connection with the herein disclosed devices, systems, and methods may be implemented using specialized or general purpose electronic hardware and/or software. Because the devices, systems, and methods described herein may be implemented in a variety of manners and constructions, the various illustrative components, blocks, modules, circuits, and steps have been described above generally in terms of their functionality. Whether such functionality is implemented in hardware alone or in combination with software or the like (e.g., firmware) depends upon the particular application, skill of the artisan, and design constraints imposed on the overall system.

The various illustrative logical blocks, modules, and circuits described herein may be implemented or performed using any appropriate processors, digital signal processors (DSPs), application specific integrated circuits (ASICs), field programmable gate arrays (FPGAs) and/or other programmable logic devices, discrete gates or transistor logic, discrete hardware components, or any combination(s) thereof capable of implementing the methods and algorithms and performing the functions described herein. A general-purpose processor may be a microprocessor, but in the alternative, the processor may be or include any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Software modules discussed herein may reside in RAM memory, flash memory, ROM memory, EPROM memory, EEPROM memory, registers, hard disk, a removable disk, a CD-ROM, or any other form of volatile or non-volatile solid state, magnetic, optical, or other processor or computer readable data storage medium now or hereafter known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Aspects of the disclosure where are at least partially implemented in software may incorporate functions stored or transmitted as one or more instructions or code in a non-transitory manner on or using at least one computer-readable medium. Computer-readable media may include both computer storage media and communication media, including any medium that facilitates transfer of a computer program, action, or other computer readable data from one place to another. A storage medium may be or include any medium that can be accessed and processed by a general purpose or special purpose computer. Also, any connective hardware may be considered to be within the scope of a computer-readable medium. For example, if information is transmitted from a website, server, or other remote source using a coaxial cable, fiber optic cable, twisted pair, digital subscriber line (DSL), or wireless technologies such as infrared, radio, microwave, or the like, then the coaxial cable, fiber optic cable, twisted pair, DSL, or wireless technologies such as infrared, radio, microwave, or the like may be included in the definition of medium.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A method of presenting data read and/or derived from a near field communication (NFC)-capable device performed by a processor of a handheld wireless communication device, the handheld wireless communication device comprising an NFC subsystem, a wireless communication subsystem, a persistent memory and a display each coupled to the processor, the method comprising:

reading first data from the NFC-capable device using the NFC subsystem;

storing the first data read from the NFC-capable device in the persistent memory;

extracting a Uniform Resource Locator (URL) identifying a location of second data associated with the first data;

retrieving the second data from a server associated with the URL using the wireless communication subsystem;

storing the second data retrieved from the server in the persistent memory;

automatically determining a display category for displaying the first data and second data based on a combination of a type and content of the first data read from the NFC-capable device and a type and content of the second data retrieved from the server;

automatically determining a presentation schema based on the display category, wherein the presentation schema defines a layout and/or appearance of any text, graphical, audio, video, or other elements to be displayed; and displaying the second data and at least some of the first data in accordance with the determined presentation schema on the display.

2. The method of claim 1, wherein the handheld wireless communication device is a smartphone and the NFC-capable device is an NFC tag embedded in an object.

3. The method of claim 1, wherein the displaying occurs in response to input.

4. The method of claim 3, wherein the displaying occurs at a time subsequent to the reading of the NFC-capable device.

5. The method of claim 3, wherein the displaying is based on the second data and first data stored in the persistent memory, wherein the displaying occurs whether or not the NFC-capable device is present.

6. The method of claim 3, wherein the displaying occurs in response to invoking an NFC tag application.

7. The method of claim 1, wherein the displaying comprises:

displaying a tile object including a text element and a graphical element, wherein the graphical element is included in the second data retrieved from the server, wherein the tile object includes a link to a webpage associated with the URL;

wherein the method further comprises:

displaying the webpage associated with the URL in response to input selecting the tile object.

8. The method of claim 1, wherein the displaying comprises:

displaying a group title object corresponding to the determined display category, the group object including a text element and a graphical element, wherein the graphical element is included in the second data retrieved from the server; and displaying a number of individual tile objects each including a text element and a graphical element URL in response to input selecting the group tile object.

9. The method of claim 8, wherein the group tile object is displayed as part of a plurality of group tile objects arranged in a grid.

10. The method of claim 9, wherein the grid of group tile objects is part of a graphical user interface (GUI) of an NFC tag application.

11. A method of presenting data read and/or derived from a near field communication (NFC)-capable device performed by a processor of a handheld wireless communication device, the handheld wireless communication device comprising an NFC subsystem, a wireless communication subsystem, a persistent memory and a display each coupled to the processor, the method comprising:

reading first data from the NFC-capable device using the NFC subsystem;

extracting a Uniform Resource Locator (URL) from the first data identifying a location of second data associated with the first data;

retrieving the second data from a server associated with the URL using the wireless communication subsystem;

storing the first data read from the NFC-capable device in the persistent memory and the second data retrieved from the server in the persistent memory;

automatically determining a display category for displaying the first data and second data based on a combination of a type and content of the first data read from the NFC-capable device and a type and content of the second data retrieved from the server;

displaying a group tile object corresponding to the determined display category, the group tile object including a text element and a graphical element, wherein the graphical element is included in the second data retrieved from the server; and displaying a number of individual tile objects each including a text element and a graphical element in response to input selecting the group tile object.

12. The method of claim 11, wherein the group tile object is displayed as part of a plurality of group tile objects arranged in a grid.

13. The method of claim 12, wherein the grid of group tile objects is part of a graphical user interface (GUI) of a NFC tag application.

* * * * *